MAGNETIC RECORD INPUT-OUTPUT DEVICE FOR CALCULATORS

Filed Dec. 31, 1953 30 Sheets-Sheet 1

BINARY WORD ON MAGNETIC TAPE

INVENTORS
JOHN E. BARTELT
MAX E. FEMMER
BY P. C. Henninger
ATTORNEY

INVENTORS
JOHN E. BARTELT
MAX E. FEMMER
BY P.E. Henninger
ATTORNEY

MAGNETIC RECORD INPUT-OUTPUT DEVICE FOR CALCULATORS

*INVENTORS*
JOHN E. BARTELT
MAX E. FEMMER

*BY* P. E. Henninger

ATTORNEY

MAGNETIC RECORD INPUT-OUTPUT DEVICE FOR CALCULATORS

Filed Dec. 31, 1953 30 Sheets-Sheet 4

INVENTORS
JOHN E. BARTELT
MAX E. FEMMER

BY P. E. Henninger

ATTORNEY

Sept. 2, 1958 J. E. BARTELT ET AL 2,850,234

MAGNETIC RECORD INPUT-OUTPUT DEVICE FOR CALCULATORS

Filed Dec. 31, 1953 30 Sheets-Sheet 5

INVENTORS
JOHN E. BARTELT
MAX E. FEMMER

BY P. E. Henninger

ATTORNEY

INVENTORS
JOHN E. BARTELT
MAX E. FEMMER
BY
P. E. Henninger
ATTORNEY

Sept. 2, 1958 J. E. BARTELT ET AL 2,850,234

MAGNETIC RECORD INPUT-OUTPUT DEVICE FOR CALCULATORS

Filed Dec. 31, 1953 30 Sheets-Sheet 7

INVENTORS
JOHN E. BARTELT
MAX E. FEMMER

BY P. C. Henninger

ATTORNEY

INVENTORS
JOHN E. BARTELT
MAX E. FEMMER

BY P. C. Henninger
ATTORNEY

MAGNETIC RECORD INPUT-OUTPUT DEVICE FOR CALCULATORS

Filed Dec. 31, 1953 30 Sheets-Sheet 9

*INVENTORS*
JOHN E. BARTELT
MAX E. FEMMER
*BY* P. E. Henninger
ATTORNEY

Sept. 2, 1958 J. E. BARTELT ET AL 2,850,234
MAGNETIC RECORD INPUT-OUTPUT DEVICE FOR CALCULATORS
Filed Dec. 31, 1953 30 Sheets-Sheet 10
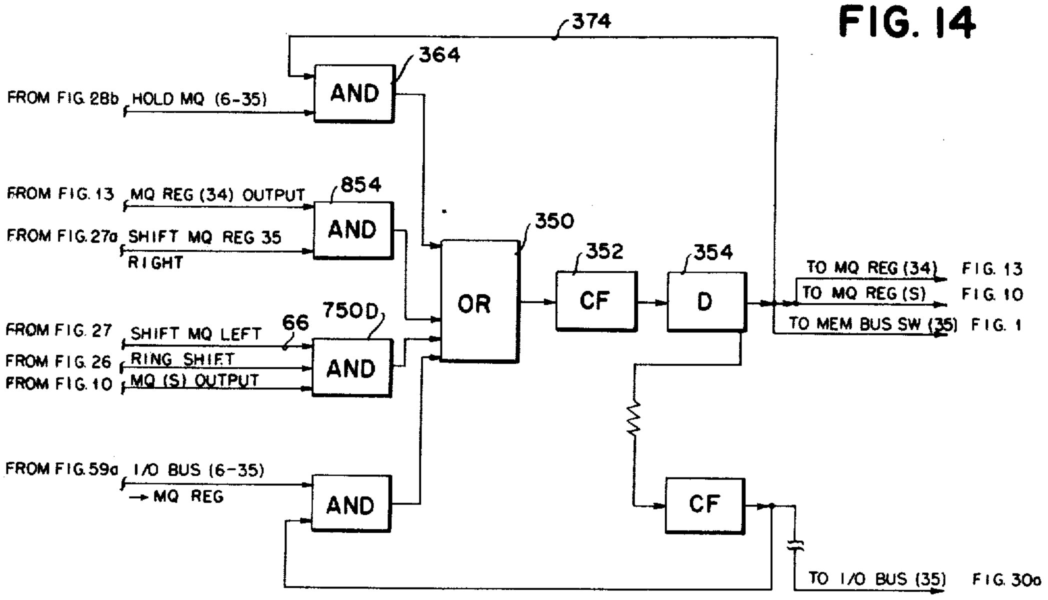
FIG. 14
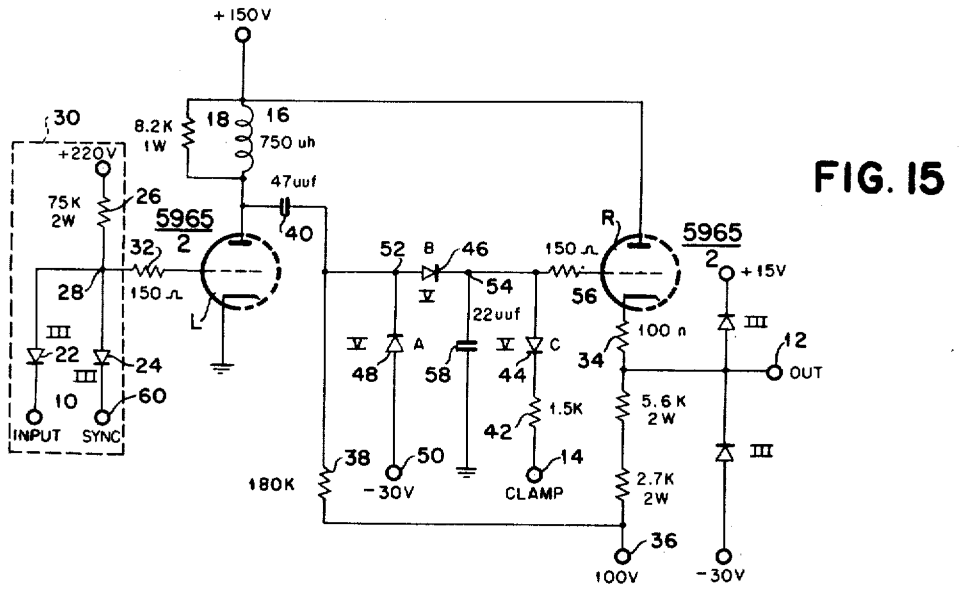
FIG. 15
INVENTORS
JOHN E. BARTELT
MAX E. FEMMER
BY P. C. Hennager
ATTORNEY

MAGNETIC RECORD INPUT-OUTPUT DEVICE FOR CALCULATORS

Filed Dec. 31, 1953

INVENTORS
JOHN E. BARTELT
MAX E. FEMMER
BY P. E. Henninger
ATTORNEY

INVENTORS
JOHN E. BARTELT
MAX E. FEMMER

BY P. E. Henninger
ATTORNEY

INVENTORS
JOHN E. BARTELT
MAX E. FEMMER
BY P. C. Henninger
ATTORNEY

Sept. 2, 1958 J. E. BARTELT ET AL 2,850,234

MAGNETIC RECORD INPUT-OUTPUT DEVICE FOR CALCULATORS

Filed Dec. 31, 1953 30 Sheets-Sheet 14

INVENTORS
JOHN E. BARTELT
MAX E. FEMMER

BY P. E. Henninger

ATTORNEY

MAGNETIC RECORD INPUT-OUTPUT DEVICE FOR CALCULATORS

INVENTORS
JOHN E. BARTELT
MAX E. FEMMER
BY P. C. Henninger
ATTORNEY

INVENTORS
JOHN E. BARTELT
MAX E. FEMMER
BY
P. E. Henninger
ATTORNEY

*INVENTORS*
JOHN E. BARTELT
MAX E. FEMMER

BY P. C. Hennager
ATTORNEY

Sept. 2, 1958 J. E. BARTELT ET AL 2,850,234

MAGNETIC RECORD INPUT-OUTPUT DEVICE FOR CALCULATORS

Filed Dec. 31, 1953 30 Sheets-Sheet 18

*INVENTORS*
JOHN E. BARTELT
MAX E. FEMMER

*BY* P. E. Henninger
ATTORNEY

MAGNETIC RECORD INPUT-OUTPUT DEVICE FOR CALCULATORS
Filed Dec. 31, 1953 30 Sheets-Sheet 19
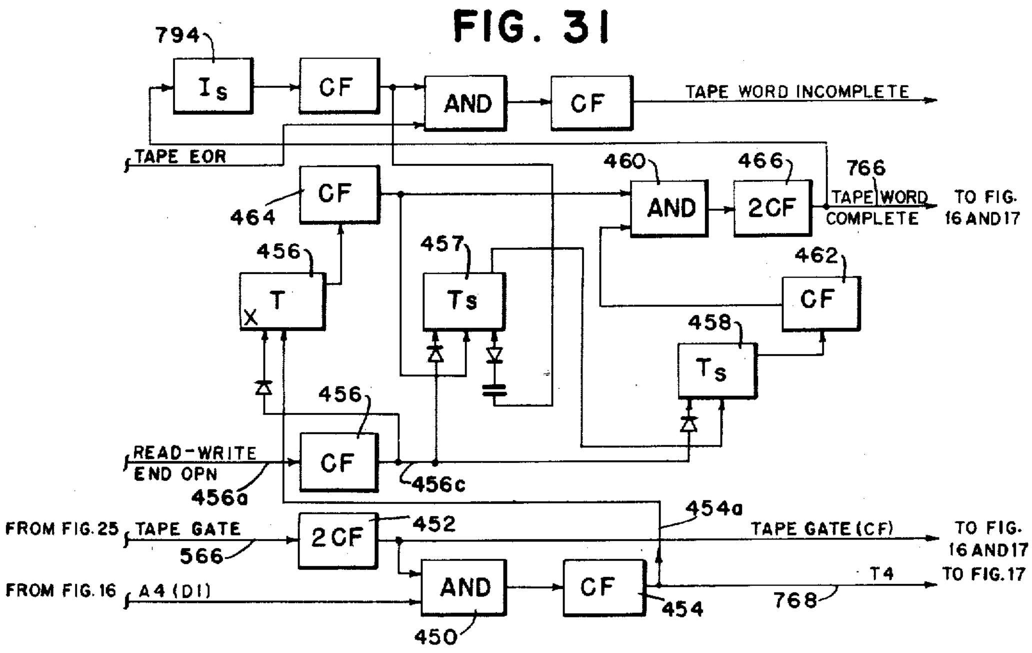
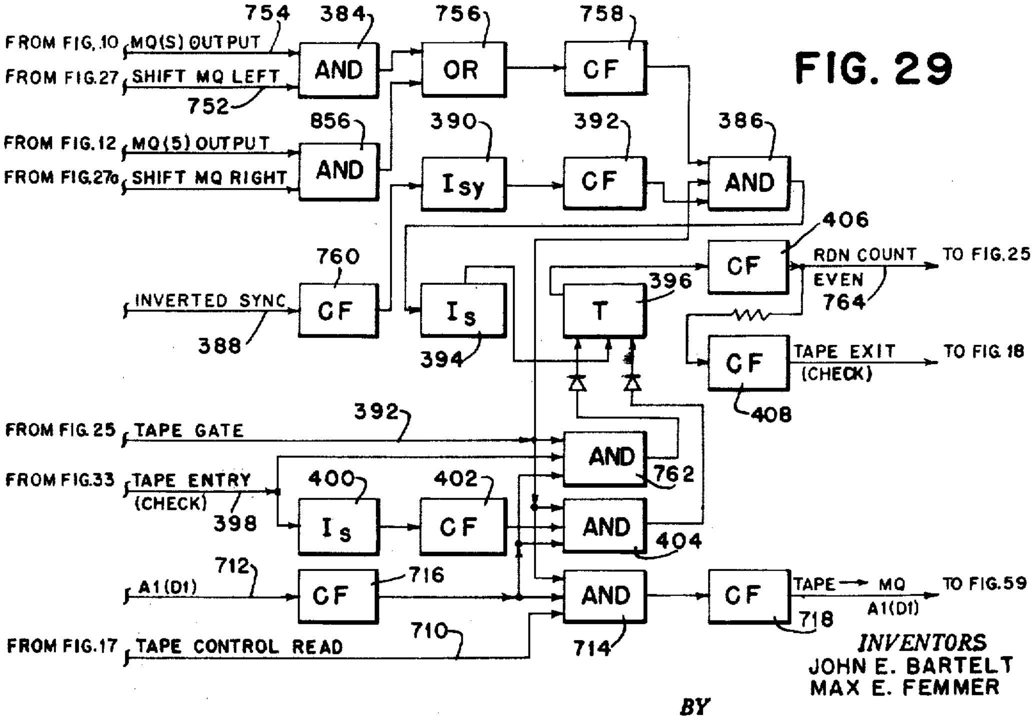
*INVENTORS*
JOHN E. BARTELT
MAX E. FEMMER
*BY* P. E. Henninger
ATTORNEY

MAGNETIC RECORD INPUT-OUTPUT DEVICE FOR CALCULATORS

Filed Dec. 31, 1953 30 Sheets-Sheet 20

INVENTORS
JOHN E. BARTELT
MAX E. FEMMER
BY P. E. Henninger
ATTORNEY

Sept. 2, 1958 J. E. BARTELT ET AL 2,850,234

MAGNETIC RECORD INPUT-OUTPUT DEVICE FOR CALCULATORS

Filed Dec. 31, 1953 30 Sheets-Sheet 21

INVENTORS
JOHN E. BARTELT
MAX E. FEMMER

BY P. C. Henninger

ATTORNEY

INVENTORS
JOHN E. BARTELT
MAX E. FEMMER
BY P. E. Henninger
ATTORNEY

INVENTORS
JOHN E. BARTELT
MAX E. FEMMER
BY P. C. Henninger
ATTORNEY

INVENTORS
JOHN E. BARTELT
MAX E. FEMMER
BY P. C. Henninger
ATTORNEY

INVENTORS
JOHN E. BARTELT
MAX E. FEMMER
BY
P. C. Henninger
ATTORNEY

*INVENTORS*
JOHN E. BARTELT
MAX E. FEMMER

*BY* P. C. Henninger

ATTORNEY

INVENTORS
JOHN E. BARTELT
MAX E. FEMMER
BY
P. C. Henninger
ATTORNEY

INVENTORS
JOHN E. BARTELT
MAX E. FEMMER
BY P. C. Henninger
ATTORNEY

INVENTORS
JOHN E. BARTELT
MAX E. FEMMER
BY
P. E. Henninger
ATTORNEY

INVENTORS
JOHN E. BARTELT
MAX E. FEMMER
BY
P. C. Henninger
ATTORNEY

United States Patent Office 2,850,234
Patented Sept. 2, 1958

2,850,234

MAGNETIC RECORD INPUT-OUTPUT DEVICE FOR CALCULATORS

John E. Bartelt, Poughkeepsie, and Max E. Femmer, Hopewell Junction, N. Y., assignors to International Business Machines Corporation, New York, N. Y., a corporation of New York Application December 31, 1953, Serial No. 401,648

22 Claims. (Cl. 235—61)

This invention relates to an input-output device for an electronic data processing machine.

More particularly, the invention relates to a magnetic tape input-output device capable of rendering data available for use in a computer and of recording computer data on magnetic tape.

It is an important object of this invention to provide a register adapted to accept from tape, successive groups of bits comprising portions of a word and to store such word.

It is a further object of this invention to provide a register adapted to contain a plurality of bits comprising a complete word and render available such bits, in successive groups, for exit from said register in parallel order within each group.

A still further object of the invention resides in the provision of means for handling bits serially and checking bits being shifted in a register, whether such bits are being shifted to the left or to the right therein.

Further, it is an important object of the invention to provide, in a register, bit checking means operative to check bits of a word being shifted in one direction in such register in conjunction with means for selectively rendering said bit checking means inactive while shifting such bits a given number of orders in the opposite direction.

It is a still further object of this invention to provide a register entry system including means for handling bits read in misalignment from a tape.

More specifically, it is an important object to provide a pair of tape data registers, for each bit of a group of bits, written in substantially parallel tracks on a tape, said pair of registers being adapted to receive either simultaneously, or successively, bits read from tape in a somewhat serial manner due to Skew of tape under the tape reading heads and supplying an output correctly representing the bits read.

It is a further object of this invention, particularly as it relates to the treatment of the problem resulting from Skew, to provide a Skew gate generator which is rendered active, upon the sensing of the first bit of a group of bits, and which will maintain a gate, for a fixed period of time following the sensing of such bit, without regard to the point in a time scale in which such first bit was sensed.

It is a further object of this invention to provide, in a tape information input-output system adapted to read or write words, one at a time, in successive groups of bits comprising any one word, a group counter which will recognize the presence of successive complete groups of bits and generate a control signal when one complete word has been read from tape or written upon tape.

Other objects of the invention will be pointed out in the following description and claims and illustrated in the accompanying drawings which disclose, by way of examples, the principles of the invention and the best mode which has been contemplated of applying those principles.

Figure 4:
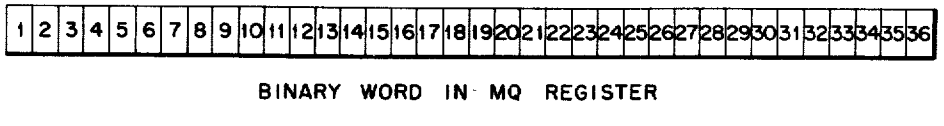
Figure 5:
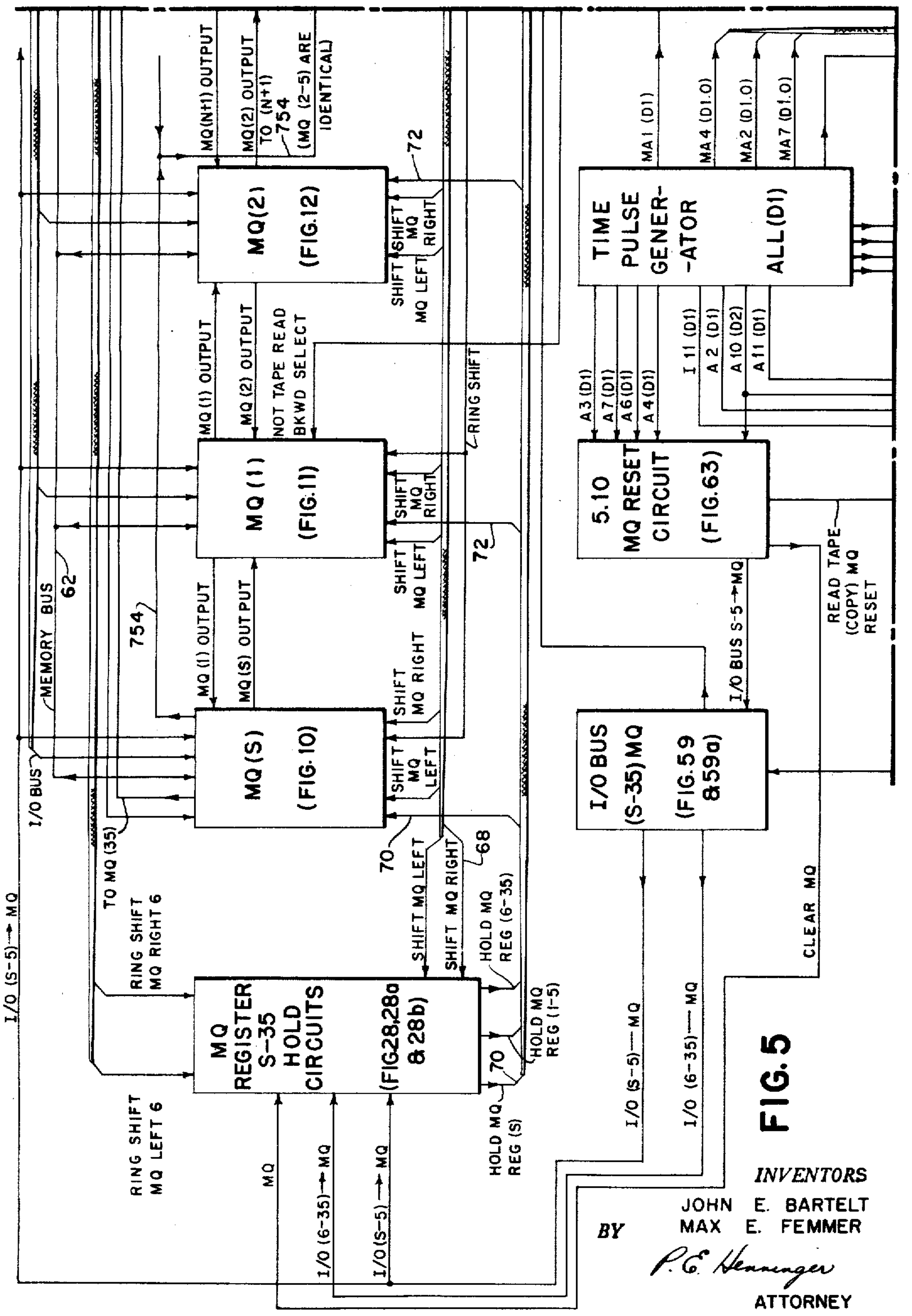
Figures 5A, 9:
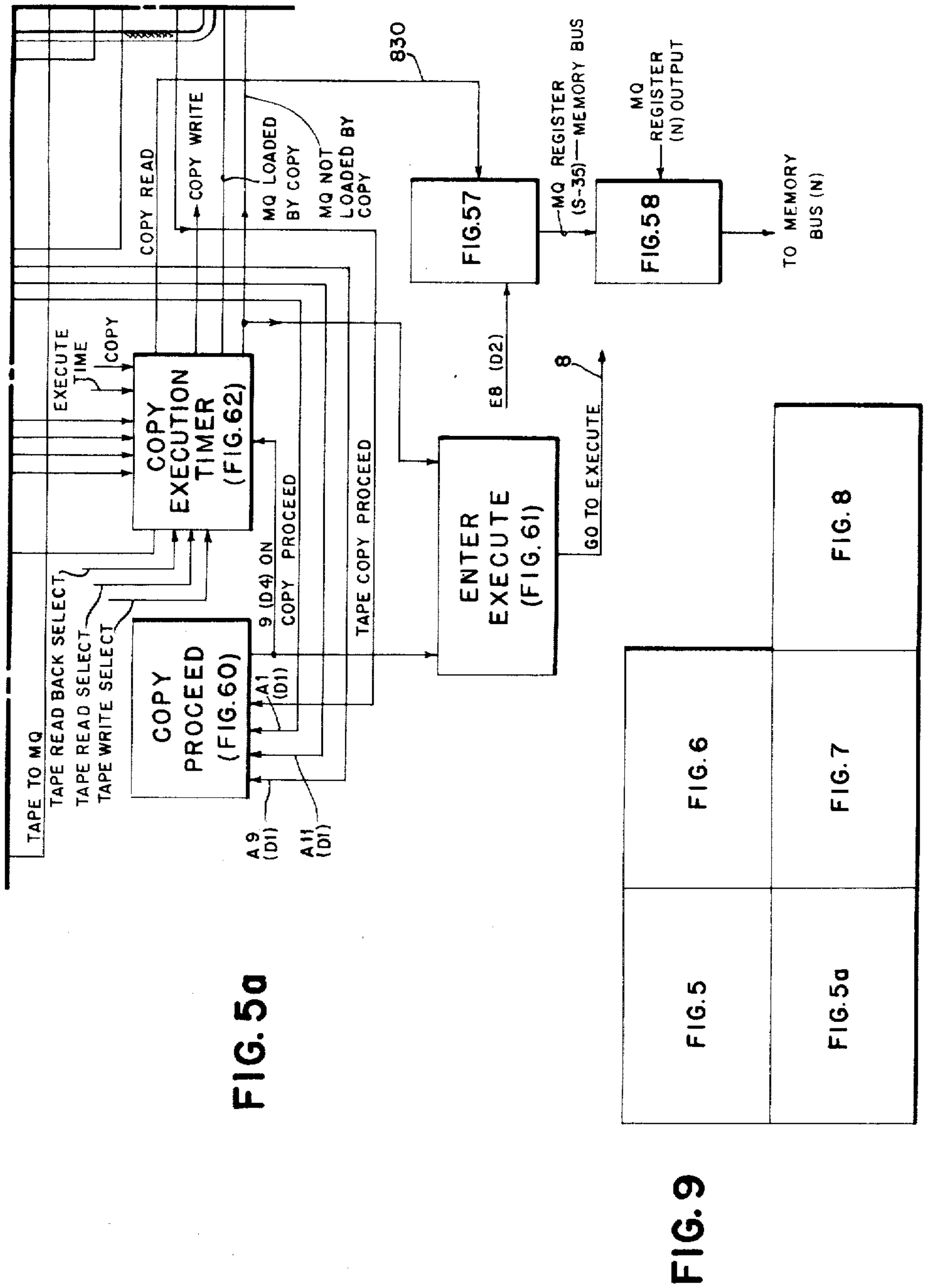
Figure 10:
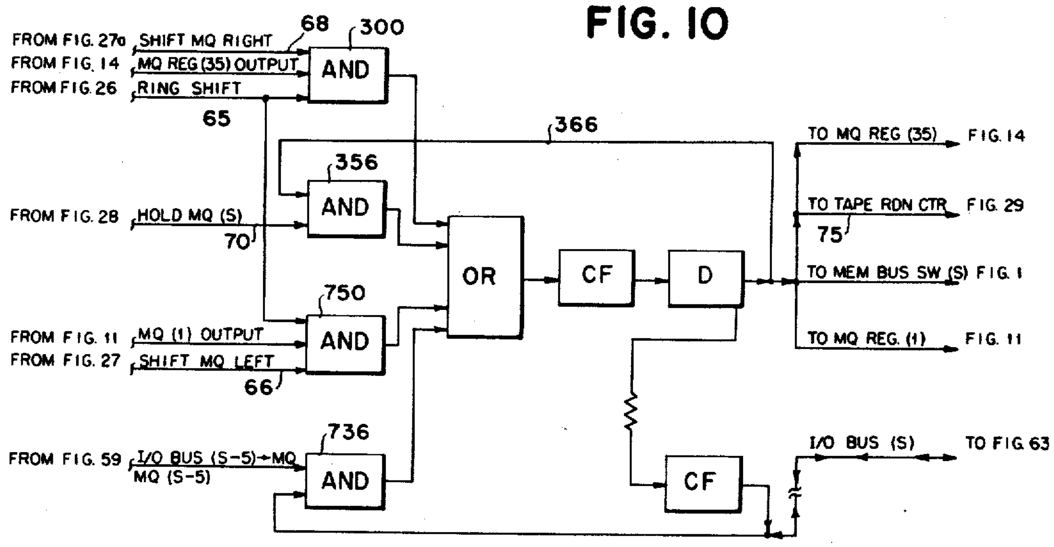
Figure 11:
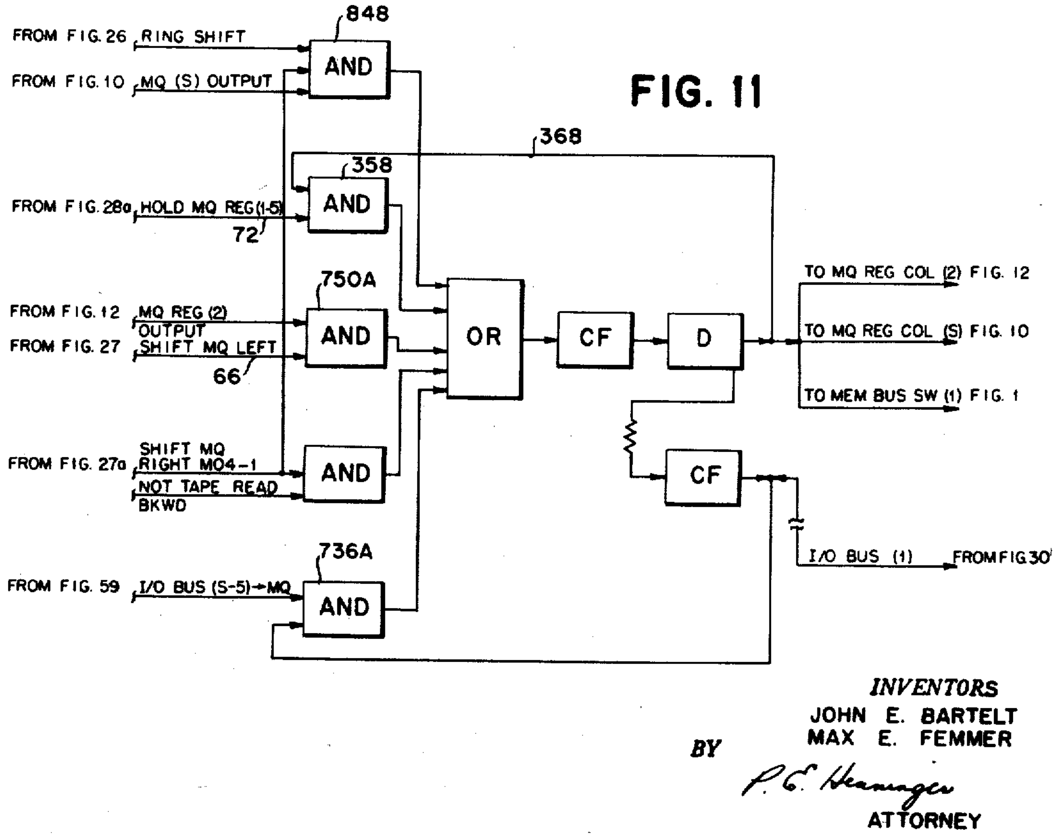
Figure 12:
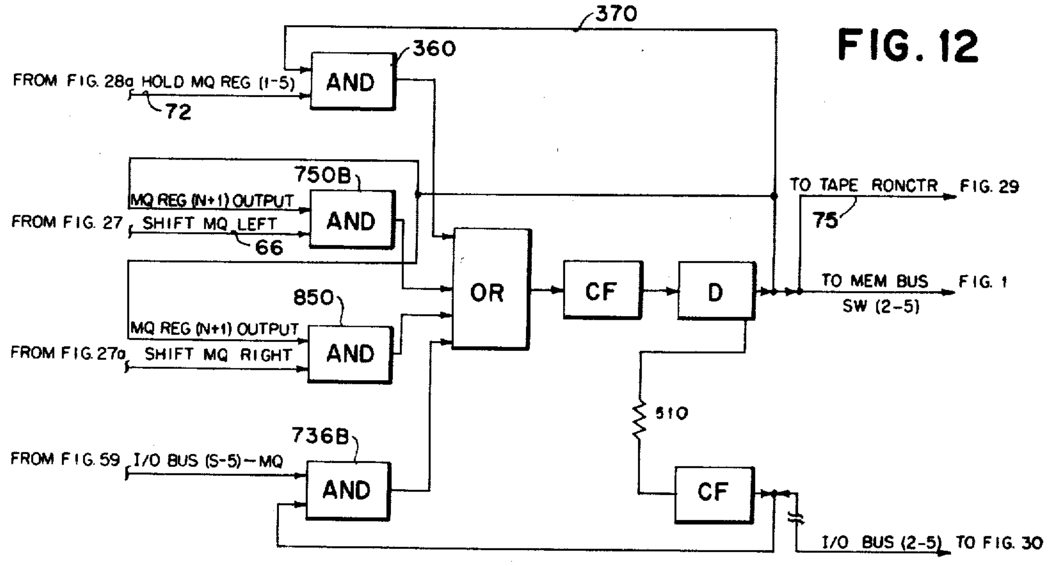
Figure 13:
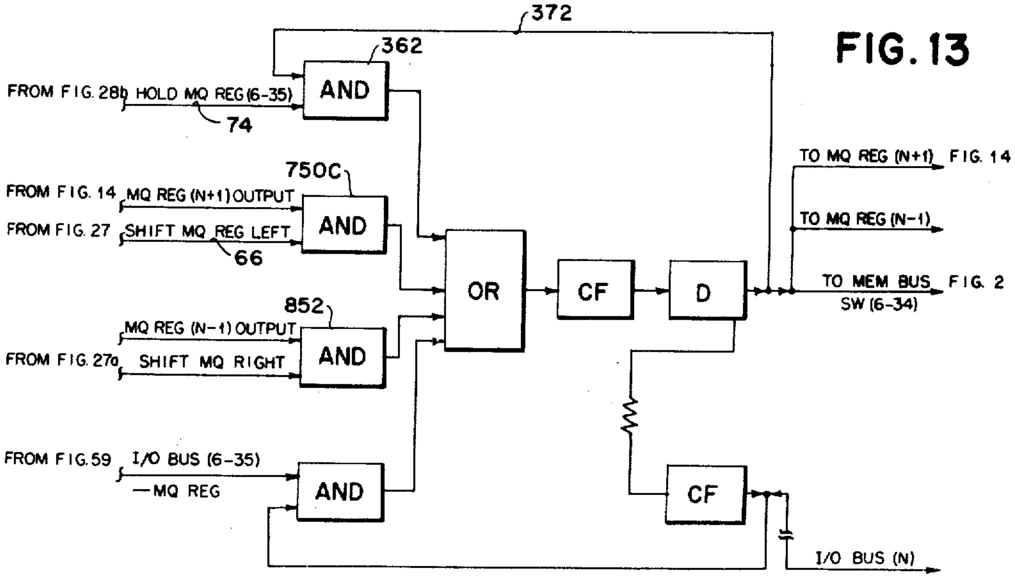
Figure 16:
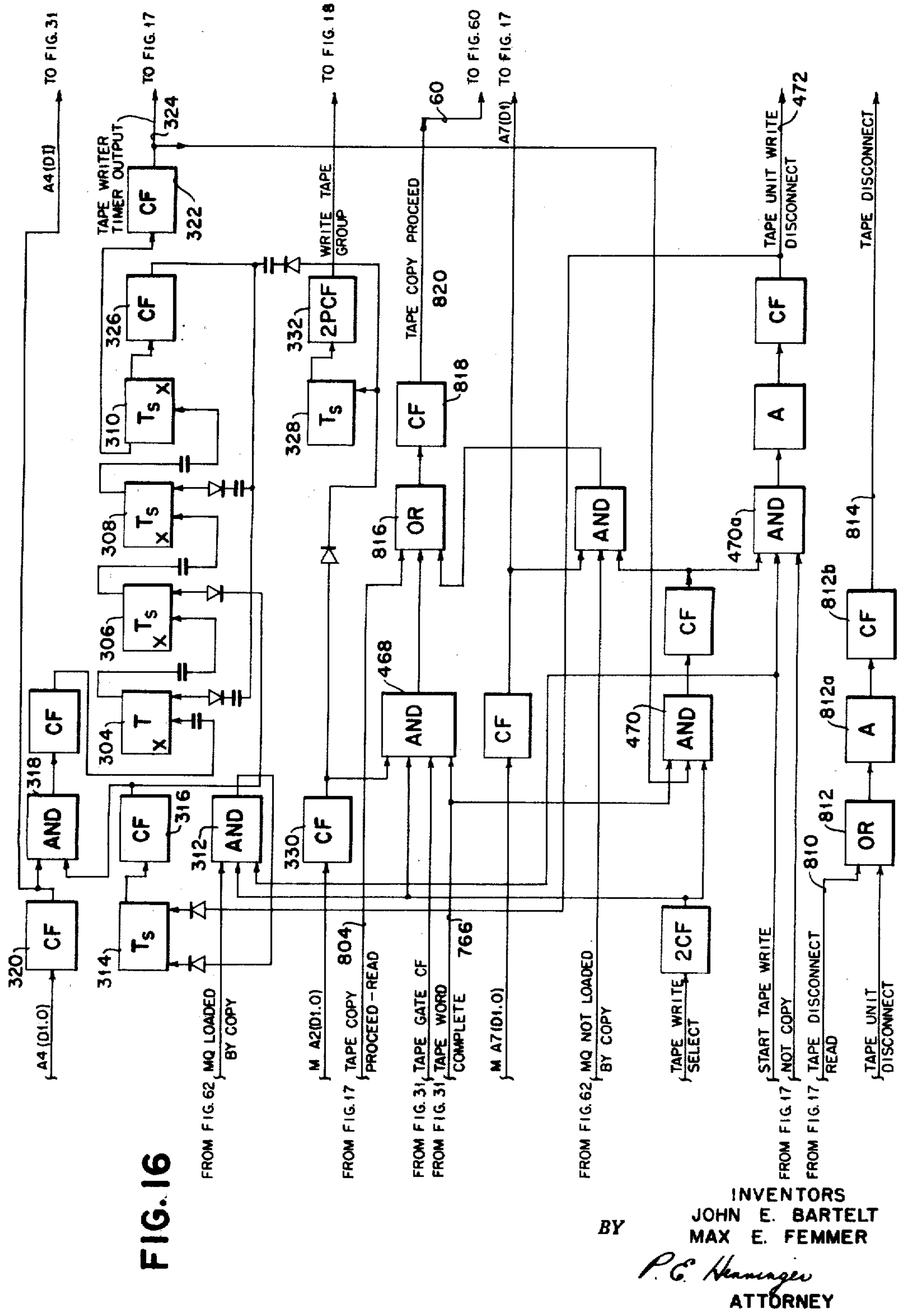
Figure 17:
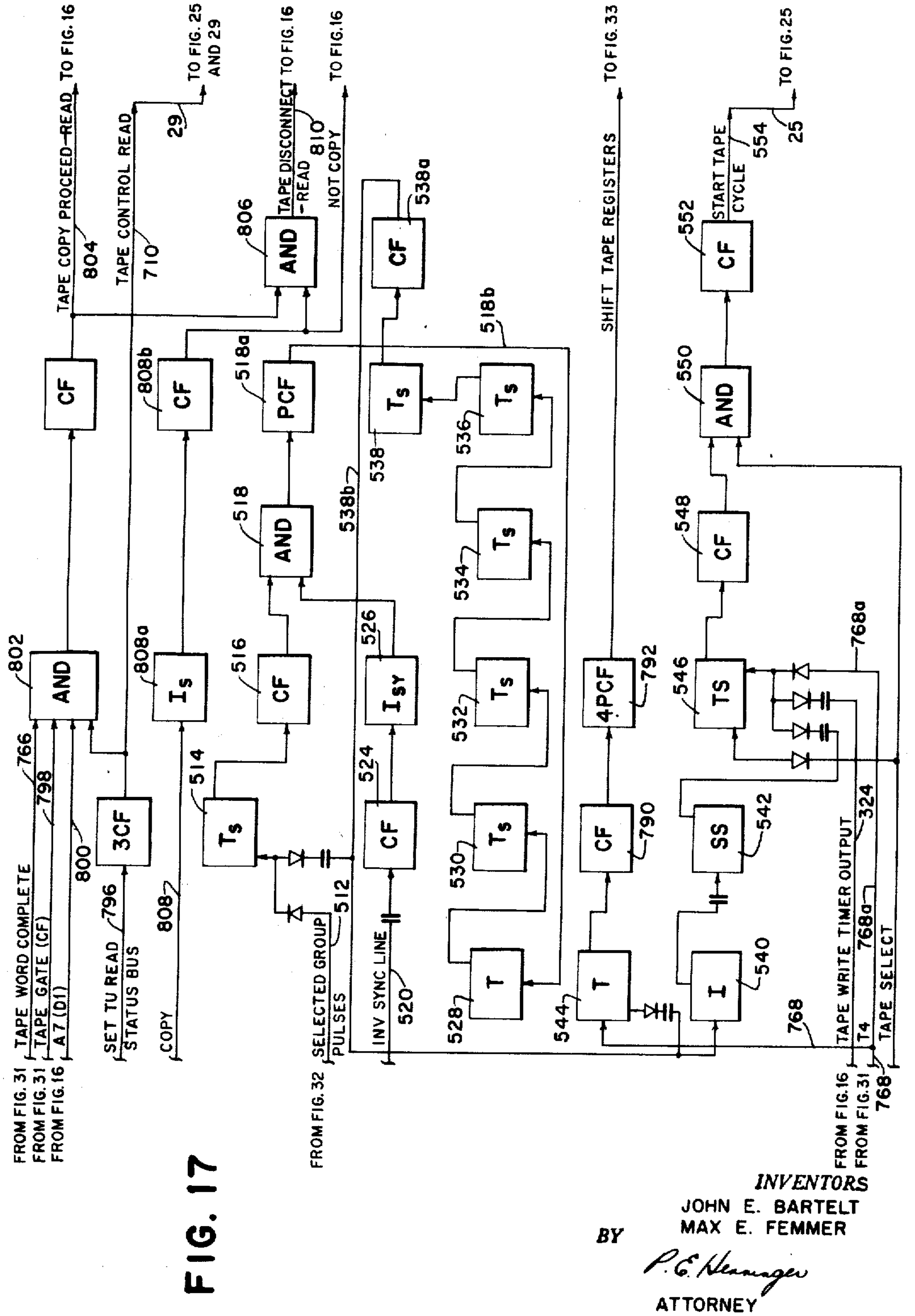
Figure 18:
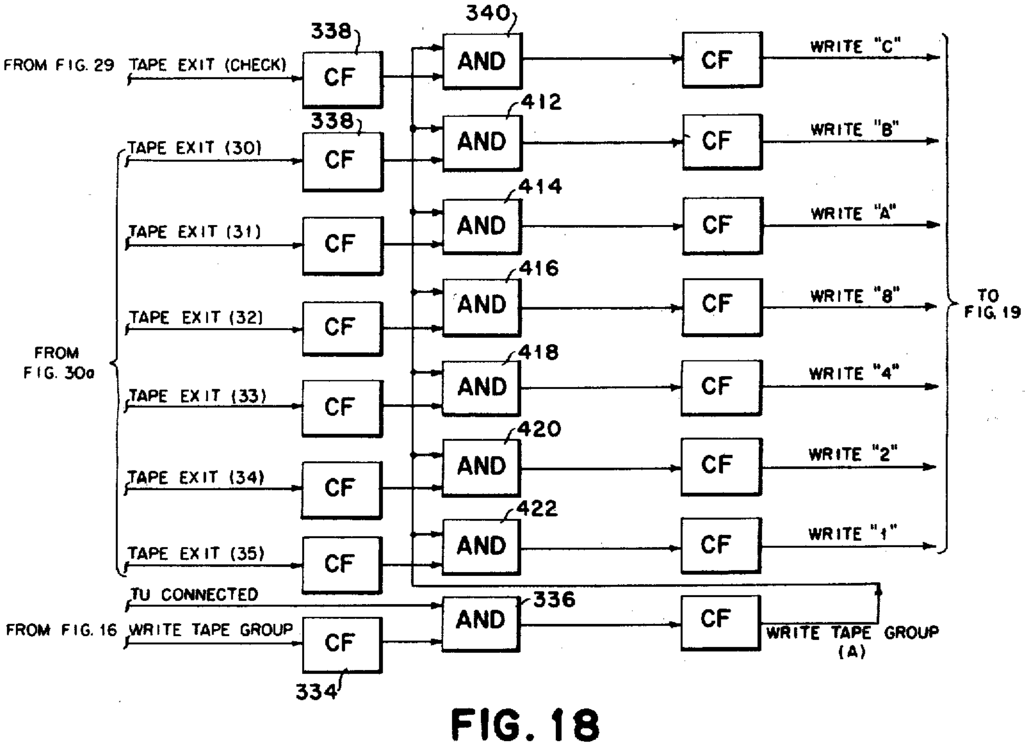
Figure 19:
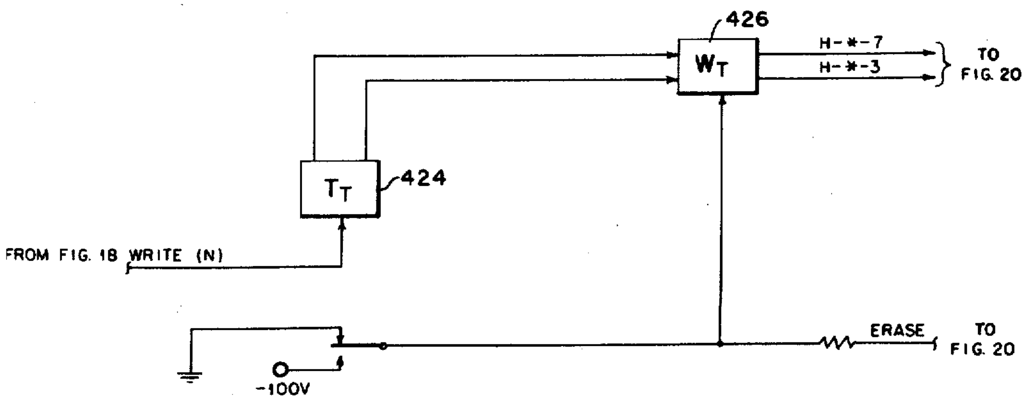
Figures 20, 23:
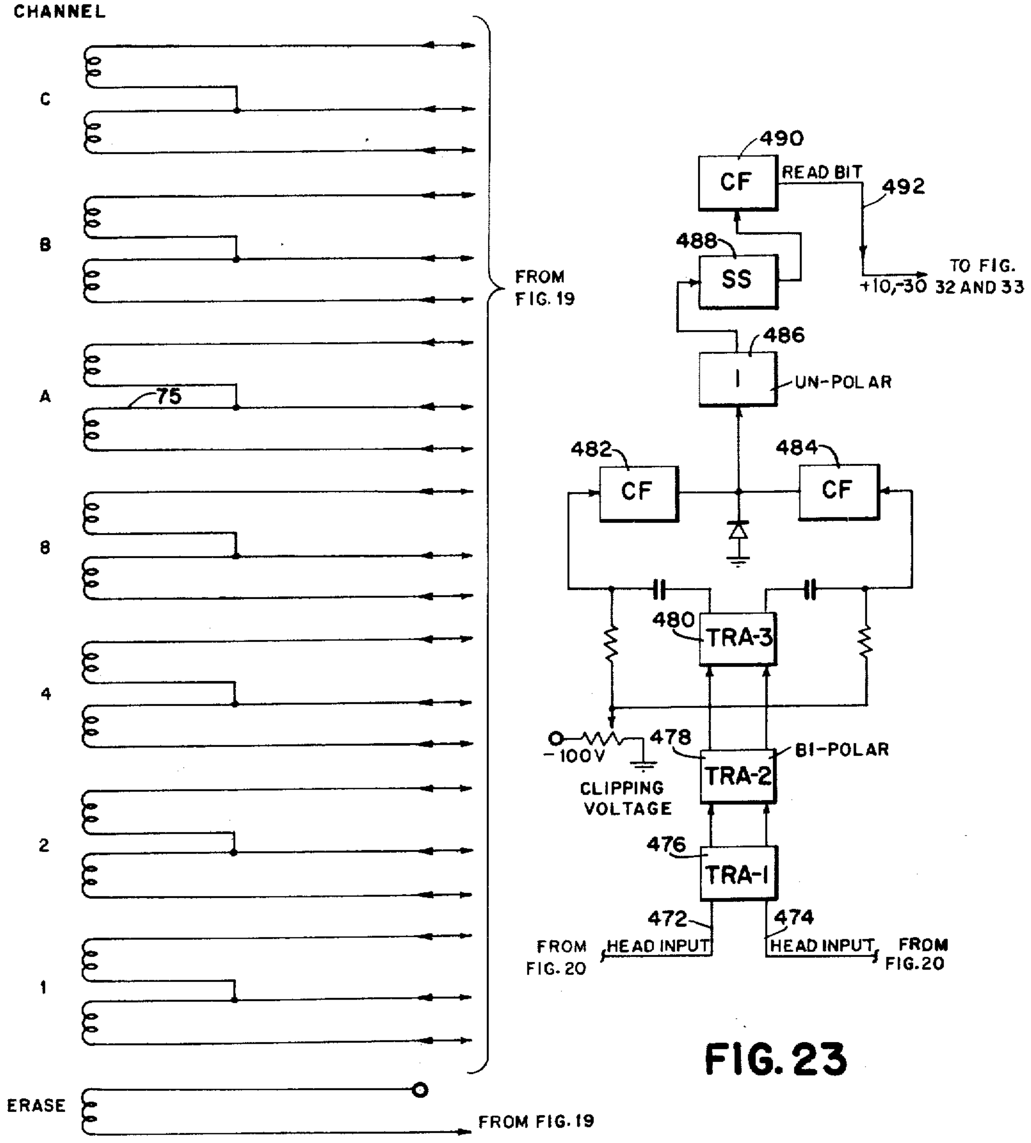
Figure 21:
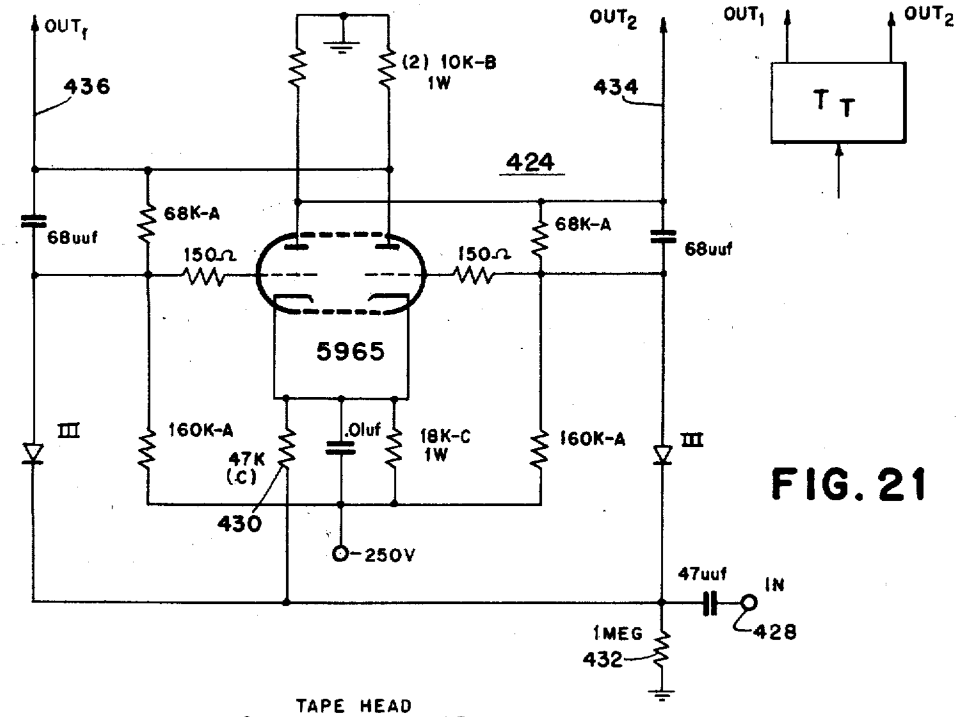
Figure 22:
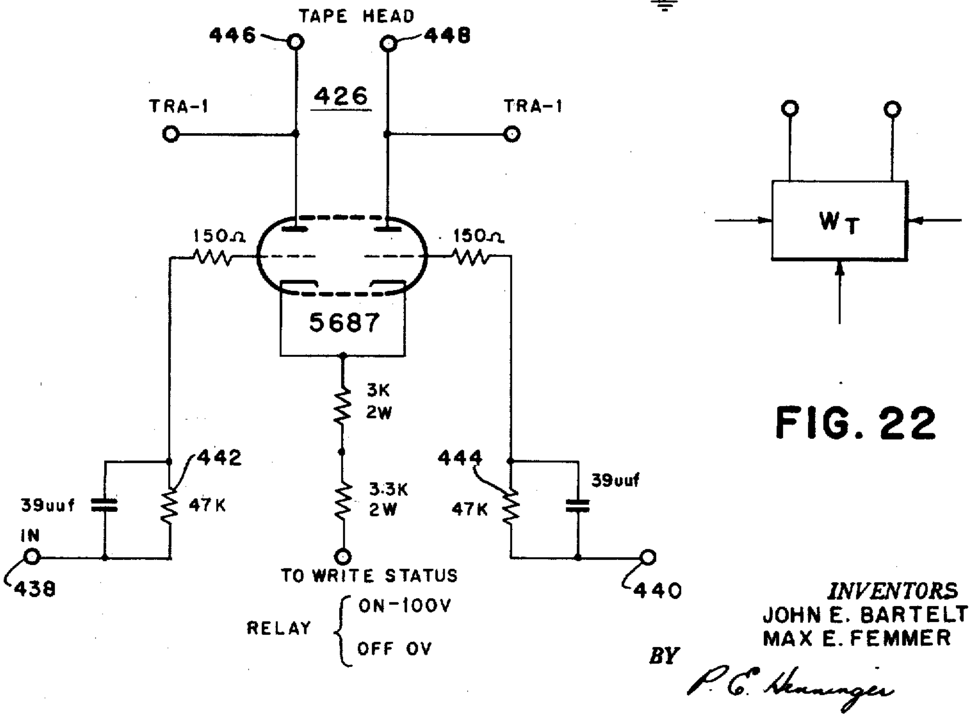
Figure 24:
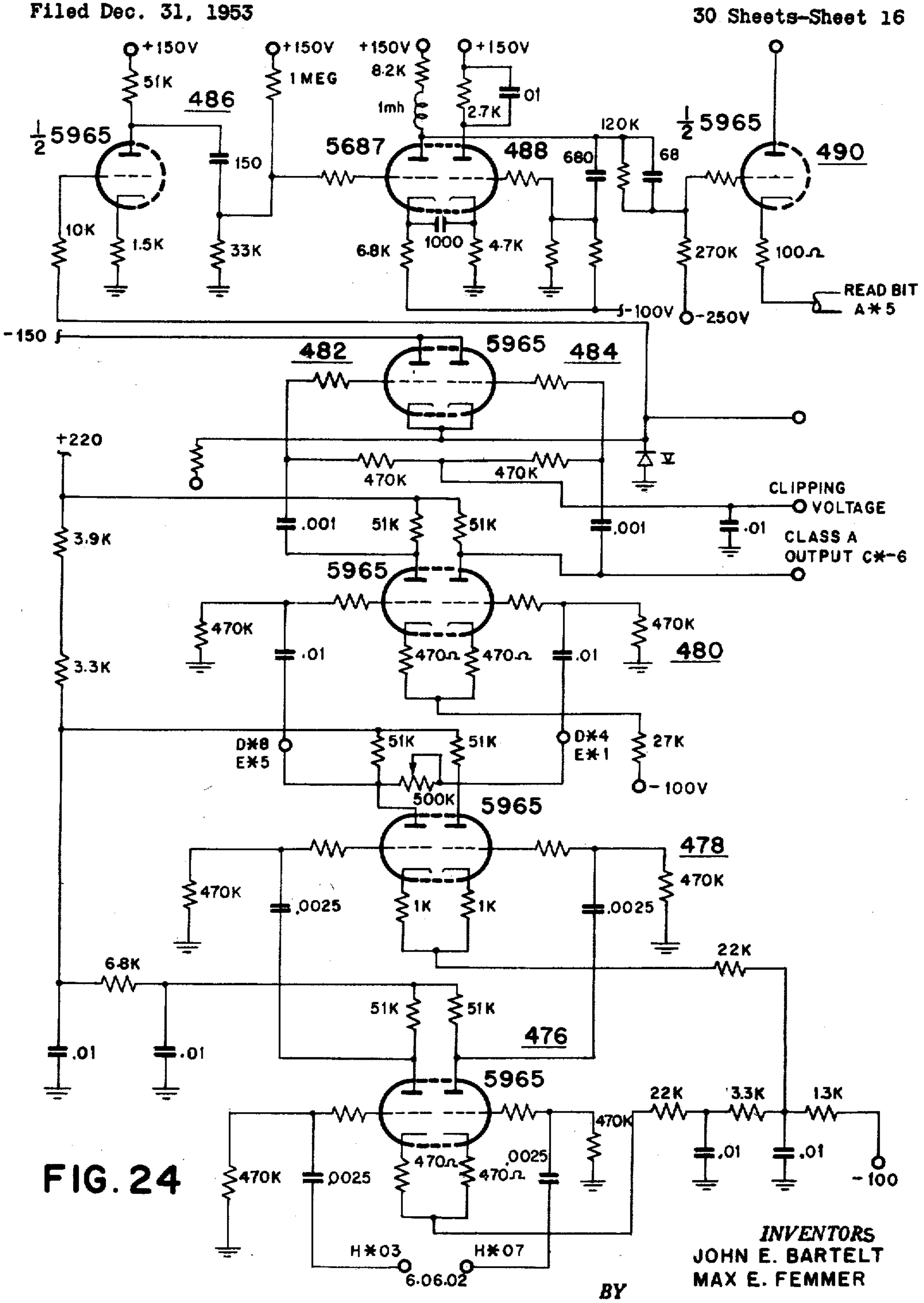
Figure 25:
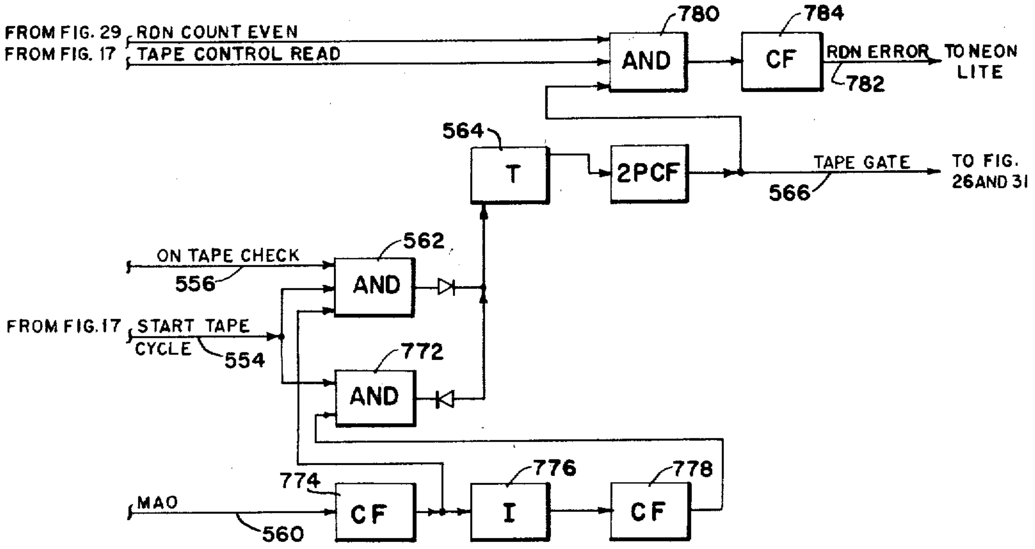
Figure 26:
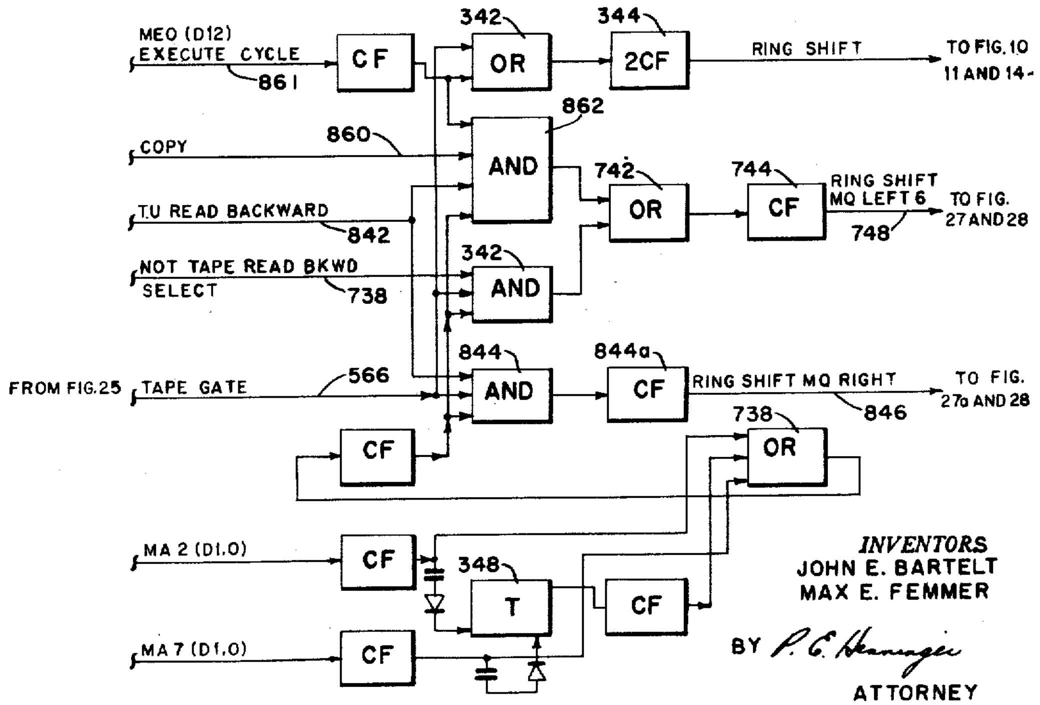
Figure 28:
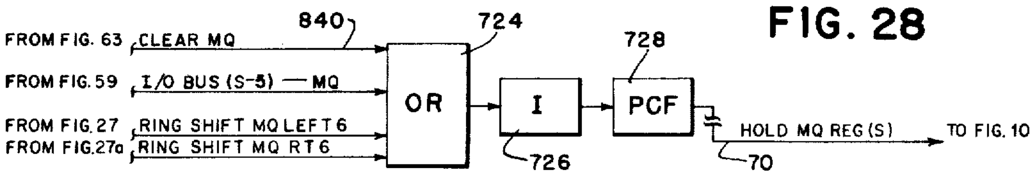
Figure 28A:
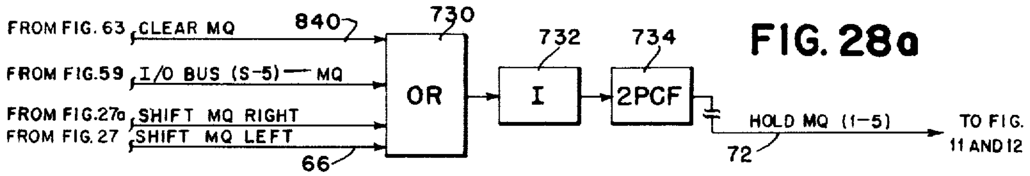
Figure 28B:
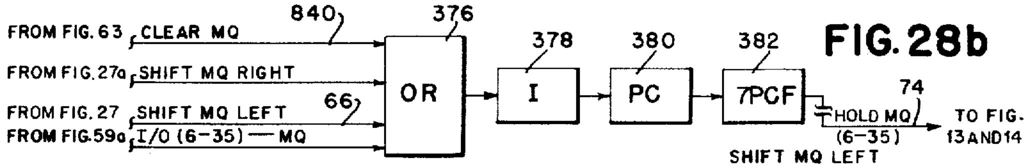
Figure 27:
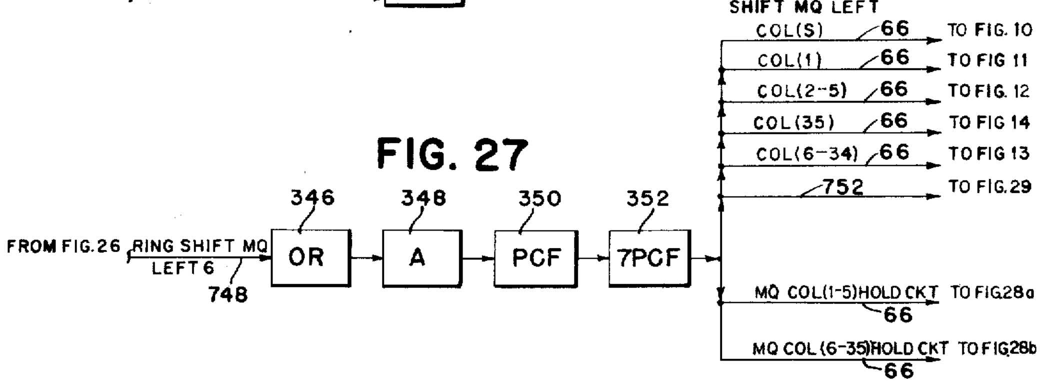
Figure 27A:
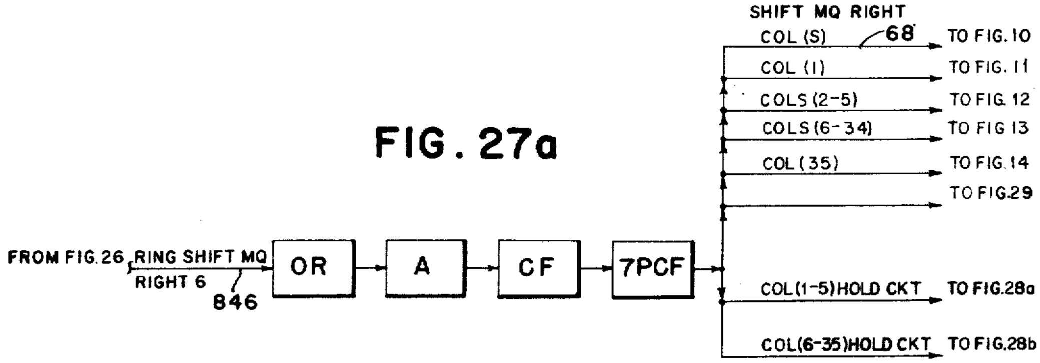
Figure 30:
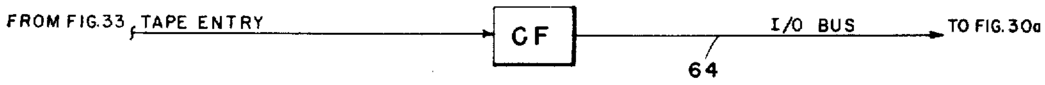
Figure 30A:
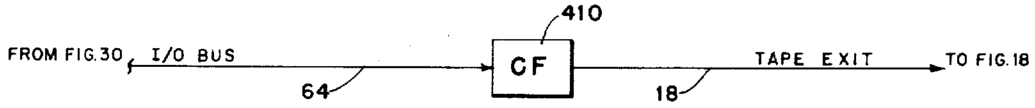
Figure 32:
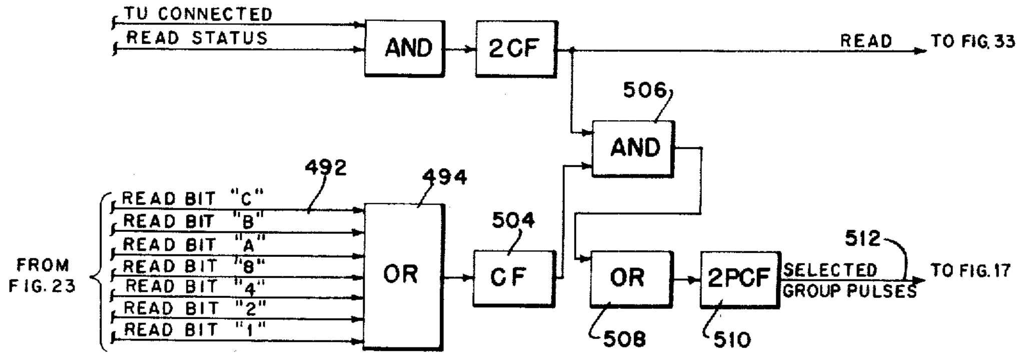
Figure 33:
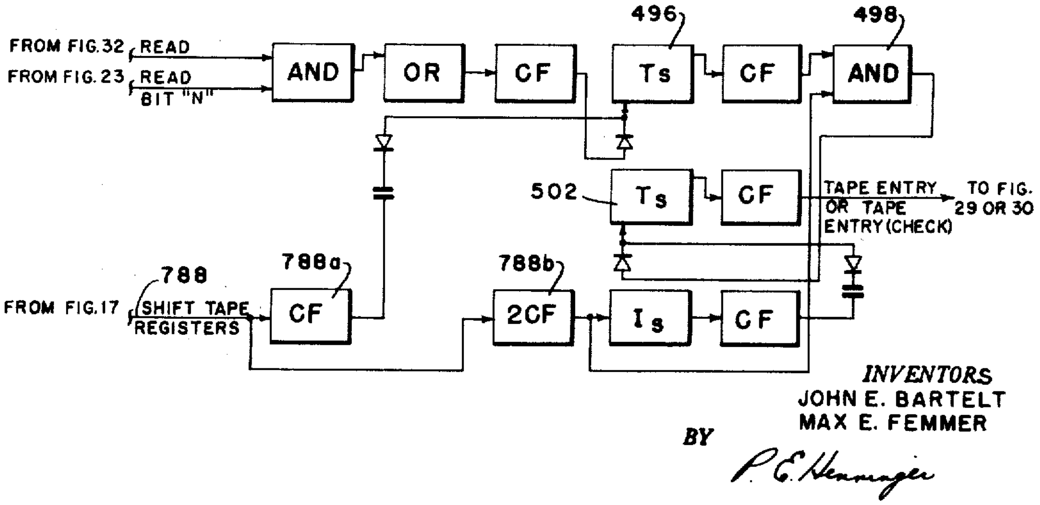
Figure 36:
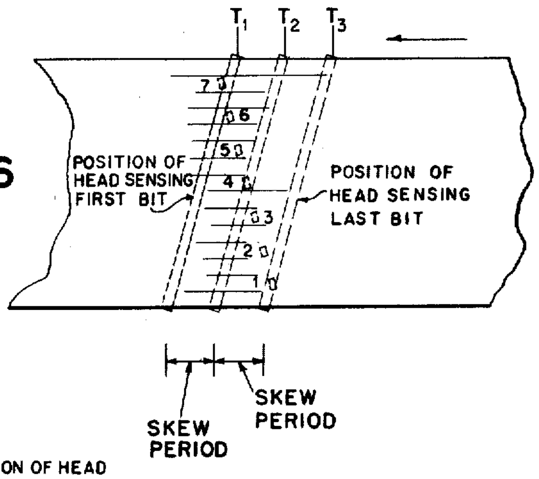
Figure 37:
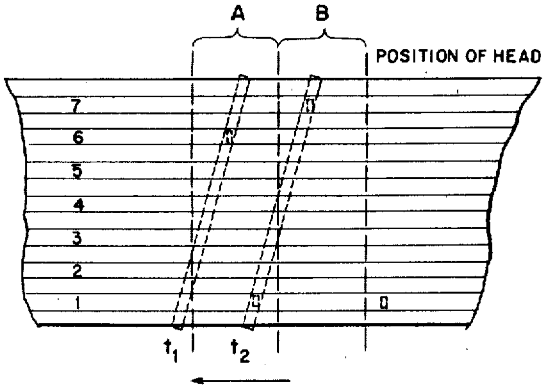
Figure 34:
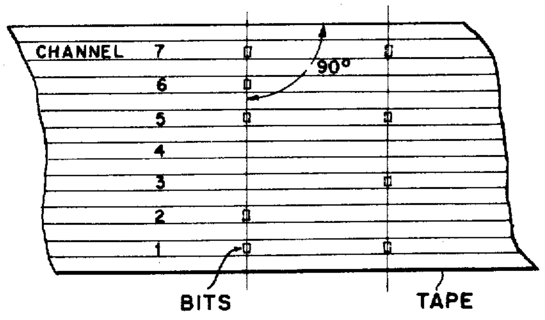
Figure 35:
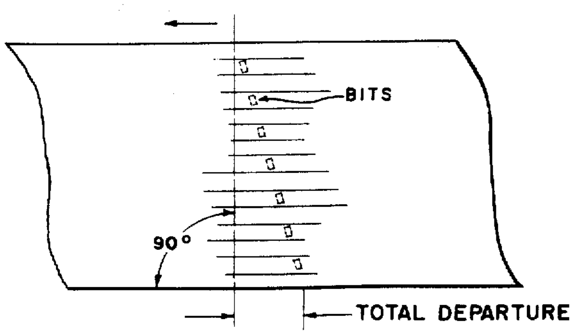
Figure 38:
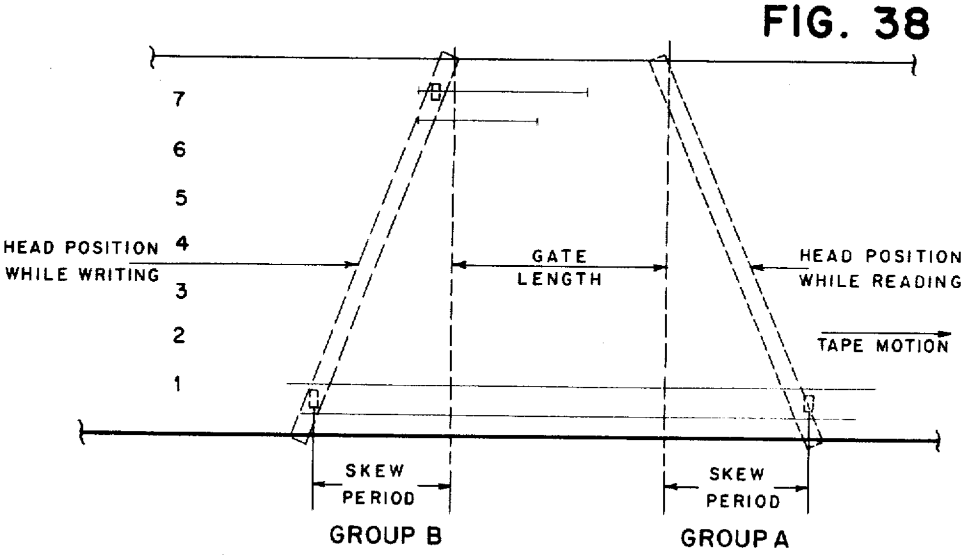
Figure 39:
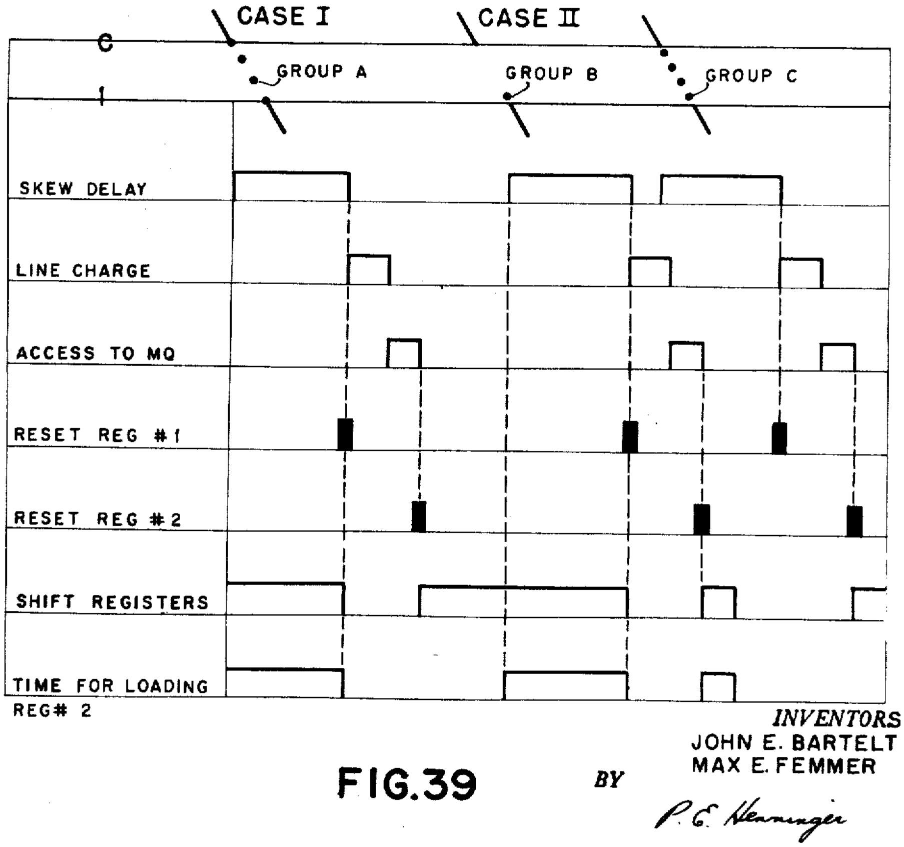
Figure 40:
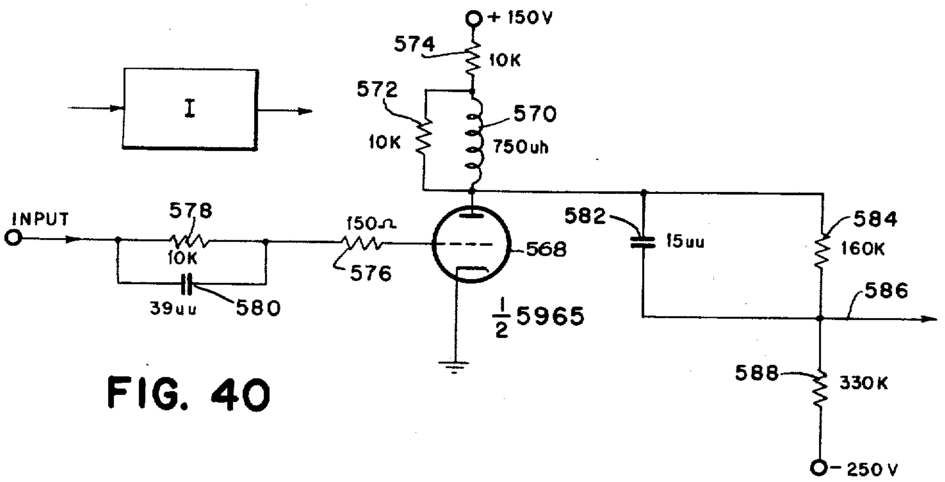
Figure 43:
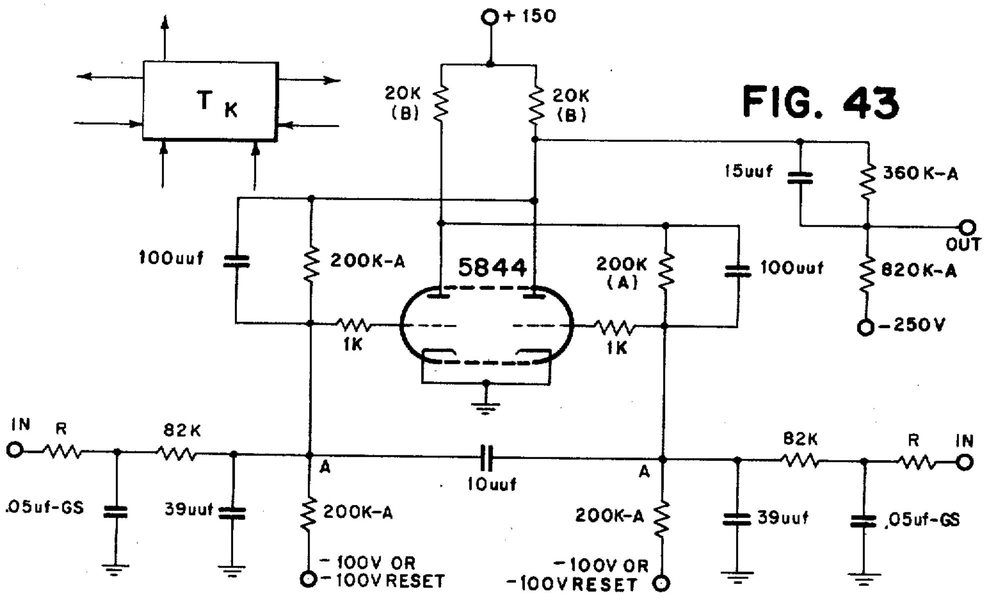
Figure 44:
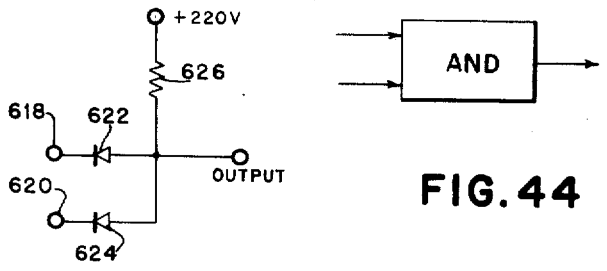
Figure 41:
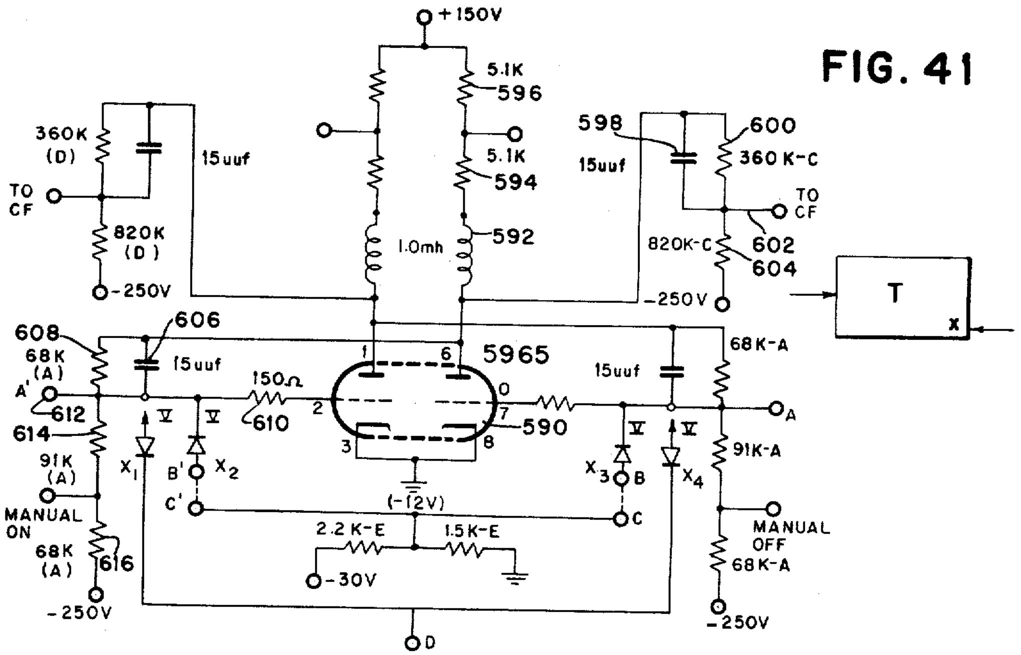
Figure 42:
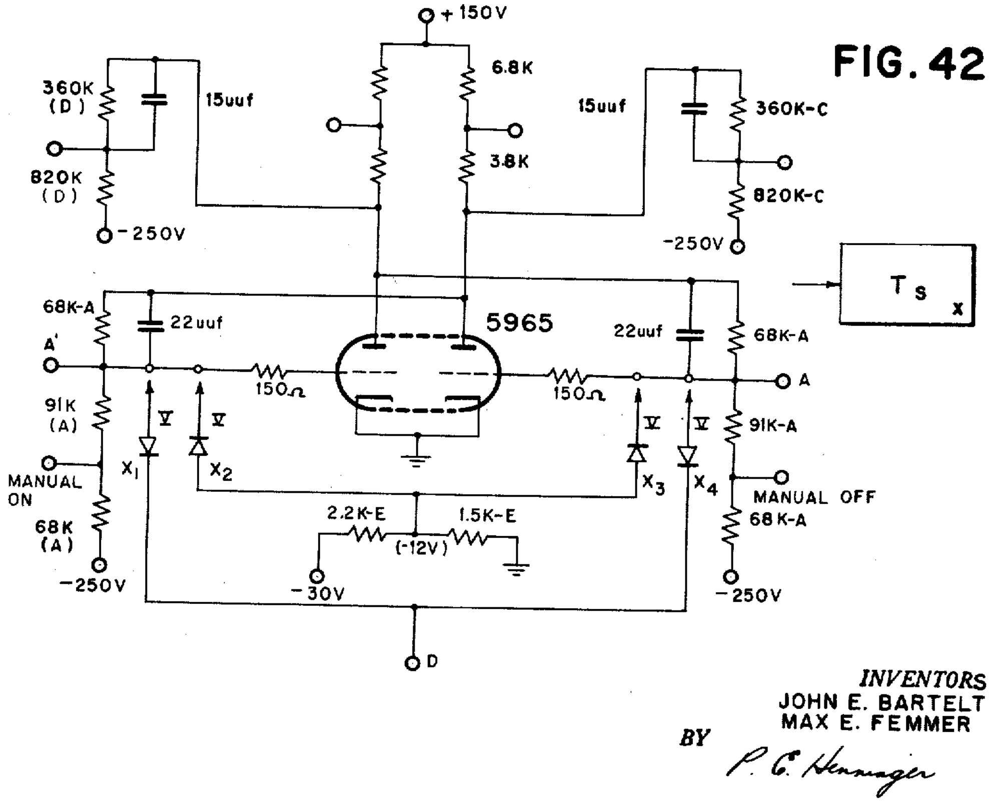
Figure 45:
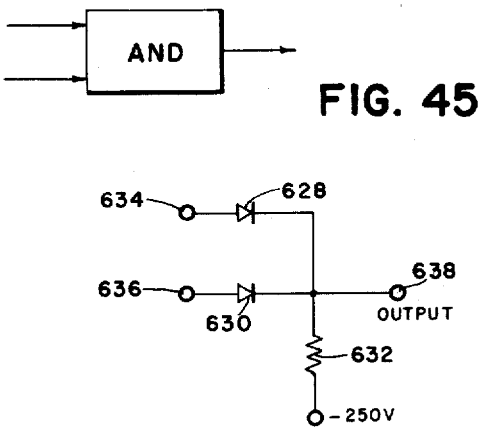
Figure 46:
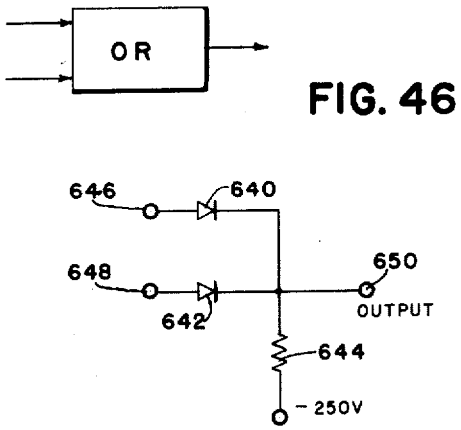
Figure 47:
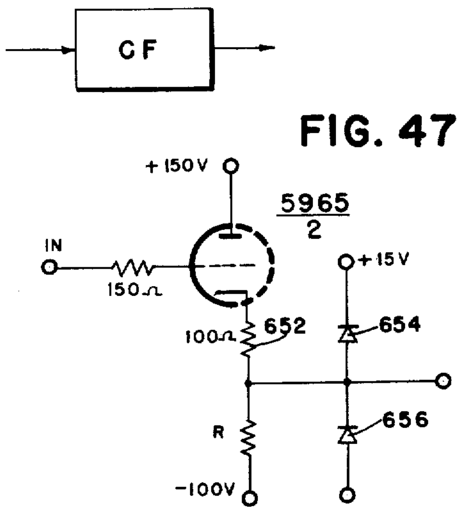
Figure 48:
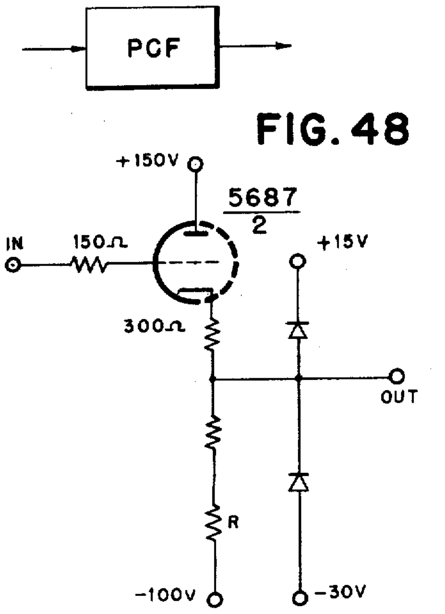
Figure 49:
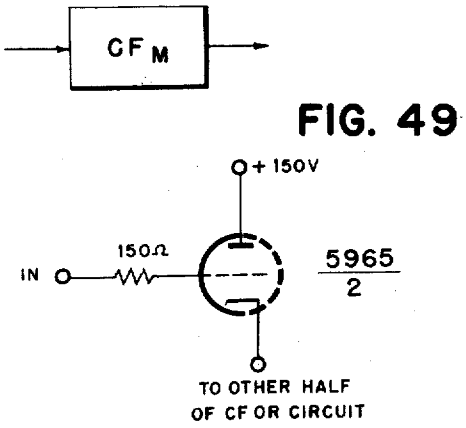
Figure 55:
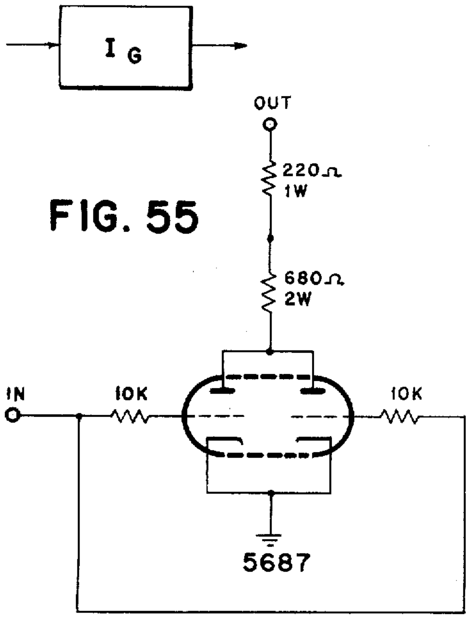
Figure 56:
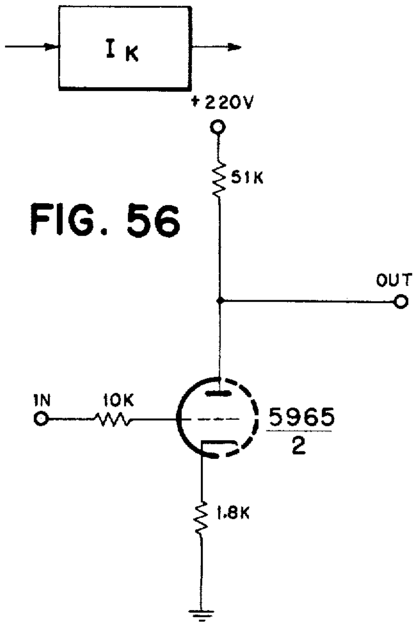
Figure 50:
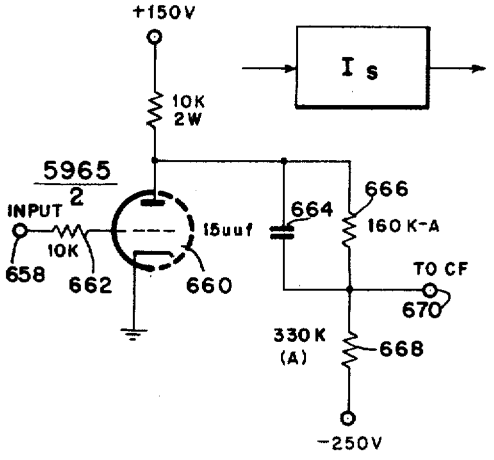
Figure 51:
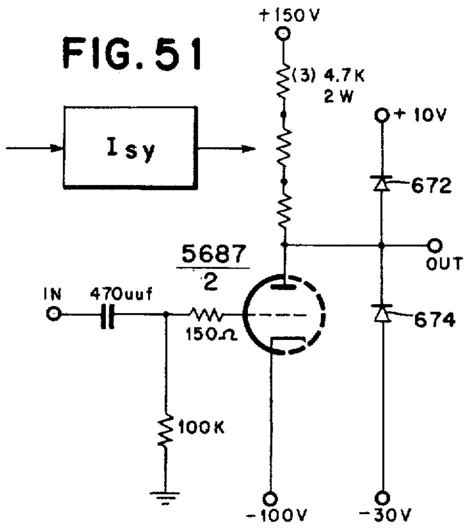
Figure 52:
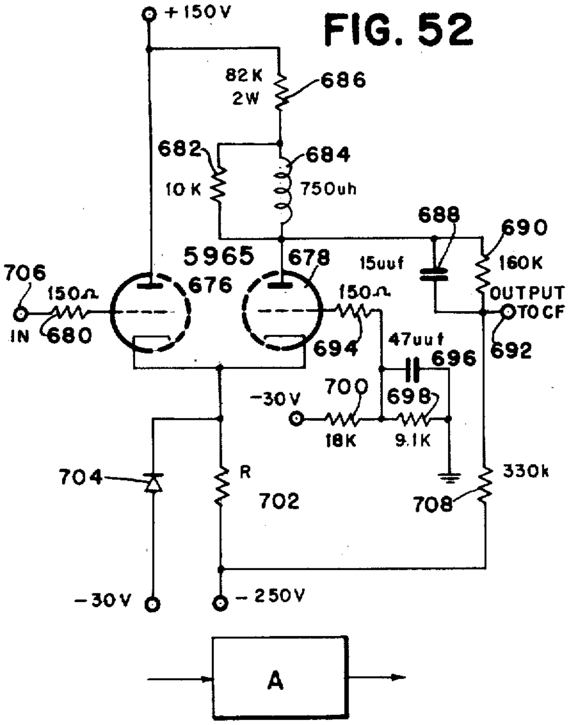
Figure 53:
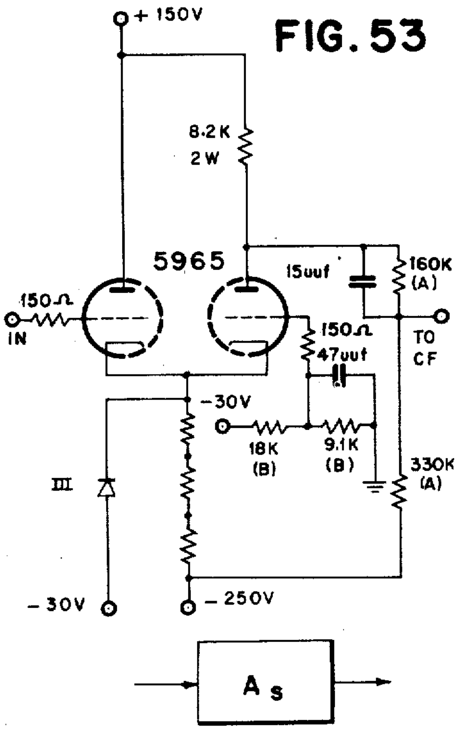
Figure 54:
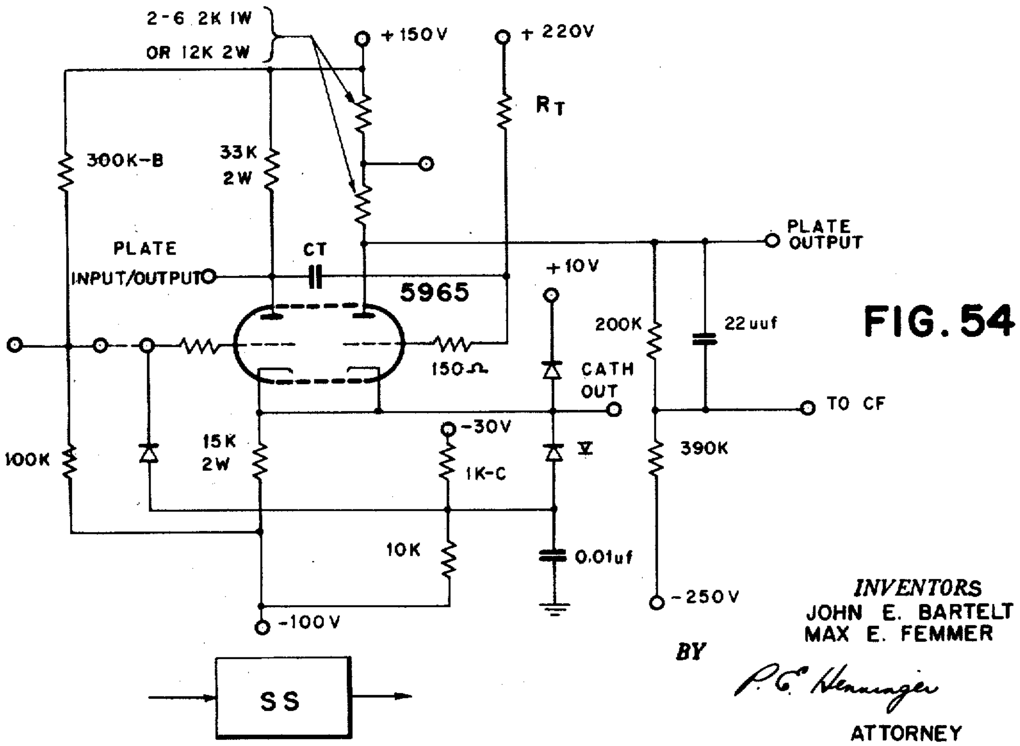
Figure 57:
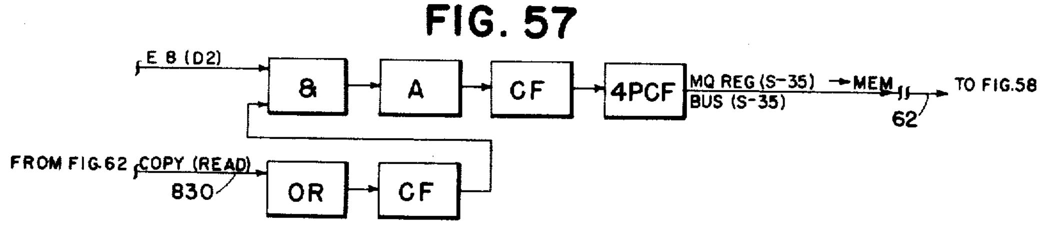
Figure 58:
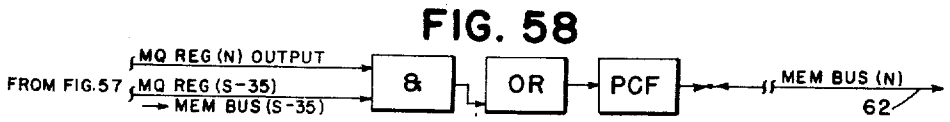
Figure 59:
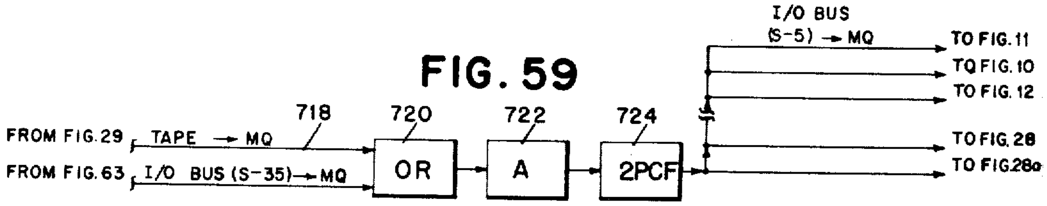
Figure 59A:
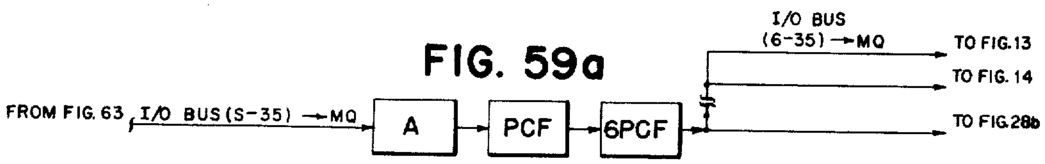
Figure 60:
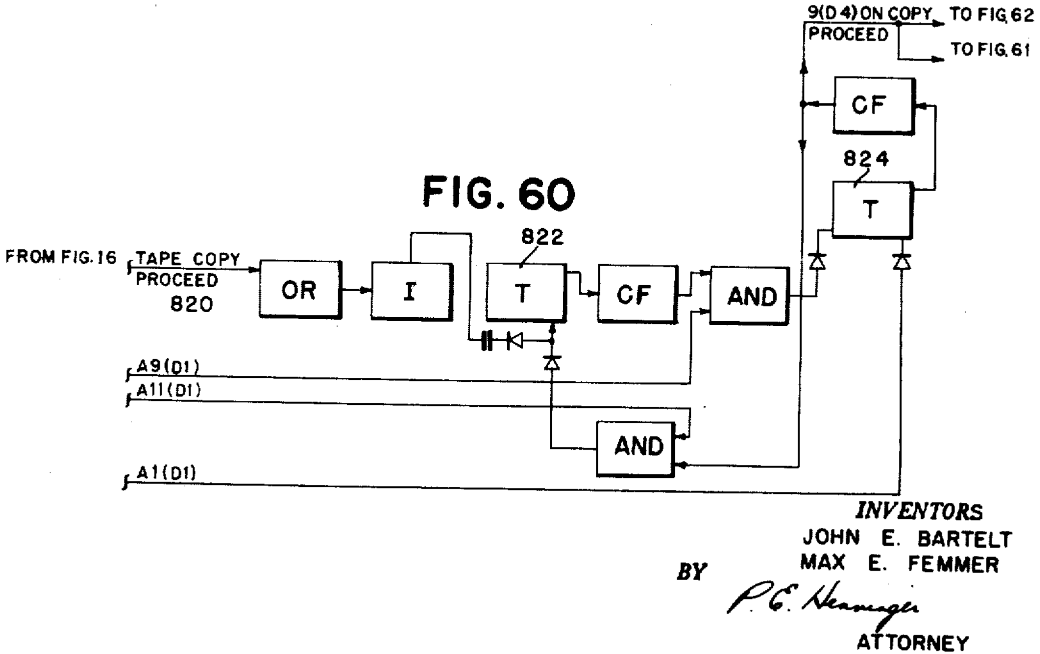
Figure 61:
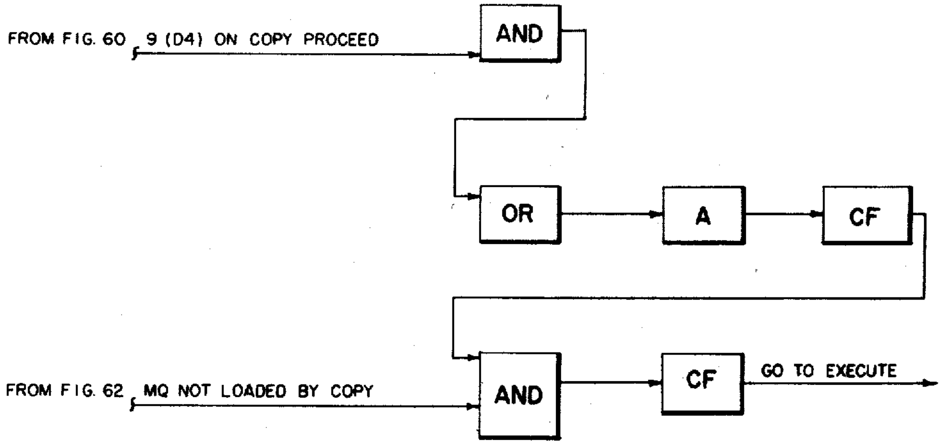
Figure 62:
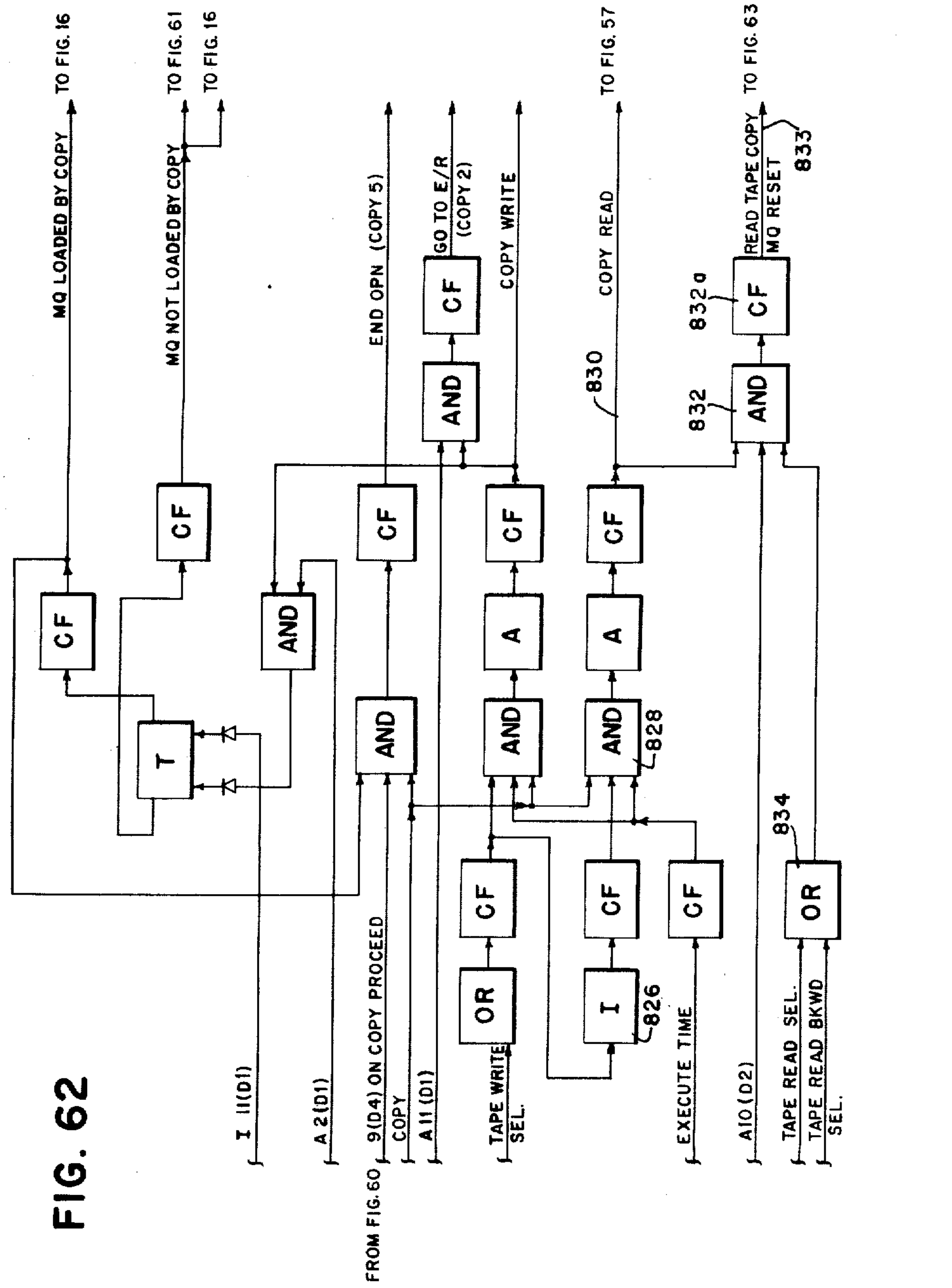

Fig. 4, in diagram form, illustrates the disposition of a binary word of 36 bits in the Multiplier-Quotient Register (hereafter referred to as the MQ Register or as the MQ) forming an important part of this invention;

Figs. 5, 5*a*, 6, 7 and 8, when arranged as indicated in Fig. 9, constitute a master block diagram of the relationship of elements of the input-output device comprising the invention and with other portions of a complete Electronic Data Processing Machine;

Fig. 9 illustrates the arrangement of Figs. 5, 5*a*, 6, 7 and 8, to form a single block diagram;

Fig. 10 is a block diagram of the circuits of MQ Register Column S;

Fig. 11 is a block diagram of the circuits of MQ Register Column 1;

Fig. 12 is a block diagram of the circuits of MQ Register Columns 2 through 5;

Fig. 13 is a block diagram of the circuits of MQ Register Columns 6 through 34;

Fig. 14 is a block diagram of the circuits of MQ Register Column 35;

Fig. 15 illustrates both the detailed wiring diagram and the corresponding block symbol of an electronic Microsecond Delay Unit used in the several columns of the MQ Register;

Fig. 16 is a block diagram of the Tape Write Control circuits including the Tape Write Timer;

Fig. 17 is a block diagram of the Tape Read Control circuits and starting circuit of the device;

Fig. 18 is a block diagram of the Tape Information Control-Write circuits;

Fig. 19 is a block diagram of the Tape Write and Erase circuits;

Fig. 20 illustrates the head coils of a set of Read-Write heads and of the Erase head;

Fig. 21 illustrates both the detailed wiring diagram and corresponding block symbol of a Tape Write trigger supplying a push-pull input to a Tape Write tube;

Fig. 22 illustrates both the detailed wiring diagram and corresponding block symbol of a Tape Write tube supplying current to the Tape Read-Write heads;

Fig. 23 is a block diagram of the Tape Read and Shaping circuits;

Fig. 24 illustrates the detailed wiring diagram of the circuits shown in block form in Fig. 23;

Fig. 25 is a block diagram of the Tape Gate Generator circuits;

Fig. 26 is a block diagram of the Ring Shift Control circuits;

Fig. 27 is a block diagram of the Shift MQ Left circuits;

Fig. 27*a* is a block diagram of the Shift MQ Right circuits;

Fig. 28 is a block diagram of the MQ Register Column S Hold circuit;

Fig 28*a* is a block diagram of the MQ Register Column 1–5 Hold circuits;

Fig. 28*b* is a block diagram of the MQ Register Columns 6–35 Hold circuits;

Fig. 29 is a block diagram of the Tape Redundancy Counter circuits;

Fig. 30 is a block diagram of the Distributor circuits for the MQ Register Columns S through 5;

Fig. 30*a* is a block diagram of the Distributor circuits for the MQ Register Columns 30 through 35;

Fig. 31 is a block diagram of the Tape Group Counter circuits;

Fig. 32 is a block diagram of the Tape Information Control-Read circuits;

Fig. 33 is a block diagram of the Tape Registers circuits;

Fig. 34 is a diagrammatic illustration of a section of magnetic tape showing an ideal spacial relationship of recorded bits thereon;

Fig. 35 is a diagrammatic illustration of a section of magnetic tape showing a departure from the ideal alignment of recorded bits thereon, due to Skew;

Fig. 36 is a diagrammatic illustration of a section of magnetic tape illustrating an aggravated condition of combined Skew, due to the presence of Skew while writing on tape and the presence of Skew while reading from tape;

Fig. 37 is a diagrammatic illustration of a section of magnetic tape showing the undesired reading of bits in successive groups of bits, by the same reading head in one reading period which could be produced by Skew, when the respective groups are insufficiently spaced from each other;

Fig. 38 is a diagrammatic representation of the factors entering into the calculation for determining the proper length of a Skew gate to avoid the condition of Fig. 37;

Fig. 39 is a timing diagram in which two cases of Skew are represented;

Fig. 40 illustrates both the detailed wiring diagram of an inverter used in the invention and its corresponding block symbol;

Fig. 41 illustrates both the detailed wiring diagram of a high speed trigger circuit and its corresponding block symbol;

Fig. 42 illustrates both the detailed wiring diagram of a slow speed trigger circuit and its corresponding block symbol;

Fig. 43 illustrates both the detailed wiring diagram of a key controlled trigger circuit and its corresponding block symbol;

Fig. 44 illustrates both the detailed wiring diagram of a diode "AND" circuit and its corresponding block symbol;

Fig. 45 illustrates both the detailed wiring diagram of a diode "–AND" circuit and its corresponding block symbol;

Fig. 46 illustrates both the detailed wiring diagram of a diode "OR" circuit and its block corresponding symbol;

Fig. 47 illustrates both the detailed wiring diagram of a cathode follower circuit and its corresponding block symbol;

Fig. 48 illustrates both the detailed wiring diagram of a power cathode follower circuit and its corresponding block symbol;

Fig. 49 illustrates both the detailed wiring diagram of a cathode follower, used as a mixer in the tape reading circuits, and its corresponding block symbol;

Fig. 50 illustrates both the detailed wiring diagram of a slow speed inverter circuit and its corresponding symbol;

Fig. 51 illustrates both the detailed wiring diagram of a sync pulse inverter and its corresponding symbol;

Fig. 52 illustrates both the detailed wiring diagram of a grounded grid amplifier and its corresponding symbol;

Fig. 53 illustrates both the detailed wiring diagram of a slow amplifier and its corresponding symbol;

Fig. 54 illustrates both the detailed wiring diagram of a single-shot multivibrator and its corresponding symbol;

Fig. 55 illustrates both the detailed wiring diagram of a special inverter and its corresponding symbol;

Fig. 56 illustrates both the detailed wiring diagram and corresponding symbol of a still further special inverter;

Fig. 57 is a block diagram of the MQ Register (S–35) into memory Bus (S–35) circuits;

Fig. 58 is a block diagram of certain Memory Bus switching circuits;

Fig. 59 is a block diagram of the circuits for Input-Output Bus orders S through 5 into the MQ Register;

Fig. 59*a* is a block diagram of the circuits for Input-Output Bus orders 6–35 into the MQ Register;

Fig. 60 is a block diagram of the Copy Proceed circuits;

Fig. 61 is a block diagram of the Enter Execute circuits;

Fig. 62 is a block diagram of the Copy Execution Timer; and

Figure 63:
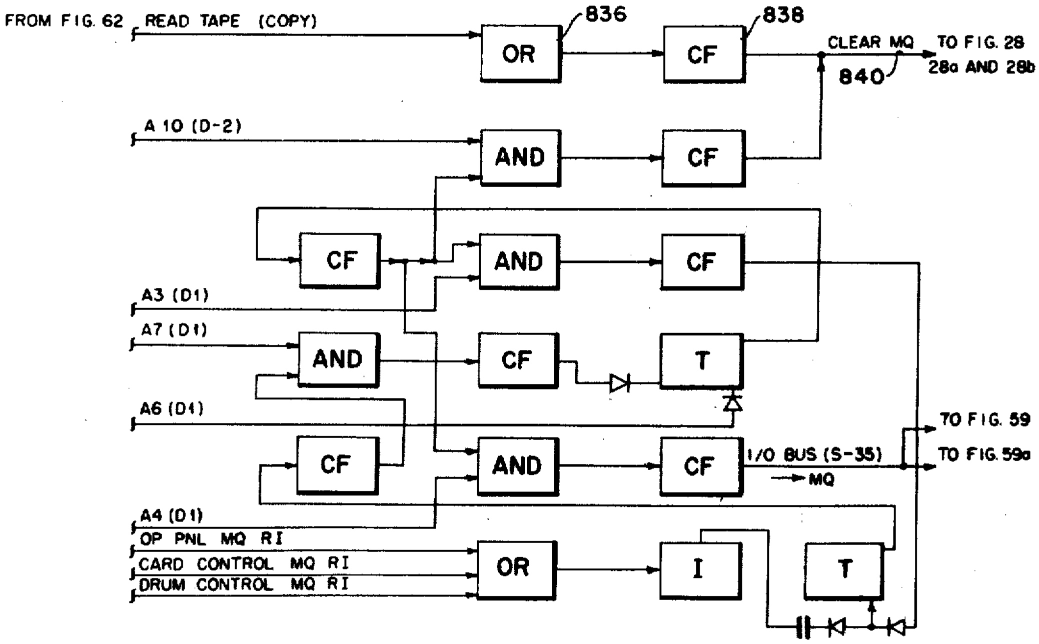

Fig. 63 is a block diagram of the MQ Register Reset circuits.

The magnetic tape units herein disclosed may be classified as an input-output device of an Electronic Data Processing Machine including electrostatic storage with which they are to be associated because they have the property of being able to receive information from, or transmit information to, such a machine. Specifically, the novel device is capable of transmitting information both to and from electrostatic storage and may be regarded as an auxiliary storage mechanism, as distinguished from the electrostatic storage which is the "working" storage of the Electronic Data Processing Machine.

Figure 1:
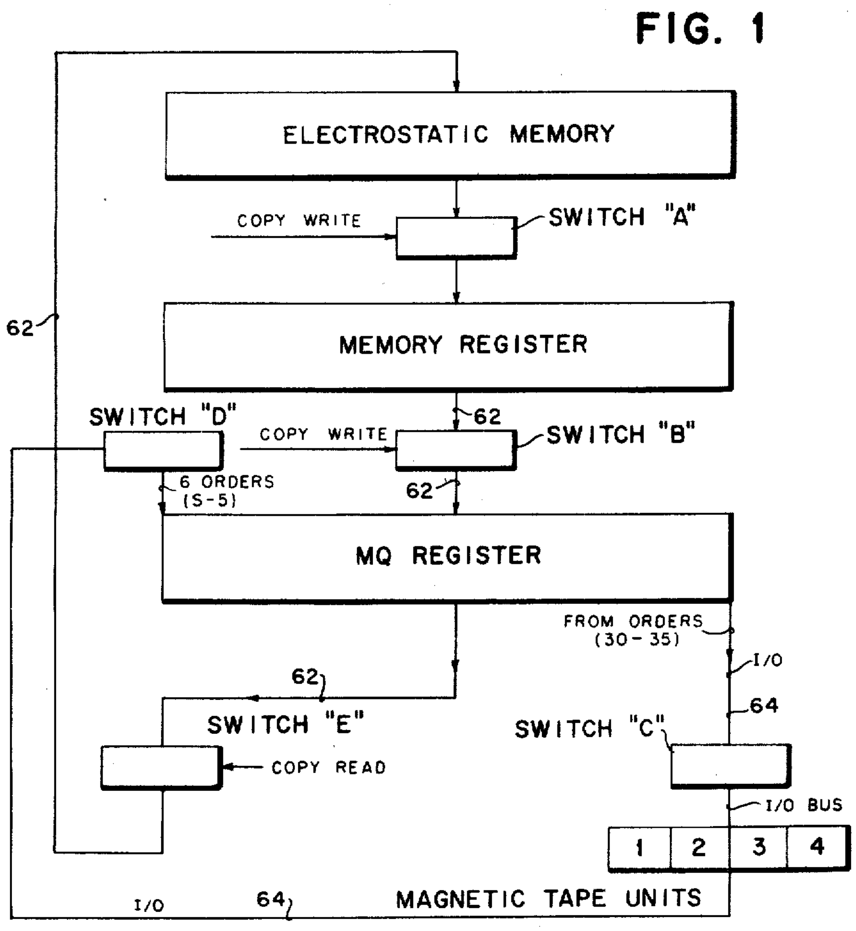
Fig. 1 is a diagram showing in block form the switching arrangement for controlling the flow of data between the magnetic tape input-output devices of this invention and a plurality of registers comprising components of an Electronic Data Processing Machine including Electrostatic Memory, to which this invention pertains.

As indicated in Fig. 1 of the drawings, there are four tape handling units 1, 2, 3 and 4; each containing a magnetic tape of any length up to 1400 feet. The tape itself is preferably ½" wide, oxide-coated and non-metallic. Each of these tape units is of the type disclosed in the James A. Weidenhammer et al. application for patent, Serial No. 290,396, filed May 28, 1952, entitled "Tape Feeding Mechanism." Said Weidenhammer et al. application for patent relates to a tape drive mechanism for feeding a magnetic record tape through reading and/or writing heads, and it contemplates the feed of a record tape through reading and writing heads at a speed of more than 200 feet per second, with an acceleration and deceleration time of not more than .005 second, and with the ability to reverse direction of tape feed in ten milliseconds or less.

Data for use in the Electronic Data Processing Machine is recorded on the tape in six channels that run parallel to the length of the tape. A bit, of information, is represented, by either a change in the flux pattern or a quiescent state in the flux pattern, of a certain spot area in a channel. In a binary system, as in the present case, it is necessary to store only a –1– or a –0–. Normally, a plus flux pattern is used to represent a –1– and a negative flux pattern to represent a –0–. In the present system, however, the information is recorded on the tape by the so-called "non-return to zero" system wherein it is a change in the flux pattern that denotes a binary –1– while a binary –0– is indicated by the quiescent (no-change) state of flux as a function of time. Stated in other words, it is the transition of the state of flux which determines a binary –1–. In the detection of a binary –1– the reading circuit makes use of the fundamental fact that there is voltage induced in a coil whenever there is a change in flux which energizes the coil. Therefore, a binary –1– is sensed, by the voltage that the transition in flux causes in a reading coil, and a binary –0– is recognized when no change in the flux pattern takes place, in reference to a time scale. The advantages of the "non-return to zero" system are higher density of bit packing, higher output when reading and easier erasing.

A set of six bits, recorded in a line transverse of the tape, will herein be referred to as a group. Six groups, recorded serially lengthwise of a tape, are used to store one binary word of 36 bits (for example, 35 numerical digits and a sign). A seventh channel on the tape receives or does not receive a redundancy bit. That is, either a –1– is recorded in the seventh channel, or a zero is indicated by no change, depending upon whether the number of binary ones, in the other six channels, is even or odd, respectively, so that across the seven channels there is invariably an odd number of –1's–, in each set of seven bits. When the tape is read, the number of –1's– is automatically checked and if the number is even, the operator is warned that the number of –1's– in the group does not check. If the number of –1's– is odd, as it should be when correct, the machine continues the reading process.

Figure 2:
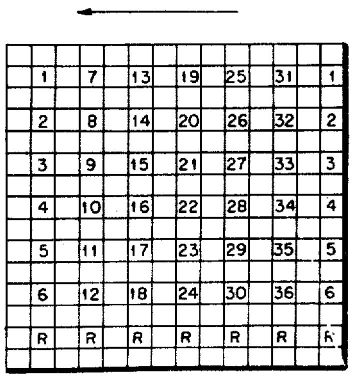
Fig. 2 is a diagrammatic representation, on an enlarged scale, of a section of magnetic tape showing thereon the disposition of a partial word, and a complete word composed of 36 bits disposed on the surface of the tape in six parallel groups, each cross-section consisting of six bits, of the word, and a redundancy check bit.

A schematic diagram of how a word of 36 bits is recorded on tape is shown in Fig. 2. Each number in that figure denotes a binary –1– or –0– recorded in that position on the tape. The 36 bits, recorded in a group of six recording channels, represent a full word and its sign. When the tape moves in the direction of the arrow of Fig. 2, the group containing numbers 1 through 6 and the letter R, will contain the sign, the first five bits of a word and a check bit (in the seventh channel) whenever required. The succeeding five groups contain the following bits of the word, in groups of six, plus the respective check bit whenever required. Thus, the second column contains bits 6 through 11 of the word and the check bit, the third column contains bits 12 through 17 and the check bits, etc.

Figure 3:
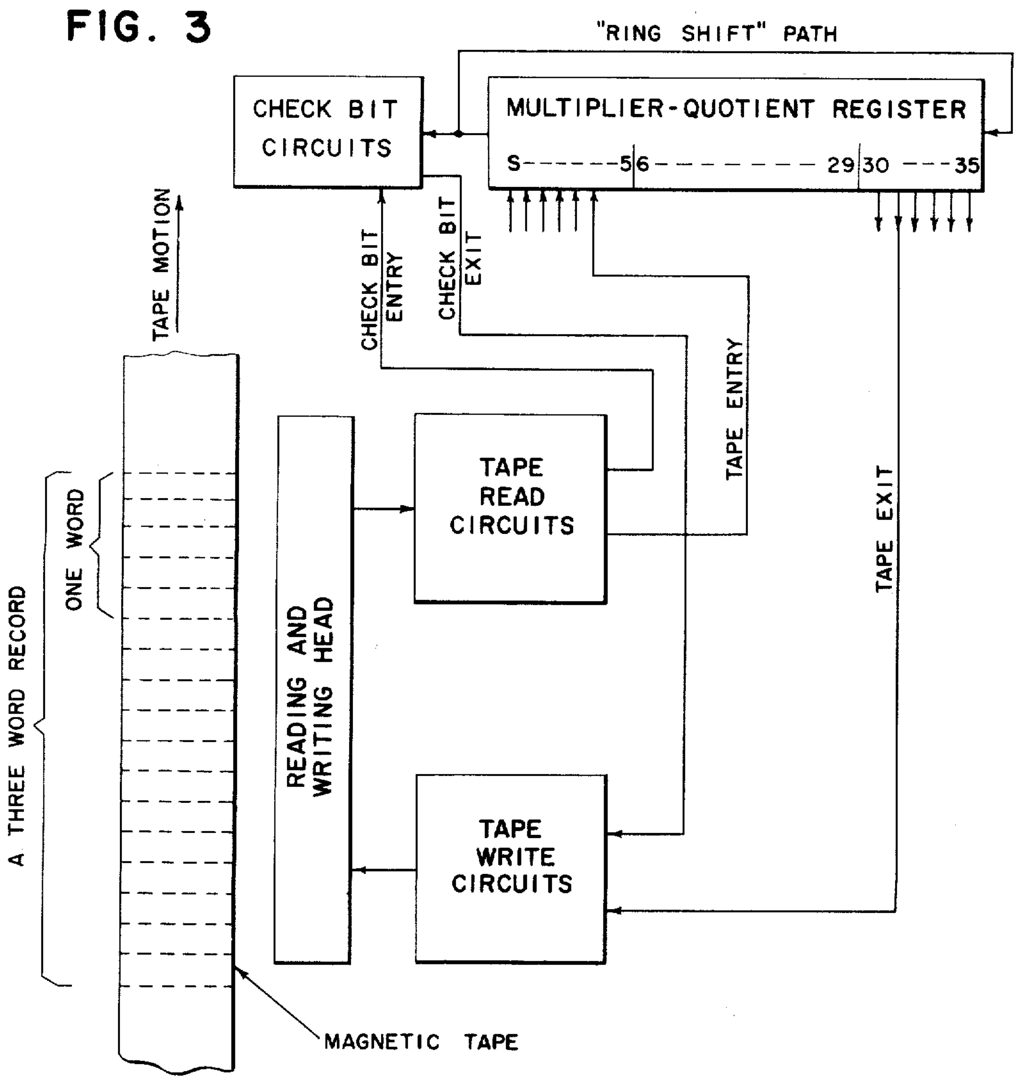
Fig. 3 is a diagram showing the magnetic tape reading and writing information flow.

In Fig. 1 of the drawings, there has been schematically shown four tape drive units, i. e., devices such as in the Weidenhammer et al. application above noted, for moving tapes through the read-write heads. This implies the selection of one out of four tapes for a reading or writing operation. However, the present application does not concern itself with selection of one out of four tapes but may be fully treated in a discussion of the operation of a single tape unit, such as schematically shown in Fig. 3. In this single tape unit Tape Read circuits control the reading of a full word of 36 bits of data from a magnetic tape and the transfer of this word into a register while the Tape Write Circuits control the transfer of one word out of a register and its recordation on tape.

The input-output device of the present invention comprises a part only of an Electronic Data Processing Machine including a high speed Electrostatic Memory, as shown in Fig. 1, together with various other data storage devices.

By reference to Fig. 1, it may be seen that a word located in the Electrostatic Memory may, via suitable switches, be transferred into a Memory Register and from there to a so-called Multiplier-Quotient Register hereinafter designated as the MQ or the MQ Register. This register derives its name from the fact that it is adapted to hold multipliers "M" and quotients "Q" used during the computing operations performed in the main machine which, per se, forms no part of this application.

By continued reference to Fig. 1, it will be seen that a word of 36 bits entered into the MQ Register from Memory may be recorded on a tape and such word after being read from tape into the MQ Register, may be transferred to the Electrostatic Memory through switching mechanisms indicated diagrammatically in Fig. 1.

In order to limit the size of the specification and the number of sheets of drawings, the disclosure is limited to the invention claimed herein, which is a part only of a complete Electronic Data Processing Machine including an Electrostatic storage unit. To limit the specification to this invention, it is assumed that certain signals, which merely serve as source signals, for the novel tape device, are produced by other portions of the complete machine and are, therefore, assumed in this application to be already in existence. The generation of such signals may be the subject of another invention but are not germane to the novel input-output device claimed herein. In this category are timing pulses generated in the Time Pulse Generator (Fig. 5) and signals generated in the Tape Motion and Status Control circuits (Fig. 7), for example. It is believed that from the diagrammatic illustration of Fig. 1 and the master block diagram of Figs. 5, 5*a*, 6, 7 and 8, the inter-relationship of the device claimed herein with its associated parts of the Electronic Data Processing Machine, will be sharply defined. The production of signals, such as Tape Unit Write Disconnect and Tape Disconnect, for example, which are outputs of the Tape Write Control circuits (Fig. 16), will be described briefly herein, while their function, with regard to the Main Machine, will merely be stated.

The scope of the present invention, therefore, will be limited to the means for producing and controlling the flow of information between the MQ Register and a Tape Unit, when writing on the tape, and the flow of information from a Tape Unit to the MQ unit, either with the Tape reading forwards or backwards.

As stated above, a word may comprise 36 binary digits or 35 binary digits and a sign. Heretofore information has been generally recorded on magnetic mediums in serial fashion, i. e., each individual bit being spaced in serial order along the length of the medium. The length of the words to be accommodated in the MQ Register dictates the need for improved techniques for handling a word of so many bits. Consequently, this invention is predicated on the concept that a sigle word of 36 bits standing in the MQ Register, as illustrated in Fig. 4, may be taken from that register for writing on a tape, in parallel-series fashion, that is in groups, in which the bits are handled in parallel for each group, and the succeeding groups handled serially. Such arrangement also demands that when reading a tape, to store its data in the MQ Register, the bits of the word are accepted by the MQ Register in groups, the bits of any one group being received in parallel, and the succeeding groups, in series. The MQ Register therefore must be adapted for shifting the bits therein, either to the left as in writing, or to the right as in reading. Furthermore, since the tape unit is capable of driving the tape through the read-write heads, in either of two directions, and words are read from the tape while the tape is running backward (as well as forward), provision must be made for shifting into their normal order the bits entered into the MQ Register in reverse order, as they will be when such bits are read from tape while reading tape backward.

*Brief statement of functional operation*

Before proceeding to the detailed description of the nature and operation of the novel input-output device of the invention, it is believed that a brief statement of its operation, without reference to details, will be helpful.

This description will proceed in connection with the Master block diagram, Figs. 5, 5*a*, 6, 7 and 8, which indicates by the various blocks, the particular figures of the drawings containing the circuits of the respective block.

Figure 6:
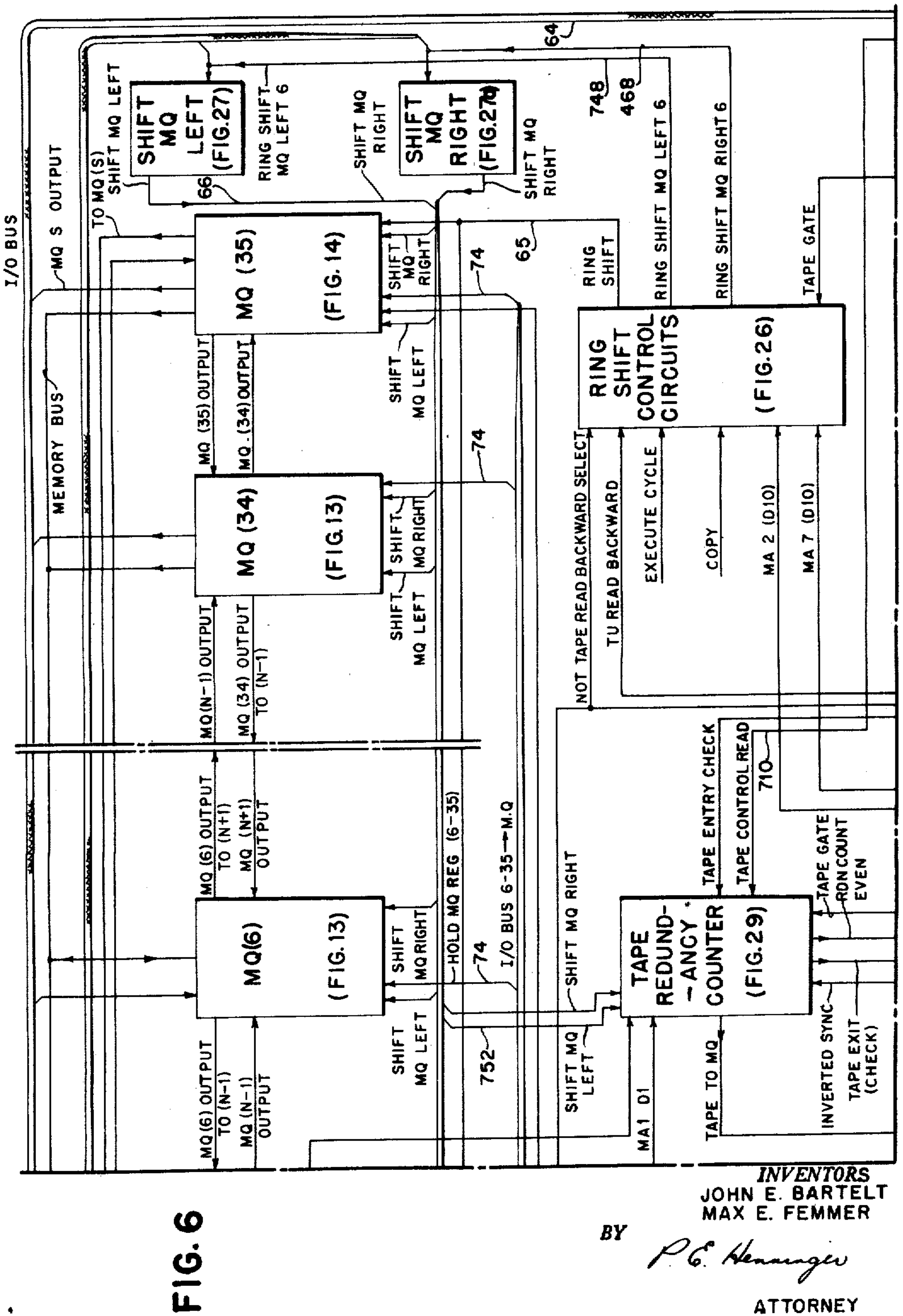

For writing, assume that a 36-bit word, such as shown in Fig. 4, has been entered into the respective orders of the MQ Register, of which orders S, 1, 2, 6, 34 and 35 are shown in Figs. 5 and 6, that the tape upon which this word is to be written is up to speed, and that everything is otherwise in satisfactory condition for writing, and it is desired to write on the tape 36 bits of information, in six groups of six bits each, each group with the required check bits, the writing of the seventh or check bit being controlled in accordance with the even or odd number of binary –1's– in any group of six bits supplied by the MQ Register, these being sensed as they are passed through the S order (Fig. 5). The line entitled To Tape Redundancy Counter indicates that the bits are sensed by the Tape Redundancy Counter, indicated in block in Fig. 6, whose output, Tape Exit (Check) is fed to the Tape Information Control-Write circuits, shown as a block in Fig. 8, whereby via the Tape Write circuits shown in block in Fig. 8 and the Read-Write Head circuits shown in Fig. 8, the redundancy bit can be written on the tape, if required.

To so write a word of 36 bits, the MQ Register positions S–5 are ring shifted left (ignoring for the time being the other orders which are in themselves connected to each other). This left shift is through the S position and around the line entitled To MQ (35) (Figs. 5 and 6) to order 35 and then orders 34, 33, 32, 31 and 30, so that the orders 30–35 finally contain the respective bits previously in orders S–5. More specifically, the input of the S order is connected to the output of the 1 order, as shown in Fig. 5, the input of the 1 order to the output of the 2 order, etc., during this shift left. As the binary –1's– pass through the S order of the MQ Register, they are sampled as stated above, via the line To Tape Redundancy Counter and read, via this line, into the Tape Redundancy Counter (shown as a block in Fig. 6) comprising a single trigger, which has been previously set to –0–, (right-hand side conducting). At the conclusion of this first shift of six places, the Tape Redundancy Counter output voltage, which is taken from its left-hand plate, is a –1– (voltage up) if the count of –1's– in the six bits is even, and this voltage is applied as stated above via the line Tape Exit (Check) to the Tape Information Control-Write circuits (Fig. 8) which act via the Tape Write circuit and the Read-Write Heads, to write the redundancy bit, at the same time as the other six bits are written, as described later.

Figure 7:
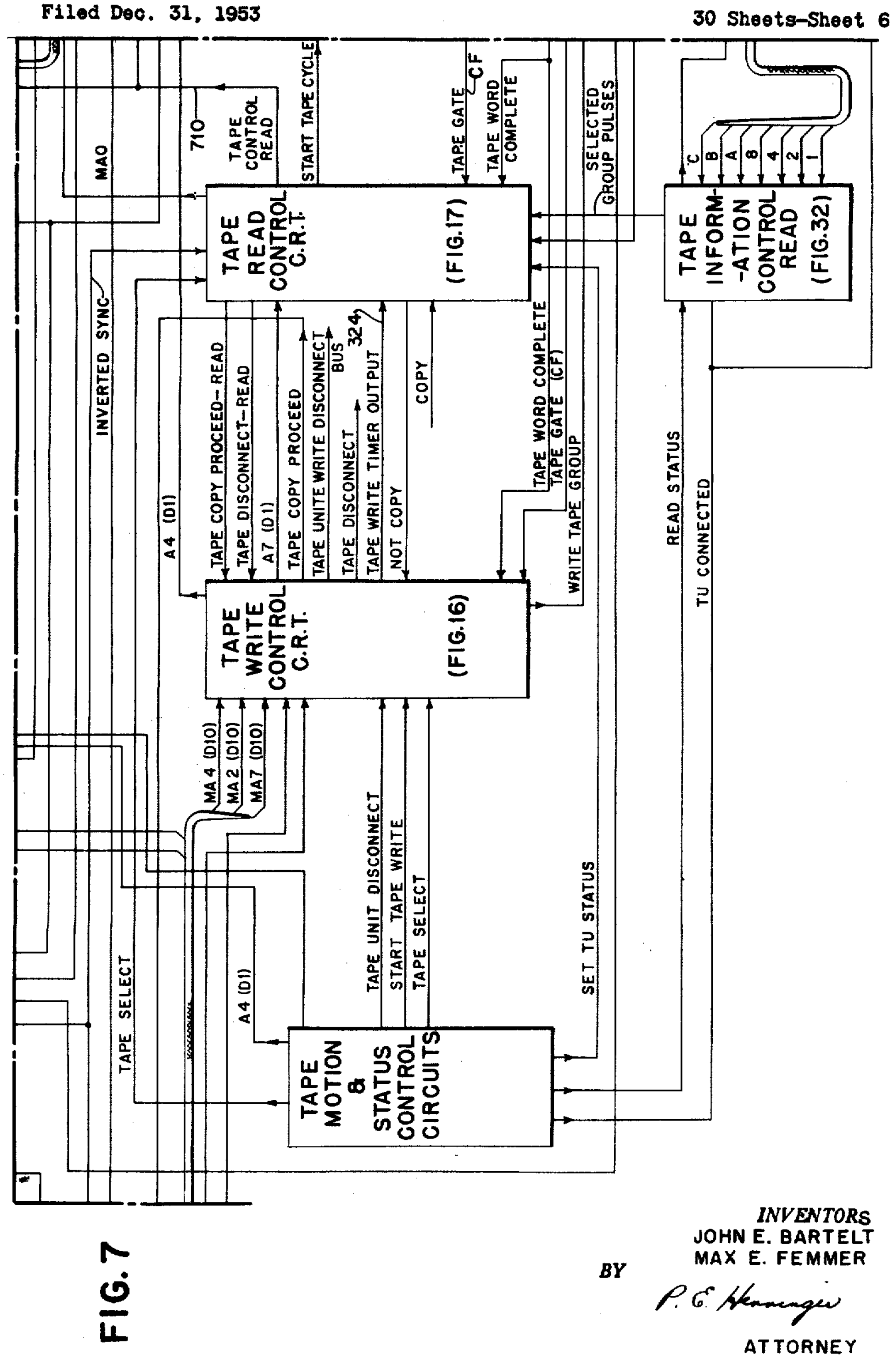
Figure 8:
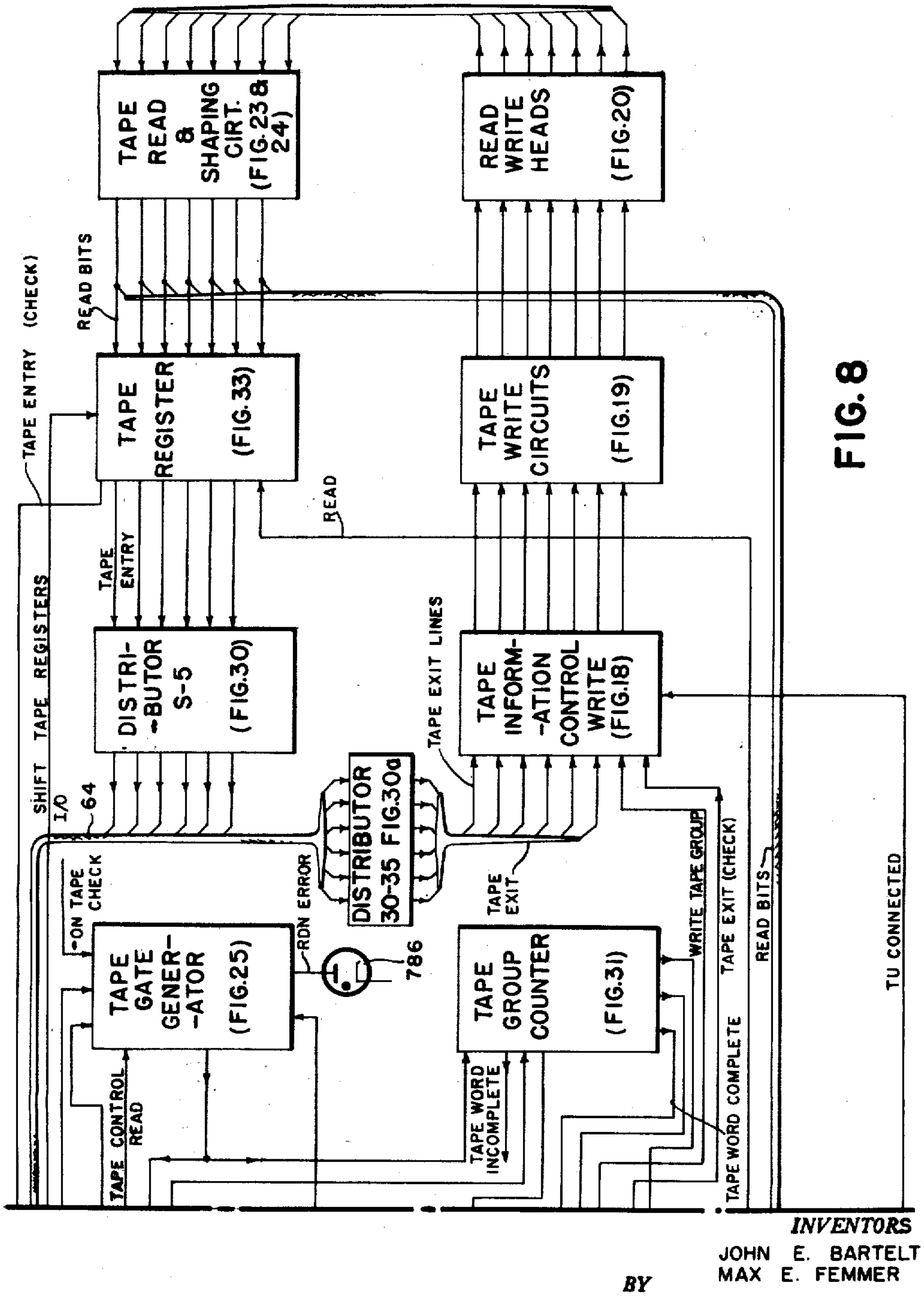

Six lines extend from the respective MQ Register positions 30–35 (Fig. 3) and via the I/O bus (Fig. 6) to a Distributor 30–35, shown in block form in Fig. 8, and out of the Distributor via the Tape Exit Lines to long lines, leading to the Tape Information Control-Write circuits, shown in block form in Fig. 8, these long lines beginning to charge up to their desired state at this time. Approximately 96 microseconds after the above described ring shift is completed, these lines are fully charged. Next, a pulse called Write Tape Group produced by the Tape Write Control circuits, shown in block form in Fig. 7, is then delivered to AND circuits of the Tape Information Control-Write circuits (Fig. 8), these AND circuits, as described later, being conditioned by the respective Tape Exit lines so that the information on these Exit lines is thus sampled by the Write Tape Group pulse to produce outputs which are fed to triggers of the Tape Write circuits. For every Tape Exit line upon which a binary –1– exists, the respective AND circuits pass pulses to trip their associated Tape Write trigger, thus changing the current and flux through the Read-Write Head circuits, shown in block form in Fig. 8. This writing is performed according to the non-return to zero technique, as stated. By this means the group of six bits is written on the tape while, as stated above, the redundancy bit, if any, is also written at this time under control of this Write Tape Group signal.

Thirty-six microseconds later, the next group of bits in the MQ Register is ring shifted left, six places, in a similar manner, and these six bits are examined and the redundancy bit generated as before. A Tape Gate signal, which is a master synchronized control signal, is produced during writing by a Tape Write Timer Output from the Tape Write-Control circuits (Fig. 7) to the Tape Read Control circuits to produce a Start Tape Cycle signal which is fed to the Tape Gate Generator (Fig. 8) to in turn produce this Tape Gate signal, which initiates each ring shift via the Ring Shift Control circuits (Fig. 6) and this signal Tape Gate (Fig. 8) also controls the stepping of a Tape Group Counter whose counting capacity is six. After the ring shift operation has been repeated six times, so that six Tape Gate signals have been fed to the Tape Group Counter, an output is obtained from this counter as the counter passes from 5 to 0, this signal being called Tape Word Complete which is utilized in the Tape Write-Control circuits (Fig. 7) to produce a signal Tape Copy Proceed which is fed to the Copy Proceed circuits (Fig. 5*a*) to produce a signal 9 (D4) On Copy Proceed, which acts conjointly with MQ Not Loaded By Copy in the Enter Execute circuits to produce a Go To Execute signal to in turn produce an Execute Time signal in the Copy Execution Timer which causes transfer of another word from Electrostatic Memory to the Memory Register and into the MQ.

If no Copy signal is present, a Not Copy signal applied to the Tape Write-Control circuits (Fig. 7) produces a Tape Unit Write Disconnect signal which disconnects the tape unit from the calculator.

In the process of Reading from the tape, it may again be assumed that the tape is up to speed, and all conditions precedent to reading have been met. The tape Read-Write Head circuits, shown in block form in Fig 8, begin to sense the bits that have been written on the tape, and where a change of flux on the tape is detected, which change is indicative of a binary –1–, the amplifiers of the Tape Read and Shaping circuits (Fig. 8) will amplify the signal and produce the Read Bits outputs.

The very first output, of any one group of bits, will initiate a Skew Gate of 62 microseconds duration. During these 62 microseconds, all bits of information coming from the tape are respectively read into sets of a first and second trigger, the seven sets comprising a Tape Register. After this 62 microsecond delay, a 32 microsecond line charging delay is inaugurated, to give time for the long lines between the Tape Registers and the MQ to charge, subsequent to which read-out from the second set of triggers into the MQ is accomplished. At the time that the line charging delay is initiated, the first triggers of all sets are reset, in preparation for receiving the second group of bits and, at the same time, the connections between the first and second triggers of all sets are blocked. After the first group of bits are read into the MQ Register from the second triggers of all sets, the second triggers are reset and the first triggers are again connected to their respective second triggers.

Assuming the worst condition of Skew (misalignment in position of or in reading of bits of a group transversely of a tape), a group of bits may start reading into the first triggers only of the Tape Register during the 62 microsecond Skew period since during this time the second triggers are still reading out into the MQ Register. Subsequent to completion of read-in into the MQ Register from the second triggers, all bits already entered into the first triggers are read into the second triggers (during the 62 microsecond Skew period), and thereafter, for the remainder of the 62 microsecond period, entry is into all triggers simultaneously.

Upon completion of the 62 microsecond Skew period, line charging time is again initiated and reading into the MQ Register, as before, is completed, thus allowing a safety factor of approximately 20–30 microseconds in the worst cases of Skew.

In the present novel device, it is possible to read from the tape into the MQ Register, either while the tape is moving forward or while the tape is moving backward. The actual read-in from the tape into the Tape Register triggers is identical, whether the tape is moving forward or backward.

Considering this entire operation in greater detail, the handling of the data between the Tape Registers and the MQ Register while the tape is moving forward while being read will first be described.

Following the above-mentioned line charging time, a Tape Gate, which is a master synchronized control signal, is produced during Reading, by a Tape Gate Generator (Fig. 8) under control of a signal Start Tape Cycle (Fig. 7) initiated by the Tape Read Control circuits (Fig. 7). The signal Tape Gate performs four functions: (1) It is applied to the Tape Redundancy Counter (Fig. 6) to produce the signal Tape To MQ which is applied to the I/O Bus (S–35) into MQ circuits (Fig. 5) where it produces a signal I/O (S–5) Into MQ which in turn is applied to the MQ Register Col (S) Hold circuit and the MQ Register Col (1–5) Hold circuits (Fig. 5) to render these Hold circuits negative, so that entry may be made into the corresponding register orders and this signal I/O (S–5) Into MQ is also applied to AND circuits in the MQ Register Columns S and 1–5, respectively (Fig. 5), as described later, the other inputs to these AND circuits being the signal in the particular input-output bus extending between the second triggers of the Tape Register and the MQ; (2) This Tape Gate is also applied to the Ring Shift Control circuits (Fig. 6) producing the necessary signals and breaking the Hold circuit of orders (6–35) so that shifting of the MQ Register takes place to the left, after parallel read-in of the six bits is complete; (3) This Tape Gate is also applied to the Tape Redundancy Counter (Fig. 6), allowing checking of the bits as they are shifted through the S order, during Ring Shift, this checking taking place via the line To Tape Redundancy Counter (Figs. 5 and 6) to ascertain if the number of binary –1– bits is odd or even and if it be even, to produce a Redundancy Count Even signal which is fed to the Tape Gate Generator circuits (Fig. 8) to produce a Redundancy Error signal; and (4) it is applied to the Tape Group Counter (Fig. 8) to advance this counter one for each group of six bits read into the MQ, so that this counter can indicate when one full word has been read from the tape to stop the operation. The seventh track of the tape is read by the Tape Register (Fig. 8) and produces a signal Tape Entry (Check) which is fed to the Tape Redundancy Counter (Fig. 6) which will thus be set "on" or "off," depending upon the presence of a binary –1– or binary –0– in the redundancy position (the seventh track of the tape). If a binary –1– is in the redundancy position, the redundancy trigger of the Tape Redundancy Counter is thus initially set "on" (left side conducting). The other six lines from the Tape Registers (Fig. 8) are fed via a Distributor S–5 (Fig. 8) to the S–5 orders of the I/O Bus and thus, as just stated above, are applied the corresponding orders S-5 of the MQ Register, the MQ Register having been prevously reset to zero, and the bits in the S–5 orders are then ring shifted left under control of the signal Tape Gate, and each bit as it passes through the S position (Fig. 5) of the MQ Register is applied to the Redundancy trigger (Fig. 6) to check for the presence of a binary –1–, as stated above. This trigger as stated above, was initially set "on" if the bit in the redundancy track was a binary –1–, and it will be flipped each time a binary –1– is encountered during the ring shift. If the total of binary –1's– in the redundancy position and in these six positions is odd, the redundancy trigger will then be "on" and no Redundancy Count Even signal is produced to turn on the Redundancy Error neon light (Fig. 8). If, however, the total number of bits in the seven tracks is even, this is indicative of an error and the redundancy trigger will be "off" so that its left plate output Redundancy Count Even will be fed (Figs. 6 and 8) to the Tape Gate Generator (Fig. 8) where it cooperates with a signal Tape Control Read to turn on the neon light to indicate that an error exists. This test process is repeated for each group of seven bits read from the tape.

In the process of reading from tape, as in the process of writing, each time a ring shift of six bits is initiated under control of the Tape Gate, this gate is also applied to the Tape Group Counter (Fig. 8) which thus keeps track of the number of groups shifted. When the Tape Group Counter counts 6, at the beginning of the ring shift of the sixth group, a signal Tape Word Complete is produced which is fed to the Tape Read Control circuits (Fig. 7) which produces a Tape Copy Proceed-Read signal which is fed to the Tape Write Control circuits to produce a Tape Copy Proceed signal which is fed (Figs. 7 and 5*a*) to the Copy Proceed circuits (Fig. 5*a*) to produce a signal 9 (D4) On Copy Proceed which is fed to the Enter Execute circuits (Fig. 5*a*) to produce a signal Go To Execute which in turn produces the signal Execute Time which is applied to the Copy Execution Timer (Fig. 5*a*). If a Copy signal is present, this will produce a Copy Read signal which controls the transfer of the data from the MQ to the Memory Bus via switches as indicated in Fig. 1. Thus, if a Copy is present, the entire 36 bit word, read into the MQ Register from the tape, in groups of six bits, may be transferred to Electrostatic Memory. If no Copy instruction is present to apply its signal Copy to the Tape Read Control circuits (Fig. 7) the word, read from the tape, will remain in the MQ Register and a signal Tape Disconnect-Read is produced by the Tape Read Control circuits and is applied to the Tape Write Control circuits (Fig. 7) to produce a signal Tape Disconnect which disconnects the Tape Unit from the rest of the Main Machine.

The Copy Execution Timer (Fig. 5*a*) also produces a signal Read Tape (Copy) MQ Reset when the Copy Read signal is produced. This is applied to the MQ Reset circuits (Fig. 5) which produces a Clear MQ signal, at the proper time, which is fed to the MQ Register Hold circuits to render the Hold circuits negative, thereby breaking all Hold circuits and clearing the MQ.

Reading backward, up to the point of entry into the MQ Register, follows the procedure employed while reading forward. After the first six bits have been read into the MQ Register, however, they are shifted right, instead of left. To complete checking when reading backward, it is necessary to ring shift right six times, each shift consisting of a six bit shift. During the operation of shifting the bits right in the MQ Register, the redundancy check is made, as the respective bits pass through the fifth order of the register, as indicated by the line labeled Column 5 Only, connected to the line labeled To Tape Redundancy Counter (Fig. 5) instead of during their passage through the S order of the register, as was the case while shifting the bits to the left. Because of this fact, it is apparent that in order to make a redundancy check of the last group of six bits, it will be necessary to shift these bits, a seventh time, six orders to the right and thus beyond their normal position in the MQ Register. It will, therefore, be necessary to shift all the bits back to the left six orders so that the bits are in proper order in the MQ. If the information is to be transferred to Electrostatic Memory, the Copy instruction will cause this last ring shift of six places to the left in order to arrange the information in the proper orders of the MQ Register, and during this seventh shift the redundancy check is suppressed.

*Component circuits*

Before proceeding to the description of the MQ and of other major components of the novel input-output device, a detailed description of certain circuits employed throughout the device will be given at this time. Subsequently they will be referred to only by their respective block diagrams.

*Inverter (I)*.—Referring first to Fig. 40, there is illustrated the detailed circuit of an inverter as employed in the invention and its corresponding block symbol I. Wherever this block symbol appears in the figures of the drawings, it represents the detailed circuitry of Fig. 40. Values of componnets and tube types given in the detailed descriptions which follow are exemplary only and may be varied by those skilled in the art as circuit requirements dictate.

Referring to Fig. 40, a triode 568 which may comprise half a 5965 dual triode type tube has its plate connected to a +150 volt source by a 10K resistor 522 and a 750 microhenry inductance 570, connected in parallel, both in series with a 10K resistor 574. The grid of triode 568 is connected via a 150 ohm resistor 576, to a 10K resistor 578 connected in parallel with a 39 micromicrofarad condenser 580, whose farther junction is shown as connected to an input terminal. The plate of triode 568 is also connected by means of a 15 micromicrofarad condenser 582 in parallel with a 160K resistor 584, to the output line 586, while the lower junction of the condenser 582 and resistor 584 is connected by means of a 330K resistor 588 to a source of −250 volts.

*High speed trigger (T).*—Fig. 41 illustrates the block symbol and the circuitry of a high speed trigger utilized herein. This trigger comprises a dual triode 590, which may comprise a type 5965 tube, the plate of the right hand triode being connected to a +150 volt source by way of an inductance 592 (of a value as labeled) in series with two resistors 594 and 596, respectively. Two resistors each of 5.1K–1W value may be employed, when it is desired to provide a tap as shown, or a single 10K–2W resistor may be employed when no tap is required. The left plate of dual triode 590 is similarly connected to the +150 volt source. The right plate is also connected to a condenser 598, in parallel with a resistor 600, whose lower junction is connected to the plate output line 602. This lower connection is also connected by way of a resistor 604 to a −250 volt source. The left plate is provided with a similar output connection for feeding a cathode follower, as indicated by its labeling.

The plate of the right hand triode of dual triode 590 is also coupled to the grid of the left hand triode via a condenser 606 and a resistor 608, in parallel, together in series with a resistor 610. The plate of the left triode is similarly connected to the grid of the right triode to thus provide the now well known cross-coupling of an electronic trigger comprising a pair of triodes. As shown, the trigger is flipped "off," in which condition the right hand triode is conducting, as indicated by the small circle to the right of the envelope of the dual triode. The grid of the left hand triode is also connected via the resistor 610, in series with resistors 614 and 616, to a source of −250 volts, the junction of the two resistors being connected to an input labeled Manual On, whereby, by manual application of a plus voltage, the trigger may be flipped "on." Similarly the grid of the right hand triode is connected to an input labeled Manual Off, whereby, by application of a plus potential the trigger may turn "off" which is the status indicated. The flip-flop operation of such an electronic trigger is now well known, the trigger being flipped "on" or "off" as desired, the "off" condition, as stated above, being that in which the right hand triode is conducting and the left hand triode non-conducting. By the application of a minus voltage to the binary input D, such a negative voltage is applied to both grids but is effective only on the grid of that triode which is already conducting, to thus block its conduction and render this triode non-conducting. When reset, as shown, a minus pulse, applied to the binary input will render the right hand triode non-conducting and the left hand triode conducting.

*Slow speed trigger (Ts).*—The slow speed trigger of Fig. 42, whose block symbol is Ts except as noted below, corresponds in structure and function to the high speed trigger. The slow speed trigger has a rise time of about 0.5 microsecond and a fall time of about 3.5 microseconds. Three changes are made to produce a slow trigger. The plate peak coils 592 (Fig. 41) are removed, the plate-tube-grid compensation capacitance is increased to 22 micromicrofarads, and the clamp diodes on the grids are removed (except for binary applications). The difference in outputs for the slow trigger is that the tapped plate resistance comprises a 6.8K and a 3.8K resistor in series, instead of two 5.1K resistors.

*Key trigger (Tk).*—In Fig. 43 the block symbol is labeled Tk to indicate a key trigger circuit whose circuit details are also illustrated. Whenever the block symbol Tk appears in the drawing, the contents of the block labeled Tk will comprise the circuit as illustrated in Fig. 43. Key triggers are used primarily in the input-output circuits, for producing pulses with smooth wave fronts from input pulses which are very likely to contain ragged wave fronts. The key trigger is operated by feeding a driving voltage through a 1K grid resistor to one or the other of the grid inputs. The input to the key trigger is a double integrating circuit, composed of two series resistors and two shunt capacitors, as shown. Integrating action helps produce a smooth pulse which promotes positive triggering action if the input pulse remains long enough; therefore, the integrators help prevent transients from affecting the key trigger. The 100 micromicrofarad coupling capacitor between grids also desensitizes the key trigger to transients. The plate voltage varies from about +135 volts to +30 volts and the grid swing is from ground to about −30 volts. The rise time of the key trigger is about 9 microseconds and the fall time is about 0.2 microsecond.

*And circuits (AND).*—Fig. 44 shows the block symbol and the detailed circuitry of a diode AND circuit used throughout the circuits of the novel input-output device. Whenever the symbol labeled AND appears in the block diagram, the contents of the block labeled AND will comprise the circuit as illustrated in Fig. 44 or one modified simply by the addition of as many input diodes as may be necessary for conditioning the circuit under question. The AND circuit of Fig. 44 is a plus AND circuit which requires a coincidence of two +10 volt inputs, for example, applied respectively to the lines 618 and 620. Such inputs are effective through diodes 622 and 624, respectively, which may comprise germanium diodes of standard make, such as Sylvania D436A or D437A, to produce a +10 volt output, the plates of the diodes being joined and connected by a resistor 626 to a source of +220 volts.

*Minus and circuits (−AND).*—Referring to Fig. 45, there is illustrated the detailed circuitry and block diagram of a diode −AND circuit. A −AND circuit comprises a coincidence coupling requiring the coincidence of two negative potentials on its two inputs (or as many diode inputs as may be employed), to produce a negative output. The −AND circuit of Fig. 45 comprises a pair of diodes 628 and 630 which may comprise a Sylvania D436A or D437A, the type D436A having a power resistance of 400K ohms at 50 volts and 50° centigrade, while type D437A has one-half of this power resistance. These diodes 628 and 630 are connected as shown to a resistor 632, whose lower terminal is connected to a source of −250 volts. Upon application of a negative potential (assume −30 volts), to both the inputs 634 and 636, a negative output will become available on the output line 638. If either of the inputs is relatively plus, no such negative output will be available.

*Or circuits (OR).*—Referring to Fig. 46 there is shown the detailed circuitry and block diagram of a diode OR circuit comprising a pair of diodes 640 and 642, joined at their cathodes and connected by means of a resistor 644 to a source of −250 volts. The application of +10 volts to either of the inputs 646 or 648 will produce a +10 volt output on the output terminal 650. This is also true when both of the inputs are plus. Thus, the OR circuit of Fig. 47 comprises a +OR circuit which passes a plus voltage on any one of its inputs. On the other hand, a minus voltage applied to either input will not produce any change at the output. By comparison of Figs. 46 and 45 it is seen that the circuitry, per se, of a −AND circuit and a plus OR circuit are the same, these being employed in different manners as indicated above.

*Cathode follower (CF).*—In Fig. 47 there is shown the detailed circuitry and block diagram of a cathode follower which may be used, either in the form shown in Fig. 47 or several variants thereof. Wherever a cathode follower is used in the circuitry herein, it will be indicated by the block diagram labeled CF.

These cathode followers are primarily power amplifiers, and are therefore used for supplying a stable voltage level for driving resistive loads, such as diode AND and OR circuits or capacitive loads such as wiring capacitance. Their high input impedance and relatively low output impedance makes them useful for impedance matching and isolation. They do not invert a signal but they may attenuate a signal.

The basic cathode follower shown in Fig. 47 may be used with two types of loading which should be considered, a resistive load and a capacitive load. First a resistive load will be assumed, and the input voltage will be +10 volts. The tube will conduct in such manner as to regulate itself, i. e., it will not allow an appreciable voltage change from grid to cathode. If the current increases, the tube tends to cut itself off as the cathode voltage tends to rise. This cut-off action tends to decrease the current. Conversely, if the current tends to decrease, the cathode voltage will tend to drop and thus cause the tube to draw more current. This type of self-regulation is called inverse voltage feedback. Current through the cathode circuit causes a voltage drop across the 100 ohm cathode resistor 652. When the input voltage is +10 volts, this drop should about equal the grid-to-cathode rise so that the output voltage is almost +10 volts. Should the input signal drop, for instance to −30 volts, then the output voltage will also drop. If one examines tube characteristics, it will be noticed that the current will be less and that the grid-to-cathode bias is more when there is more voltage across the tube. In this case, the drop across the 100 ohm cathode resistor 652 is less, and therefore it will not compensate for the grid-to-cathode voltage rise, and the output will be more positive than the input. The regulating action still occurs, although at this lower level.

With +10 volts on the grid of an unloaded cathode follower employing a 8.3K cathode resistor, the output is about +9.5 volts, and each added 6 milliamperes of load will increase the drop (from +10 volts) by about 1 volt. A maximum rise of 3 volts may be expected from a cathode follower with an 8.3K load resistor and no additional loading. For each milliampere of load, this lower level may be expected to rise about ½ volt. If the cathode resistor is increased, the rise in the lower level is increased also. For example, an increase of 3K in the cathode resistor will cause the lower level to rise about an additional volt. This cathode resistance may vary over a considerable range. The gain of a cathode follower when operating class A is about 0.9.

For operation of a cathode follower, feeding a capacitive load, assume that there is capacitance connected from the output to ground, and assume the input voltage to be +10. In the steady-state condition, the capacitance would be charged to +10 volts. If the input voltage were to drop in zero time to −30 volts, the voltage across the capacitance could not drop immediately, and therefore the cathode will be held up by the capacitance while the grid drops to −30 volts. This action cuts off the tube momentarily. The output voltage will drop at a speed determined by the RC path consisting of the cathode resistor and the capacitance. When the capacitance voltage drops far enough that the tube begins to conduct, current from the tube will begin to halt and drop and eventually hold the output at a steady-state voltage. When the input is suddenly shifted again to +10 volts, the capacitance will be charged by current from the grid and plate circuits of the heavy conducting tube. For values of input capacity for the next stage or stages generally employed in this system, these RC time-constants are compared to the rise and fall times of the input, and therefore the extremes of cut-off and heavy conduction may not be reached and the output follows the input. But if a long cable or large capacitive load is attached to the cathode follower output, then the output will not follow the input voltage shifts but will be determined by the RC paths above. The use of several cathode followers, in parallel, helps to minimize the voltage rise through the circuit at the lower level. Parallel-connected cathode followers also provide more current for line charging purposes to speed output voltage shifts, and in addition, the paralleling lowers the effective cathode resistance and thus allows faster discharging of line capacitance. When cathode followers are in parallel, the connections are made at the grids and the outputs. The diodes may not be paralleled, as will be seen later. The number of half tudes (Type 5965), in parallel, precedes the symbol CF in the block diagram; thus, a whole tube cathode follower is indicated by the symbol 2CF throughout the circuit diagrams.

The standard cathode follower, as shown in Fig. 47, contains two catcher diodes 654 and 656. The diode 656 connected to the −30 volt line protects the other catcher and the diode following this circuit by clamping the output voltage to −30 volts when the tube is removed or when the cathode follower input goes very negative. This negative-voltage catcher also helps set the standard output signal. The diode 654 connected to the +15 volt line, clamps the output at +15 volts, when the input goes very high, and thus protects the other diode or any diodes fed by this circuit from over voltage. These two diodes, in effect, protect each other. When cathode followers are paralleled, only needed diodes are used. In this case enough +15 volt-returned diodes are used to carry the 24 milliampere, 0-bias current for each 5965 half tube. The −30 volt-returned diodes must handle the clamping current through the equivalent cathode resistance when all tubes are removed. When crystal diodes are paralleled, a resistor (usually 100 ohms) is placed in series with each to tend to equalize the currents through each diode. Otherwise, a low forward resistance of one may cause it to pass more than rated current.

*Power cathode followers* (*PCF*).—In Fig. 48 there is illustrated the detailed circuitry and block symbol of a power cathode follower PCF which operates similarly to the cathode follower of Fig. 47. This circuit is called a power cathode follower because it uses a 5687 tube which is a heavy duty tube. The usual value of the cathode resistor is 6 kilohms. The usual value of the bias resistor is 300 ohms. The voltage rise through a power cathode follower is greater than that for a standard cathode follower. Because of the tolerances in type 5687 tubes, the rise from a −30 volt input can be as much as 5 volts for an unloaded power cathode follower with a 6K cathode resistor. With a +10 volt input, the input should also be +10 volts under the above conditions. The action of the power cathode follower under capacitance loading is also similar to that of the standard cathode follower. Power cathode followers may be paralleled, and in this case the +50 volt-return catcher diodes must be able to carry the 80 milliampere, 0-bias current of each half tube. As in the case of the standard cathode follower, the number of half tubes in parallel precedes the symbol PCF in the block diagrams; thus, a whole tube power cathode follower is indicated by 2PCF.

*Cathode follower, mixer* ($CF_M$).—In Fig. 49 is illustrated the detailed circuitry and block symbol of a cathode follower labeled as $CF_M$ in the identifying block thereof, which comprises a special cathode follower, used as a mixer in the tape reading circuits, and its particular function will be clear from the description of the Tape Read and Shaping circuits of Figs. 23 and 24, described in detail below.

*Slow inverter* (*Is*).—Fig. 50 illustrates the block symbol and the detailed circuitry of a slow inverter used at several points throughout the system. The input terminal 658 of the inverter tube 660 (which may be ½ of a type 5965 tube) feeds through a 10K resistor 662 to the grid of the triode 660, its plate being connected to a cathode follower output via a 15 micromicrofarad condenser 665 in parallel with a 160K resistor 666, whose lower junction is connected through a 330K resistor 668 to —250 volt source. This lower junction is connected to the output 670 which in turn feeds a following component (usually a cathode follower).

It may be noted that the principal difference between the slow inverter of Fig. 50 and the standard inverter of Fig. 40 is that neither coil nor clamping resistor is used in the slow inverter. The omission of the coil causes the rise time of a slow inverter output pulse to be about 0.5 microsecond, but the fall time is not changed, namely 0.3 microsecond. Since the high speed input of the standard inverter is not needed, only a 150 ohm parasitic suppressor resistor may be used in place of the 10K grid current limiting resistor 662 in the input circuit. No tapped plate output is taken from the slow speed inverter but the divider output is identical to that of the inverter of Fig. 40. Input levels required for the correct operation and output voltages are identical for both inverters and delays are also similarly produced.

*Sync inverters* ($I_{sy}$).—Fig. 51 illustrates the block symbol and the circuitry of a sync pulse inverter identified by the symbol $I_{sy}$. Sync inverters are used to provide single pulses of normal +10 volts to —30 volt-levels to the Microsecond Delay Units. The input to the sync inverter is RC-coupled, for setting the level of the input pulse. The tube may be ½ of a type 5687 and may normally conduct very heavily and rapidly return to cut-off. When the tube is again made conducting, the heavy conduction through the tube enables the output voltage to fall very fast which is an important characteristic of the sync pulse inverter. The diodes 672 and 674, on the output, keep the signal output within normal limits.

*Special inverters* ($I_g$) *and* ($I_k$).—In Fig. 55 is illustrated the detailed circuitry and block symbol of a special inverter whose block is labeled $I_g$. This inverter feeds some of the 48 volt indicator lamps on the operator's panel. It is fed a signal of about —30 to +6 volts and its output is about +102 to +150 volts. The resistance for this inverter is chosen to give the proper voltage drop across the indicator lamps. In some instances this resistance value may be slightly different than that shown for adjusting the brightness of the indicator lamps to like value. Each lamp requires about 48 milliamperes, and therefore a full type 5687 tube is used.

In Fig. 56 is illustrated the detailed circuitry and block symbol of a special inverter whose block symbol is $I_k$ which is employed in the tape reading circuits to feed the slow single-shot multivibrators. It may comprise half a type 5965 triode with the resistance values as shown.

*Amplifiers* (*A*).—In Fig. 52 is illustrated the detailed circuitry and corresponding block symbol labeled A, which is known as a grounded grid amplifier. It comprises a pair of triodes 676 and 678 which together may comprise a type 5965 dual triode. The plate of triode 676 is directly connected to a source of +150 volts while its grid is connected through a resistor 680 to the input line. The plate of triode 678 is connected to a +150 volt source, through a resistor 682 and an inductance 684 in parallel, both in series with a resistor 686. The plate of triode 678 is also connected, through a condenser 688 and a resistor 690, in parallel, to the output terminal 692. This output is also connected through a resistor 708 to a source of —250 volts, as shown.

The grid of triode 678 is connected to ground through a resistor 694 and a condenser 696 in parallel with a resistor 698. The end of the resistor 694, remote from the triode 678, is also connected via a resistor 700, to a source of —30 volts.

The cathodes, of the two triodes 676 and 678 are connected, as shown, and are also connected to a —250 volt source, via a resistor 702. The joined cathodes are also connected, via a diode 704, to a source of —30 volts.

Assuming we wish to amplify a potential of +10 volts, applied to the input terminal 706, the triode 678, acting as a cathode follower, will produce approximately +13 volts at the common cathode. The grid voltage of the right triode is determined by the voltage divider and this voltage is —10 volts, as no great current is flowing. With +13 volts on the cathode and —10 volts on the grid, the triode 678 will be cut off, producing +144 volts at the plate. This signal is divided between the +144 volt and the —250 volt source, as shown, to obtain an output of +10 volts at the output terminal 692.

If the voltage on the grid of triode 676 were —20 volts, the cathode would be approximately —18 volts. With —18 volts on the cathode of triode 678 and —10 volts on its grid, the grid will draw current, reducing the grid-to-cathode voltage to approximately zero, thus allowing full conduction. The plate voltage will drop to about +70 volts, which is divided, via the circuit as shown, producing an output of —36 volts, on the output terminal 692.

This circuit is designed for maximum response. The coil 684 in the plate circuit of triode 678 decreases the rise time of the plate when the input to this grounded grid amplifier is going in the opposite direction. The 47 micromicrofarad condenser 696, in the grid network of triode 678, is employed to by-pass the grid to ground, and to allow triode 678 to respond faster, as the cathode voltage is dropped. When the grid of triode 678 begins to conduct, the voltage at the grid does not drop immediately but is held up by the potential of the grid condenser 696. This positive grid-to-cathode voltage provides a surge of plate current to aid the fall of the plate of triode 678.

*Slow amplifiers* ($A_s$).—Fig. 53 discloses the block symbol and detailed circuitry for a slow amplifier whose block symbol is $A_s$. When the speed of the grounded-grid amplifier shown in Fig. 52 is not needed, the slow amplifier $A_s$ of Fig. 53 is used. The only difference between this circuit and the amplifier circuit of Fig. 52 is the absence of the coil and its shunting resistor from the plate circuit. The rise time of the plate voltage is about 0.5 microsecond and the fall time, as in the previous amplifier, is about 0.3 microsecond (a coil does not affect fall time). Delay and voltage values are the same as for the amplifier of Fig. 52.

*Single-shot multivibrators* (*SS*).—Fig. 54 is an illustration of the block diagram symbol and the detailed circuitry of a single-shot multivibrator which is widely used in the invention. This circuit is used to generate gates or pulses, of specified delays, and to provide specified delays. A single-shot resembles a trigger circuit in that it may be flipped into a certain state, but it returns automatically to its previous state after a predetermined time without being pulsed from an external source. Its normal state may be referred to as its stable state; and its abnormal state may be referred to as its quasistable state, for it remains stable in this latter state until the predetermined time has elapsed.

The single-shot used in this system is cathode-coupled. In the stable state, the left triode is cut off and the right triode is conducting heavily. In this state the cathode and right grid voltages are about +10 volts, and the left plate voltage is +150 volts, and the right plate voltage is about +60 volts. The most common method of firing a single-shot is by plate pull-over. When using plate pull-over, the left plate of the single-shot is connected to the plate of a pull-over inverter, the load resistor for the left plate also acting as the load resistor for the pull-over inverter. When a positive input arrives on the grid of the pull-over inverter, conduction through the common plate resistor drops the voltage of the left plate of the single-shot. This negative shift is coupled through the capacitor CT to the right grid, cutting off the right triode, and the cathode voltage starts to fall. The left grid is held to about −38 volts by a voltage divider, and as the cathode voltage falls, the left triode comes into conduction, pulling its plate voltage down. Current flowing through the cathode resistor, from the left tube, stops the fall and holds the cathode voltage at −36 volts. A clamp diode in the cathode circuit prevents component variations from causing the voltage on the cathode to fall below −36 volts. The clamp diode on the left grid prevents the Miller capacitance effect from dropping the left grid voltage below −36 volts. The left tube at this time is conducting, and it is operating very near 0-bias. The input pulse may be removed any time after the left triode begins to conduct and the circuit will remain in the quasi-stable state for the left plate voltage will be held down by the conduction of the left tube. When the input pulse from the pull-over inverter is removed, the loss in pull-over inverter current flowing through the left plate load resistor may appear as a slight positive shift in the left plate and right grid wave forms.

The duration of the single-shot output pulse is largely dependent upon the value of the discharging capacitor $C_T$ connected between the left plate and the right grid and the value of the resistor $R_T$. On discharge of $C_T$ the path is from the +220 volt source through the resistor $R_T$ connected to the right grid, said capacitor, the left tube and the cathode resistor, to −100 volts. Discharging the capacitor causes the voltage at the grid end to rise. When the voltage at the right grid has risen to −42 volts, the right tube will begin to conduct. The cathode voltage will rise again to its original value, cutting off the left tube as it does so. The left plate voltage therefore rises toward its original +100 volt level. All components in this circuit, except the condenser $C_T$ and the resistance $R_T$ are fairly constant. $R_T$ and $C_T$ may be varied to determine the duration of the pulse, and therefore they are called the timing resistor and the timing capacitor. The larger $R_T$ and $C_T$ are, the more time is required for the right grid voltage to rise to −42 volts. The duration of the single-shot pulse, in microseconds, is approximately 0.25 $R_TC_T$, where $R_T$ and $C_T$ are in megohms and micromicrofarads, respectively. The value of cut-off for the right tube in this circuit also affects the timing. All these factors, except $R_T$ and $C_T$ are fairly constant and enter into said 0.25 coefficient of the timing equation. Variance in components and voltages, thereof, may cause the actual value of pulse width to deviate from the calculated value, by as much as plus or minus 20%. Although it was mentioned previously that the voltage values at various points in the circuit of Fig. 54 return to their stable values when the single-shot timing has ended, such a case is not strictly true. The left plate voltage rises to a new value in about a half microsecond, but this is lower than +150 volts. This voltage is determined by the balance of voltage in the circuit connected to this plate. The positive shift at the left plate is coupled to the right grid, which becomes positive enough to draw heavy grid current in the right tube. The upper level of the right grid voltage is clamped through the right tube and the +10 clamp diode on the cathode, and this clamping action prevents the voltage on the left plate from rising to +150 volts until the coupling capacitor again becomes charged to its original 140 voltage charge. The path for charging current is now from +150 volts, through the left plate load resistor, through the capacitor $C_T$, through the grid-to-cathode resistance of the right tube and finally through the cathode resistor to −100 volts. The time of recovery, that is the time required for the left plate voltage to return to +150 volts, can be estimated in microseconds at 0.25 $C_T$, where $C_T$ is in micromicrofarads. It may be noted that the timing resistor has no effect on this time. Recovery time is an important consideration in single-shot operation. If a circuit has not recovered from an operation when a second input pulse arrives, the negative shift on the left plate will be smaller, and thus the time of the single-shot pulse will be shorter. Therefore, for stable operation, the period of the input pulses must be greater than the combined output pulse recovery time. If the shift in voltage at the left plate at the time of removal of the input pulse is large, it may have a serious effect upon the timing of the circuit.

A special input may be used to suppress or cancel single-shot action. This input is from a cathode follower and is connected to the cathode of the single-shot. If the input to the cathode follower is about +10 volts, its output will hold up the cathode of the single-shot, even though the single-shot is pulsed at the grid. With the cathode follower no regenerative action can occur in the single-shot and no output pulse will be produced. The left plate voltage of the single-shot will be pulled down by the pull-over inverter (if plate pull-over is used) but the plate voltage will rise again after the input pulse is removed. If the single-shot is in its quasi-stable state when the positive gate is applied to the cathode, the single-shot will immediately be triggered back to its stable state. Thus the +10 voltage applied to the cathode can either suppress or cancel the single-shot action.

*The MQ Register*

Since the MQ Register is used both when a word is read from the tape and when a word is recorded on the tape, it is appropriate that its nature and function be investigated at this point. To clarify the coaction of the MQ Register with the other circuits of this novel device, reference should be made to Figs. 5, 5*a*, 6, 7 and 8 which, when arranged as in Fig. 9, constitute a master block diagram showing the relationship of the MQ Register to the novel input-output device and of this device broadly to other portions of an Electronic Data Processing Machine. By keeping these figures in view during the detailed description of the MQ and the other components of the novel input-output device comprehension of the operation will be easily obtained since the major features will thus be highlighted.

*Microsecond Delay Unit.*—Fig. 15 illustrates the detailed circuitry and corresponding block symbol of a Microsecond Delay Unit utilized as the storage element in each of the MQ Register orders. The nature and function of the Microsecond Delay Unit is of such prime importance in the operation of the MQ Register that the unit should be considered first. Figs. 10, 11, 12, 13 and 14 illustrate respectively the MQ Register columns S, 1, an example of any of the columns 2 through 5, an example of any of the columns 6 through 34 and of column 35. These respective figures illustrate in block form the necessary circuitry to incorporate the Microsecond Delay Units as storage elements of the respective register orders.

The circuit of a Microsecond Delay Unit illustrated in detail in Fig. 15 is generally of the type as shown and described in Reissue Patent No. 23,699 issued August 18, 1953. The slight differences in design between the device of the patent and the particular design of the device described in detail herein, will be apparent from the following brief description and the notations on Fig. 15. In general, the Microsecond Delay Unit is a device for storing data in which an input pulse may be applied to the input terminal 10 (Fig. 15) at the same time that the previous input pulse appears at the output terminal 12, a delay of one full microsecond occurring between input and output, with certain timing of the inputs, as described below, but with a complete isolation between the respective output and input pulses during any given time interval.

The input 10 is connected to one diode rectifier of a pair of rectifiers 22 and 24, which with a resistor 26, connected between the junction 28 and a 220 volt source, comprise an AND circuit, generally designated as 30, the input to a terminal 60, connected to a diode 24, comprising the sync pulse, as described below. The junction 28 is connected through a suppressor grid resistor 32 to the control grid of the triode L, which may comprise one half of a 5965 type tube, the other half comprising the triode R.

The plate of triode L is connected via a resistor 18 and an inductance coil 16, in parallel, to a +150 volt source while the output of the plate is coupled to the grid of the triode R via a circuit described below.

The triode R is operated as a cathode follower and is always conducting during operation of the delay circuit. Its cathode load resistor 34 is connected to a −100 volt terminal 36 which is also connected through a resistor 38 to the condenser 40. The output terminal 12 is connected to a tap of the resistor 34 and is clamped to a +15 volt source by a diode, as shown. The clamp or hold terminal 14 is connected via a resistor 42 and diode rectifiers 44, 46 and 48, in series, to a −30 volt terminal 50. The junction 52 comprises the junction of rectifiers 46 and 48 and the resistor 38 and condenser 40. The junction 54 of rectifiers 44 and 46 is connected, via a suppressor resistor 56, to the control grid of the tube R and through a condenser 58 to ground. The junction 52 can never be appreciably more negative than the −30 volt terminal 50 because the rectifier 48 conducts and maintains the voltage at junction 52 up to essentially that of terminal 50. It is the conduction of rectifier 48, during the initial time, that keeps junction 52 at approximately −30 volts. The resistor 38 tends to prevent the voltage at junction 52 from drifting, between the application of successive clamping pulses.

Operation of the Microsecond Delay Unit requires the use of a Sync pulse at the input and a Clamp pulse, as shown. The sync pulse is a positive pulse having a duration between 0.3 and 0.4 microsecond and a repetition rate of one megacycle. Its two voltage levels are −30 and +10. The clamp pulse is a negative pulse having a width of between 0.2 and 0.3 microsecond. The negative excursion of the clamp coincides with the negative excursion of the sync. The normal level of the clamp line is −10 volts and the pulse goes down to between −40 and −45 volts.

Assume the input at terminal 10 to be +10 volts. When the sync voltage goes to +10, triode L conducts producing a negative pulse across the inductance 16 of the plate circuit. The resistor 18, in parallel with coil 16, serves to damp the peaked pulse. This pulse is coupled via condenser 40 to the junction 52 which is driven to −30 volts. Diode 46 presents a high impedance so that the negative voltage does not discharge condenser 58. Next the sync voltage drops to −30 volts. This cuts off triode L and produces a positive pulse in the plate circuit. This pulse is also coupled through capacitor 40 to the junction 52. When the pulse exceeds the voltage at the grid of triode R it causes diode 46 to conduct. At the same time that the positive pulse is applied to the grid of the triode R through diode 46, the negative clamp is applied via resistor 42 and diode 44. Thus there exists the condition of a positive pulse supplying charge to condenser 58 at the same time that the negative clamp is removing it. The positive pulse has greater duration than the clamp pulse, and with the rate of discharge permitted by resistor 42, +10 volts will exist at the grid of triode R. This voltage cannot remain above +10 since this is the level of the clamp line, except during the interval of the clamp pulse. Thus, as long as the input is +10 volts, the output at terminal 12 will remain at +10 volts.

Assume that the output is changed to −30 volts and that this change takes place during the interval that the sync line is at −30 volts. Since there is a plus AND circuit 30 at the input, the grid voltage will stay at −30 volts, instead of following the sync voltage, and there will be no positive or negative voltages produced in the plate circuit of triode L. The output at terminal 12 will remain at +10 until the clamp pulse discharges condenser 58 changing the input of triode R from +10 volts to −30 volts. If the voltage attempts to go below −30 volts, diodes 48 and 46 will conduct, clamping it. As long as the input remains at −30 volts there will be no positive pulses produced and each clamp pulse will keep the triode R grid at −30 volts.

As will now be obvious, the reading in of a zero to be stored in the Microsecond Delay Unit is much simpler than reading in a one. Since the information line is at −30 volts, for a binary -0-, no sync pulse can be gated through to produce any pulses at the plate of peaking tube L. Therefore, when the clamp pulse tends to discharge the storage capacitor 58, no opposing pulse will be present to interfere with the discharging action. The discharge path has so large a time constant that the clamp pulse can discharge the capacitor to only −25 volts before it disappears. The amplitude of the clamp pulse and the value of resistor 42 were chosen to allow a quick discharge of the capacitor when the unit is reading in a zero over a one without giving excessively large glitches.

The Microsecond Delay Unit does not delay a pulse, in the sense that a delay line does. When given the proper input, the Delay Unit produces an artificial pulse which is timed accurately with respect to the timing pulse of the machine. The information input pulse, in effect, gates the sync pulse, so that the fast fall of the sync pulse can cut off the peaking triode to obtain the peaking action. To fulfill these qualifications, the input pulse must be present both before and while the sync pulse falls; therefore, the input pulse may be very poorly shaped or entirely absent, during the first 0.6 of a microsecond, and still be sufficient. On the other hand, the Delay Unit produces a uniform output pulse which is up to +10 volts by 0.2 time. If an input pulse should arrive at 0.8 time, the delay is then only 0.4 microsecond. The only time that a delay unit will produce a delay of one full microsecond is when it is fed a pulse that comes up at 0.2 time. Such pulse may be from another or even the same Delay Unit, as in the instant case. The fact that the pulse may be from the same Delay Unit, i. e., the output may be fed back to the input, is utilized in conjunction with a holding line to retain information in the Delay Unit so that it acts as a storage device. It is thus seen that the Delay Unit has two operative states, one state representing -0- and the other state a -1-. To read an information bit of -1- – into the Delay Unit, the input at terminal 10 is made plus. At the same time the Hold line, which permits feedback of the output to the input, is rendered negative, as will be described in detail below, so that the data originally in the Delay Unit cannot be fed back to its own input at the time new data is being applied. If the Delay Unit contains a one, the sync pulse will be gated in, to produce another one, which will appear during the next microsecond, to gate through the following sync pulse, since by this time the Hold line will be plus again, provided a second bit is not being immediately entered. Storing of a zero is merely the suppression of the sync pulses by the −25 volt output of the Unit. Process of storage will continue until the Hold line is made negative when new information is read in. It should be noted that at the time new information is read in, it has no effect on the information appearing at its output. This property makes the Delay Unit valuable as a shifting register, as employed herein, and as described in detail in copending Havens et al. application, Serial No. 257,747, filed November 23, 1951.

MQ Columns S, 1, 2, 6, 34 and 35 are shown in Figs. 5 and 6. Each column includes a Delay Unit, described above, together with the necessary external connections which, as stated, differ slightly among respective orders, as will be pointed out more particularly as the description proceeds.

In order to adapt the MQ Register to ring shifting operations, in both left and right directions, adjacent orders are connected so that for right shift, the output of a lower order can be fed to the input of the next succeeding higher order (MQ (S) output to MQ (1), Fig. 5, for example) or for the left shift, the output of a higher order is fed to the input of a lower order (MQ (1) output to MQ (S), Fig. 5, for example). Furthermore, the output of MQ Column (S) is fed to the input of MQ Column (35) during a left shift (see line To MQ (35) Fig. 5), while the output of MQ Column (35) is fed to the input of MQ Column (S) during a right shift (see line To MQ (S), Fig. 6).

A memory bus 62 (Figs. 1, 5 and 6) provides a parallel connection for each of the Memory Register orders with corresponding orders in the MQ Register whereby, under control of a Copy Write signal, as described above, all 36 bits of a word stored in the Memory Register may be simultaneously transferred to the corresponding orders of the MQ Register, the respective connections being from the output of the Memory Register columns to the input of the corresponding MQ Register columns. This is shown diagrammatically only in Figs. 1, 5 and 6. This entry is indicated by arrows leading into all orders of the MQ from the Memory bus. Also as described above, the outputs of all orders of the MQ may be entered in Electrostatic Memory as indicated diagrammatically in Fig. 1.

An input-output bus 64 (Figs. 1, 5 and 6) and herein referred to as the I/O Bus is the medium by which information stored in the MQ Register is carried to the read-write heads, and by which information, read from the tape, is stored in the MQ Register. Since the Tape Entry positions (from tape into MQ) are at the S–5 Columns (Fig. 3) and the Tape Exit positions (from the MQ to the tape) are at the 30–35 MQ columns, it will be evident that the I/O Bus respective lines, as far as the present invention is concerned, will be switched, as indicated generally in Fig. 1, so that information is entered only into MQ Columns S–5 (Figs. 1 and 3) and read out of only MQ Register Columns 30–35 (Figs. 1 and 3). The I/O Bus is also connected to the other columns of the MQ for purposes of utility in the Main Machine, but is not required for the instant invention.

As stated in the detailed description of the Microsecond Delay Units, the Hold circuits must be operated, either to hold data in the units or to permit entry of new data in place of the old or to permit shifting. Further, as will be obvious from the general description, Ring Shift Control circuits, Shift MQ Left circuits, Shift MQ Right circuits, as well as the circuits for gating information into the respective MQ orders, will be required and circuits for effecting a redundancy count of bits being read into or out of the MQ Register. Since the Hold circuits operate as a part of the Ring Shift Control circuits, their description will be incorporated into that of the Ring Shift circuits.

A Ring Shift signal, initiated by a Tape Gate signal, as described in detail below, is transmitted from the Ring Shift Control circuits (Fig. 6) over a line 65, to the input of each of the MQ Register orders S, 1 and 35, respectively. Signals Ring Shift MQ Left 6 and Ring Shift MQ Right 6 are produced by the Ring Shift Control circuits (Figs. 6 and 26) which are fed (Figs. 6 and 5) to the MQ Register Column (S) Hold Circuit (Fig. 28) to break this hold circuit. Also, these Ring Shift signals are fed to the Shift MQ Left circuits (Fig. 27) and the Shift MQ Right circuits (Fig. 27*a*) to produce selectively a signal Shift MQ Left on line 66 or Shift MQ Right on line 68, which are fed to the inputs of all of the MQ Register orders and also to the MQ Register (S–35) Hold circuits (Figs. 5, 28*a* and 28*b*) to break the hold circuits of orders 1–35. These signals also condition AND circuits (Figs. 10–14) in the respective orders, as described in detail below, to permit passing of the output of one column to the input of an adjacent column, when shifting information in the MQ Register in either direction. A signal Hold MQ Register (S) is fed via line 70 from the MQ Register Hold circuits (Fig. 5) to MQ Column S, a signal Hold MQ Register (1–5) is fed via a line 72 to the MQ Register Columns (1–5) and a signal Hold MQ Register (6–35) is fed via line 74 to MQ Register Columns (6–35). An information gating signal I/O Bus (S–5) Into MQ is fed to columns S–5 (Figs. 5, 10, 11 and 12), while a signal I/O Bus (6–35) Into MQ is fed to columns 6–35 (Figs. 6, 13 and 14). Herein, however, as stated before, we are concerned only with the signal I/O Bus (S–5) Into MQ and not with the signal I/O Bus (6–35) Into MQ since, insofar as this invention is concerned, information is entered from tape to the MQ Register in columns S–5 only, while read-out is performed on the MQ Register columns 30–35 only. As is seen in the drawings, an arrow is used to indicate the word "into." See for example the legend (Fig. 5) I/O Bus (S–5) "into" MQ.

As stated above, the present invention will deal particularly with entry from the I/O Bus into orders S–5 only.

Referring to Figs. 10 through 14, and particularly to Fig. 11, which illustrates MQ Register Column (1), it is seen that the signal Shift MQ Right conditions an AND circuit 848 so that when the signal Ring Shift is also present and applied thereto, the MQ (S) output applied to this AND circuit may pass therethrough and via an OR circuit and a cathode follower to the Delay Unit of column (1), the signal Hold MQ Register (1–5) conditioning an AND circuit whose other input is the output of this Delay Unit so that the output is normally fed back to the input, to thus store a bit in this Column (1). The signal Shift MQ Left conditions an AND circuit **750*a* so that the MQ Register (2) output also applied to this AND circuit may pass to the Delay Unit of Column (1**) when ring shifting left (see also Fig. 5).

The signal I/O Bus (S–5) Into MQ conditions an AND circuit so that information on the I/O Bus (1) line may thus be switched into column (1). The operation of switch "D" of Fig. 1 will thus be obvious when transferring data from the I/O Bus into the MQ.

MQ Register Column S (Fig. 10) and MQ Register Column 5 (Fig. 12) each has a connection 75 from the output of the respective Delay Unit to a Tape Redundancy Counter, as shown in Fig. 5. The connection from MQ Column S to the Tape Redundancy Counter is labeled To Tape Redundancy Counter and is utilized during a left ring shift of bits, while the connection from MQ Column 5 to the Tape Redundancy Counter labeled Column (5) Only is utilized for a right ring shift, which is performed when reading tape backward.

With the foregoing general description of the overall nature and operation of the MQ Register in mind, we may now proceed to a specific consideration of Writing on the tape the information stored in the MQ Register.

*Writing on tape*

Let it be assumed that the MQ Register (Fig. 1) has been loaded by dumping 36 bits from the Memory Register into the MQ. As stated above, the Memory Register is connected in parallel to the MQ Register, via the Memory Bus 62, by way of suitable switches (as shown diagrammatically in Fig. 1), so that the respective orders of the Memory Register are directly connected to corresponding orders of the MQ and thus all 36 bits in the Memory Register are entered into the MQ simultaneously.

Since the Tape Exit from the MQ Register is from the orders 30 through 35 (Fig. 3), it is apparent that in order to write the stored data in the MQ upon the tape, the bits stored in the MQ positions S–5 must be ring shifted left, so that the bits are introduced bit by bit from the 1, 2, 3, 4 and 5 orders, into the S order, and from the S order bit by bit via the line To MQ (35) of Fig. 5, to the 35th order, MQ (S) Output, Fig. 6, and by way of the 35th order into the 34th, 33rd, 32nd, 31st and 30th orders, thereby rendering these bits available for exit from orders 30 to 35 of the MQ (Fig. 3) to the tape writing circuits, in their normal order.

Referring to Fig. 10, column (S) of the MQ and Fig. 14, column (35), it will be noted that an input to each of these orders is the signal Ring Shift. In Fig. 10, Ring Shift is one of the inputs to an AND circuit 300, while in Fig. 14 the same signal is an input to an AND circuit 750*d*. This Ring Shift signal (Figs. 6 and 26) is initiated by a signal Tape Gate (Figs. 6, 8 and 25) produced by a signal Start Tape Cycle (Figs. 7, 8, 17 and 25) which in turn is produced during Writing, by a Tape Write Timer Output signal (Figs. 7 and 16).

Referring to Fig. 16 which discloses in block form the Tape Write Control circuits, four triggers 304, 306, 308 and 310 comprise the Tape Write Timer whose Tape Write Timer Output signal, as stated above, produces the Start Tape Cycle signal, which in turn produces the Ring Shift signal. Trigger 304 is a fast trigger of the kind shown in Fig. 41, while triggers 306, 308 and 310 are slow triggers of the kind shown in Fig. 42. These triggers are reset to the conditions as indicated by the X in their respective block symbols (Fig. 16), wherein the position of the X indicates the conducting side of the trigger. Triggers 304, 306 and 308 are thus reset with the left hand side conducting, and trigger 310 with the right hand side conducting.

In order to initiate operation of these four triggers which operate as a counter, an AND circuit 312 must be conditioned by three input signals, these being MQ Loaded By Copy, fed from the Copy Execution Timer to the Tape Write Control circuits (see also Figs. 5*a* and 7), Start Tape Write from the Tape Motion and Status Controls circuit (Fig. 7) and Tape Write Select also from the Tape Motion and Status Control circuits. When these three signals are available, the output from AND circuit 312 (Fig. 16) will trip a slow speed trigger 314 which will act through a cathode follower 316 to condition one input of a double diode AND circuit 318. The other input to AND circuit 318, by way of a cathode follower 320, is a Master timing pulse A4(D1.0). The term A4 indicates that the pulse occurs at "4" time in a Master cycle of 12 microseconds, and the term D1 indicates that the pulse duration is 1 microsecond. This will pass through the conditioned AND circuit 318 and constitute the first input pulse to the first trigger 304 of the Tape Write Timer.

The four triggers are so connected that the output on the left hand side of output trigger 310 is normally up, but upon application of this first A4(D1.0) pulse to the Timer, all four triggers are flipped and the voltage of the output trigger 310, on the left hand side thereof, will fall, and this pulse will feed through a cathode follower 322 to a line 324 which comprises the Tape Write Timer Output (Fig. 7) and will proceed via this line to the Tape Read Control circuits (Figs. 7 and 17), where this relatively negative signal is applied via line 324 and a diode, to a trigger 546 (Fig. 17) to flip this trigger "on." The plus output from the right side of this trigger is now applied via a cathode follower 548 to one input of an AND circuit 550 whose other input, the signal Tape Select from the Tape Motion and Status control circuits, is plus (Figs. 7 and 17) since this particular tape unit, being described, is assumed to have been selected. Thus the signal Start Tape Cycle is produced on line 554 (Figs. 7 and 17) which, as described in detail below, will initiate the signal Tape Gate.

After eight more pulses have been applied to the input of the four trigger Tape Write Timer (Fig. 16) the voltage of the output trigger 310 on the left hand side thereof will rise. Prior to this, its voltage has been sustained in a negative condition for a total of 96 microseconds (one A4(D1.0) pulse being provided once for each 12 microsecond interval, and 9 pulses providing 8 of these 12 microsecond intervals). When the voltage of the left side of the output trigger 310 thus rises, the voltage of its right hand side falls and is fed, via a cathode follower 326, to reset triggers 304 and 308, so that a second output will be obtained from trigger 310 upon the application of three more A4(D1.0) pulses. Thus, the rhythm of the voltage of the line connected to the left hand side of the output trigger 310 is down 96 microseconds and up 36 microseconds.

Before proceeding to the production of the signals Start Tape Cycle and Tape Gate which initiates the ring shift, the signal Write Tape Group, which is also an output of the Tape Write Control circuits (Fig. 16) will be described. When the Tape Write Timer trigger 310 is flipped "off" and the output of the cathode follower 326 falls, as described above, this is also used to turn "on" a trigger 328, which will be turned "off" by the subsequent Master A2(D1.0) pulse applied by way of a cathode follower 330. Upon the occurrence of this event, the output of the trigger 328 will, by way of a power cathode follower 332, produce the ten microsecond signal Write Tape Group which (Figs. 7 and 8) initiates the sampling of the Tape Exit lines (Figs. 8 and 18) and of the Tape Exit (Check) to permit the writing of bits which appear on these lines as positive pulses and the redundancy bit if required. For this operation, reference will now be made to the Tape Information Control-Write circuits (Fig. 18) where it is seen that the signal Write Tape Group enters by way of a cathode follower 334 and is applied to an AND circuit 336 which must also be conditioned by a signal TU Connected which is received from the Tape Motion and Status Control circuits (Fig. 7) and will be present since this particular unit has been selected for operation with the MQ Register. Each of the Tape Exit lines 30–35 (Figs. 3, 8 and 18) and also the Tape Exit (Check) signal enter the Tape Information Control-Write circuits by way of individual cathode followers 338 (Fig. 18), the output of each of which is a conditioning signal for a double diode AND circuit 340 feeding an associated cathode follower, each of these AND circuits being controlled by the Write Tape Group signal, so that any Tape Exit lines which are up, representative of a binary –1–, will pass a signal via the associated AND circuit to the Tape Write circuits (Figs. 8 and 19) which in turn control the Read-Write Heads (Fig. 20) to produce the writing of a binary –1– upon the tape.

The manner in which the Tape Exit lines 30—35 and the Tape Exit (Check) signal line are selectively conditioned to write a binary –1– or a binary –0– will be described in detail, subsequent to completion of the description of the ring shift operation.

As described above, the signal Tape Write Timer Output (Fig. 16) is transmitted to the Tape Read Control circuits (Fig. 17) wherein is produced the signal Start Tape Cycle. This signal is transmitted, in turn, to a Tape Gate Generator (Figs. 7, 8 and 25) where it is utilized to produce a signal entitled Tape Gate which is produced under control of the signal Start Tape Cycle in the same manner as described below in the description of the reading operation.

This signal Tape Gate is transmitted (Figs. 8, 7 and 6) to the Ring Shift Control circuits (Fig. 26) where it passes through an OR circuit 342 and by way of cathode followers 344, emerges as the signal Ring Shift which is necessary to condition one input of the AND circuit 750*d* (Fig. 14, for example) controlling the input into the MQ Register column 35. In Fig. 14, it will be noted that a second input to this AND circuit 750*d* is the MQ (S) Output so that when a third signal Shift MQ Left is also applied to this AND circuit, there will be a transfer (during a left shift) of the contents of the S order of the MQ Register into the 35th order of the MQ Register.

The signal Shift MQ Left is produced (Fig. 27) under control of Ring Shift MQ Left 6 which is passed through an OR circuit 346, an amplifier 348 and power cathode followers 350 and 352.

The signal Ring Shift MQ Left 6 (Figs. 6 and 26) is produced by coincidence upon an AND circuit 346 of the signal Tape Gate on line 566, a signal entitled Not Tape Read Backward Select on line 738 and a pulse of 6 microseconds duration, produced by operation of a trigger 348, whereby the output of AND circuit 346 feeds via an OR circuit 742 and a cathode follower 744 as an output of six microseconds duration on the line 748 entitled Ring Shift MQ Left 6. This pulse is applied through line 748 to the Shift MQ Left circuits (Fig. 27), as described above, to provide the signal Shift MQ Left on line 66 (Figs. 6 and 27) of six microseconds duration for application, for example, to the AND circuit 750*d* of MQ Register column 35 (Fig. 14). Thus, there is available an output from this AND circuit which is of six microseconds duration and which is passed through an OR circuit 350 and a cathode follower 352 to the Microsecond Delay Unit 354. Accordingly, at the end of six microseconds (due to the release of the Hold circuit as described below) there will be stored in the Delay Unit of the MQ Register Column (35) that particular bit which, at the beginning of the ring shift left operation, was standing in the MQ Register Column (5).

As stated generally above, in order to ring shift as indicated, it is necessary that the normally plus signals entitled Hold MQ Register (S) (Fig. 10), Hold MQ Register (1–5) (Figs. 11 and 12), and Hold MQ Register (6–35) (Fig. 14), which are applied to the AND circuits 356 (Fig. 10), 358 (Fig. 11), 360 (Fig. 12), 362 (Fig. 13), and 364 (Fig. 14), respectively, to permit the feedback of the respective outputs of the Microsecond Delay Units on lines 366, 368, 370, 372 and 374 of Figs. 10 through 14, respectively, to their respective inputs, must be made minus for the duration of these six microseconds in order to break the respective Hold circuits and permit shifting of the bits six times.

The respective hold signals are rendered minus as follows: By reference to the MQ Register Columns (6–35) Hold circuits of Fig. 28*b*, for example, it will be seen that the signal Shift MQ Left, which is of six microseconds duration, will render the normally plus signal Hold MQ (6–35) minus, for six microseconds via OR circuit 376, an inverter 378, and power cathode followers 380 and 382. The negative six microsecond signal Hold MQ (6–35) is fed via line 74 to the MQ Register Column (35) circuits (Fig. 14), for example, where it provides a negative input to the AND circuit 364 to thus break the hold circuit, for six microseconds, this being the same AND circuit whose other input is the feedback of the Microsecond Delay Unit 354.

The inputs to the Microsecond Delay Unit 354 of column 35 (Fig. 14) during ring shift left are the respective sequential outputs of MQ Register Column (S), these occurring at a time separation of one microsecond. If the output of the S order is a binary –1–, the conjunction of a sync pulse with this binary –1– input pulse acting on the double diode AND circuit input (Fig. 15) of the Microsecond Delay Unit will produce an output from this unit which is positive. It is to be particularly noted that this output cannot be fed back into the input during ring shift left by way of the feedback line 374 (Fig. 14), since the hold circuit will be disabled for six microseconds. Therefore, as each different output bit is available from the S order of the MQ Register, it is applied to the input of the 35th order and, at the end of five microseconds, that bit which was originally stored in the 5th order of the MQ Register at the start of ring shift left is now available at the input of the S order of the MQ Register, and after a one microsecond delay, or at the end of a total of six microseconds is applying its output to the input of the 35th order, so that at the end of the six microsecond ring shift left period, the bit which was previously stored in the 5th order of the MQ Register will now appear in the 35th order. Thus, there has been a sequential shift of each of the bits originally contained in orders S–5, one at a time, out of the output of the S order into the input of the 35th order, with further left shifts, so that at the end of the ring shift left process, those bits originally appearing in orders S–5 of the MQ Register are now in orders 30–35.

The bits originally in the S order and the bits shifted left into this order, are applied via the line entitled To Tape Redundancy Counter (Figs. 5 and 6) to the Tape Redundancy Counter (Fig. 29) as MQ (S) Output on line 754 and are applied to an AND circuit 384, as described in detail below. In a system wherein a word of 36 bits is processed in groups of 6 bits each, it is particularly important to count the bits in the several groups to detect any errors in the reading and writing process. In writing on tape, and particularly while moving groups of bits from the MQ Register, the binary –1's– in each group of six must be counted, in order to instruct the writing circuits to write a binary –1– in the 7th track on the tape, in case the number of binary –1's– counted in a particular group is even. This count is maintained in the Tape Redundancy Counter shown in Fig. 29 which will now be described.

The Shift MQ Left signal, produced as described above, is applied via line 752 and is effective for six microseconds in the Tape Redundancy Counter by way of the AND circuit 384 whose other input is MQ (S) Output, so that during these six microseconds, the respective outputs of the S order of the MQ Register are applied to the other input of this AND circuit. Thus, for each binary –1– output of the S order an output is produced by AND circuit 384 and via an OR circuit 756 and a cathode follower 758 is applied as one input to an AND circuit 386. An Inverted Sync pulse is fed via line 388 and a cathode follower 760 to a sync inverter 390 where it is reinverted and is then fed through a cathode follower 392 and applied as a second input to the AND circuit 386. The third input to this AND circuit 386 is the control signal Tape Gate on line 392, so that the signal, Inverted Sync, times the output of the AND circuit 386 during the signal Tape Gate. The output of AND circuit 386 is applied, through a slow speed inverter 394, to the binary input of a Redundancy Trigger 396 which (for writing) is initially reset with the right hand side conducting, as follows.

The line 398, Tape Entry (Check), which is negative during the writing operation since no binary –1– bit is being read from the tape to render it plus, is applied to a slow speed inverter 400, so that its output feeding into a cathode follower 402 is positive, and thus all three inputs to an AND circuit 404, Tape Gate, Tape Entry (Check) and A1(D1) are positive, thereby setting the Redundancy Trigger 396 "Off," so that its right hand side is conducting.

The Redundancy Trigger 396 will be flipped each time a pulse indicative of a binary –1–– is received from the (S) order of the MQ and is applied to its binary input. At the end of six microseconds, if the trigger is conducting on the right hand side so that its left hand output will be up, which is indicative of an even redundancy count, it now becomes necessary to write a binary –1– in the 7th track of the tape. This will be done by means of cathode followers 406 and 408 (Fig. 29) whose output signal Tape Exit (Check) is fed to the Tape Information Control-Write circuits (Figs. 8 and 18) where it acts via a cathode follower 338, and AND circuit 340 (now conditioned by Write Tape Group) and a cathode follower to produce the signal Write "C," which by means of the Tape Write circuits (Figs. 8 and 19) and the Read/Write Head coils (Figs. 8 and 20) will write a binary –1– in the 7th track of the tape, this tape having been erased clean by the Erase coil (Fig. 20), which is energized to erase the full width of the tape when the Write Status relay (Fig. 19) is energized as it is during Writing.

It is to be particularly noted that the Tape Information

Control-Write circuit (Fig. 18) is rendered operative for the Tape Exit (Check) and for all Tape Exit lines (30–35) by the sampling pulse Write Tape Group produced in the AND circuit 336 which is effective to sample all the AND circuits 340, 412, 414, 416, 418, 420 and 422. The signal Write Tape Group is produced at a time subsequent to the redundancy check so that it is only the final status of the Redundancy Trigger 396 (Fig. 29) when all six bits have been counted which is determinative of whether or not a binary -1- or a binary -0- will be written on the tape.

An I/O Bus 64 wire (one for each order 30–35) in the Distributor 30 through 35 (Fig. 30*a*) will supply the output of a particular one of the MQ orders 30–35, by way of its cathode follower 410 to a particular Tape Exit line (Fig. 18). The circuit of the Distributor as illustrated in Fig. 30*a* is typical of each of the six provided for the Tap Exits. The individual cathode followers 410 apply the respective outputs of the 30–35 orders of the MQ to the respective AND circuits 412, 414, 416, 418, 420 and 422 (Fig. 18), so that the sampling pulse Write Tape Group will write binary -1's-, for any of the MQ orders 30–35 which contain a binary -1-, at the same time as the redundancy bit is written into the 7th position of the tape, under control of the AND circuit 340.

The Tape Write Circuits (Fig. 19) one of which is provided for each of the outputs of the seven bit positions of Fig. 18, have respective inputs which are all produced under control of the Write Tape Group pulse (Figs. 8 and 18) generated by the Tape Write Control circuit (Figs. 7 and 16), this pulse being a ten microsecond pulse, as described above, so that the outputs on the lines Write "C," etc. (Fig. 18) will also be ten microsecond pulses, provided that a binary -1- is available either from the Tape Exit (Check) output or from the respective Tape Exits 30–35 which comprise the outputs of the 30–35 orders of the MQ Register.

Each of the lines Write "C," etc. of the Tape Information Control-Write circuits (Fig. 18) feeds a trigger in its corresponding Tape Write Circuit (Fig. 19), for example, trigger 424, to flip the trigger one way or another, for each binary -1- to be written, so that by means of a Write trigger 426, current will be fed, through one-half or the other of a read-write coil 75 (Fig. 20) to the center tap thereof, to thereby write a a binary -1- on the tape in non-return to zero fashion. Thus, binary -1's- are written on the tape, by producing a change in flux, and are indicated thereon by a change in the magnetic condition, at the particular positions where a binary -1- has been written, while no change will be produced on those positions where a binary -0- is written.

The trigger 424 is shown in detail in Fig. 21 together with its block symbol T*t*. This trigger is used to provide a push-pull input to the Tape Write trigger 426 shown in detail together with its block symbol W*t* in Fig. 22. The signal applied to the input terminal 428 of trigger T*t* (Fig. 21) is a standard 10 microsecond positive pulse which arrives when a binary -1- is to be written. The fall of this pulse flips the trigger, and in so doing, reverses the voltage inputs to the Tape Write trigger W*t* (Figs. 19 and 22). Overall considerations of the circuits that the trigger 424 must feed dictate that the plate supply should be grounded as shown in Fig. 21. The 47K resistor 430 in the cathode circuit is the differentiating resistor for the binary input, and the 1 megohm resistor 432 connected to ground, as shown, is added to desensitize the circuit. In other respects, the trigger T*t* resembles the high speed trigger illustrated in Fig. 41 and described in connection therewith, although no clamping is used on the grids. The approximate D. C. levels of the plate are −68 and −15 volts, while the grids are approximately −100 and −120 volts. The cathode is near −100 volts. The plate outputs 436 and 434 (Fig. 21) are connected, respectively, to the Tape Write trigger W*t* inputs 438 and 440 (Fig. 22).

The Tape Write trigger W*t* (Fig. 22) is used to supply current to the Read-Write Head coils (Fig. 20). It is fed a push-pull input from the trigger 424 (Fig. 19) with levels of −15 and −68 volts, as stated above. These levels appear upon the grid of the write tube as approximately −30 and −70 volts. The Write trigger circuit W*t* is actually a cathode follower OR circuit, with one tube always cut off in the D. C. state. The inputs are protected from excessive grid current by the 47K resistors 442 and 444. The cathode return is connected, through Write Status relay contacts, to −100 volts, when the circuit is turned on, to Write, and to ground, when the circuit is turned off. The plate outputs 446 and 448 are connected to the Read-Write Head coils (Fig. 20).

It is necessary during writing to know when a plurality of groups of bits equal to a complete word have been taken from the MQ Register and written on a tape. To this end a Tape Group Counter (Figs. 8 and 31) counts the number of groups transmitted by the MQ Register and upon the count of six such groups, a signal is emitted, indicative of the fact that one entire 36 bit word has been written.

Referring particularly to Fig. 31, it is seen that an AND circuit 450 is conditioned by Tape Gate which passes thereto by way of a cathode follower 452, the Tape Gate initiating each ring shift of a group of six bits, as described above. The AND circuit 450 is also fed by an A4(D1) pulse. The output of the AND circuit 450, by way of a cathode follower 454, is applied to the first trigger 456 (Fig. 31) of a three trigger counter (this first trigger 456 being originally reset with the left hand side conducting as indicated), to thereby flip the trigger so that its right hand side is conducting. A negative pulse is thereby produced at the right hand output to operate via a cathode follower to flip a second trigger 457 which in turn flips the third trigger 458. At the end of five input pulses applied to the first trigger of the Tape Group Counter, the trigger 456 is conductive on its right hand side, while the trigger 458 is conditioned with the left hand side conductive, thus conditioning one side only of an AND circuit 460, via a cathode follower 462. On the 6th pulse the trigger 456 is flipped to render the left hand side conductive, and the right hand side non-conductive, so that by way of cathode follower 464 the other input of the AND circuit 460 is made plus which, by way of its cathode follower 466, produces the output signal Tape Word Complete which is fed to the Tape Write Control circuits (Fig. 16) wherein it is utilized with other signals applied to an AND circuit 468 to produce a signal Tape Copy Proceed which enables another word to be read from the Memory Register into the MQ Register, the original word now having been completely written on tape. As stated above, the transfer of information from the Memory Register to the MQ Register is a well known sidewise dumping operation in which respective orders of the MQ Register are made to agree with corresponding orders of the Memory Register, as diagrammatically indicated in Fig. 1.

In the event there is no such COPY signal available, the signal Tape Word Complete is effective through AND circuit 470 (Fig. 16) in conjunction with certain of the signals applied to AND circuit 468 to produce a signal which cooperates with the signals Start Tape Write and Not Copy to actuate AND circuit **470*a* to produce a signal Tape Unit Write Disconnect on the line 472** so that the tape unit is disconnected from the remainder of the machine.

*Reading from tape*

A set of seven tape read-write heads each containing two halves of a coil 75 (Fig. 20) is arranged transversely of the tape path in each of the tape units. The center tap is grounded and the outside wires of the coils of each head lead to the input lines 472 and 474 of a respective Tape Read and Shaping Circuit (Fig. 23), each comprising three resistance-capacitance-coupled push-pull class A amplifiers 476, 478 and 480, a pair of cathode followers 482 and 484, an inverter 486, a single-shot multivibrator 488 and a cathode follower 490, all as shown in Fig. 23 in block form. The detailed circuitry of Fig. 23 is shown in Fig. 24.

It has been noted before that the tape being read is written with the characteristic non-return to zero flux pattern which involves two-state plus or minus saturation. Either the transition from − (minus) saturation to + (plus) saturation or from + (plus) saturation to − (minus) saturation constitutes a binary –1–. No transition constitutes a binary –0–. The voltage pattern that is delivered to the amplifiers resulting from a binary –1– pulse pattern is bi-polar with a shift from one polarity to another being representative of a binary –1–. The voltage level is approximately 15 millivolts, base line to peak.

The first stage 476 of the amplifying circuits (Figs. 23 and 24) is a capacity coupled push-pull amplifier employing degenerating feed-back in the cathode circuit. The capacitive coupling is used to pass the read pulses, and to suppress 60 and 120 cycle noise from the read lines. The value of the resistor in the coupling circuits is chosen so that there will be no over-shoot of the input pulse, so that the loading on the read pulse will not be excessive. The individual resistors in each cathode circuit supply degeneration to stabilize gain. The common cathode resistor is used for degeneration to reduce the gain of in-phase signals on the inputs. Because of the asynchronous nature of tape reading, the wave forms may appear quite blurred.

The second stage 478 of the tape amplifier closely resembles the first stage amplifier 476. The gain of this circuit is about ten, since the resistor in the cathode circuit is larger than that in stage 476, while the plate resistors are the same. The potentiometer between the plates of the tube in stage 478 is used to control the gain of this stage and thus the overall gain. The D. C. level of the plate is about +95 volts, but the cathode level is around +2.5 volts.

The third stage 480 of the amplifier is similar to the first two stages. Since by now the signal-to-noise ratio is relatively large, the coupling capacitor is larger. An approximate gain for this circuit is 20. The plate level is about +120 volts, and the cathode is about +4 volts.

Since these three amplifiers are push-pull with cathode degeneration, a loss of signal from the output of one of the first stages will not be materially noticed at the output of the third stage 480. Signal amplitudes at the plate of the third stage 480 should be relatively equal. The overall gain of the three amplifier circuits is at least two thousand.

Each output of the third amplifier stage 480 feeds a separate cathode follower respectively 482 and 484, with a common cathode resistor of 10K. The cathode output of these circuits is clamped with a crystal diode so that the voltage at the cathode cannot go below ground. The grids of the cathode followers 482 and 484 are connected to a variable bias voltage called a clipping voltage. When this voltage is made more negative, the push-pull signals on the input to the cathode followers are biased to a lower voltage and more of the signal is removed by clipping at the cathode. This clipping voltage is set so that any noise pulses of expected amplitude, for the gain setting used, will not appear. Any higher signal will appear as an output for the cathode followers.

The outputs of the cathode followers 482 and 484 feed an inverter circuit 486 whose function is to supply a satisfactory negative shift to the single-shot multivibrator 488 which it feeds. This inverter has some cathode degeneration, which tends to keep it operating class A. The single-shot multivibrator 488 is used to give a standard output from the tape amplifiers. This circuit is cathode-coupled, but its operation is considerably different from that of a standard single-shot multivibrator described above. The basic difference is that the timing is controlled at the left cathode. In operation, a negative pulse is coupled through the input capacitor and is differentiated by the input circuit. The left tube is initially conducting and is cut off by the negative pulse. Its plate rises and pulls up the grid of the right tube, which is normally cut off. This action causes the right tube to conduct, and in doing so its cathode rises. This cathode rise is coupled back to the left cathode, and this rise further cuts off the left tube. Such regenerative action continues until the left tube is completely cut off and the right tube is conducting. After this quasi-stable condition is reached, the voltage on the grid of the left tube begins to rise exponentially toward ground potential. At the same time, the voltage on the left cathode pulls exponentially toward −100 volts. This action is due to the charging of the cathode-coupled-capacitor through the right tube, that capacitor and the left cathode resistor. Since the left cathode is falling, and the left grid is rising, some point will be reached when the left tube will begin conducting again. This conduction causes the left plate to fall, the right grid to fall, the right cathode to fall, and thus the left cathode to fall. This regenerative action returns the circuit to its stable state. As mentioned above, the output of the single shot multivibrator 488 is fed to a cathode follower 490, the output of which represents the respective bit read from the tape.

All of the cathode follower outputs on their respective lines 492 are fed to the Tape Information Control-Read circuits (Figs. 8 and 32) and at the same time each line 492 respectively feeds to an individual trigger constituting the first trigger of a pair, seven pairs comprising the Tape Registers (Figs. 8 and 33).

Each output on lines 492 (Fig. 23) which is defined as a Read Bit is fed to an OR circuit 494 (Fig. 32) in order to recognize the first bit, out of any one tape group, since the bits, although written in parallel, in a line perpendicular to the longitudinal axis of the tape, may align with the head coils partly serially due to misalignment or Skew.

The problem presented by such Skew will be best understood by reference to Figs. 34 through 39. The maximum bit density, which is 100 bits per inch, is a function of Skew (to take an oblique direction or course). Fig. 34 is a representation of the ideal spacial relationship between certain chosen bits of information on the tape. The tape writing heads are accurately assembled to write a group of magnetic pulses perpendicularly with respect to the longitudinal axis of the tape under ideal conditions. It is possible, however, for the tapes to go through their respective guides under the heads at an angle, due to the necessary tolerances of the mechanical system. A general idea of Skew may be obtained from Fig. 35 in which the total departure from the perpendicular is a measure of the Skew which occurred, while writing, and may be referred to as the angle of Skew while the Skew period is illustrated in Fig. 36. The misalignment illustrated in Fig. 35 is not the worst possible case for a given Skew of bits on tape. It is possible, while reading, that the relationship of the head and the bits be reversed from that which occurred during writing, as shown in Fig. 36.

The reading circuits, because they read in a parallel fashion seven bits at a time upon receipt of a bit of information from any track in a group, will asume that all information that the other six heads sense belongs to that particular group, if they arrive within a specified time after the sensing of the first bit. In a case such as shown in Fig. 36, the time required (or gate length) to get all the bits of one group read, would be at least equal to two Skew periods, plus any desired safety factor.

With the reading heads placed in relationship with the tape, as shown in Fig. 36, and with the tape moving from left to right, track C will be sensed first at time T1. The read coil, which will later read the bit in the bottom track, namely track #1, is effective one Skew period behind the read coil that is sensing the bit in track C at time T1. Thus, at time T2, the read coil in track #1 will be effective at a point along the tape previously assumed by the read coil of track C at time T1. One Skew period later the read coil #1 is over the bit in track #1 to be sensed at time T3. An absolute minimum gate length (see also Fig. 38) would be two Skew periods to receive all the information in one group.

Consider now the following spacial arrangement of bits as shown in Fig. 37. In Fig. 37 are shown two groups of bits on the tape (group A and group B), groups A and B comprising all the bits within the area as indicated, and the relationship between the head and bits is such that maximum permissible Skew exists. As the tape moves under the read head from right to left, the bit in track B, initiates the gate for a specified time, so that information may be transmitted to the Tape Registers. The tape continues to sweep past the head and, as shown, in order to read the bit in track #1 of group A, it would (under the conditions specified) also read the bit in track C of group B (as shown by the head position indicated) if group B were placed too close to the group which is presently being sensed. The tape circuits would thus sense the bit in track C, which is in the next group, as a bit in group A. Thus, it would misinterpret the information written on the tape. To avoid this the groups, as written upon the tape, must be placed far enough apart to prevent overlap in the sensing of bits of different groups. This distance is a function of the permissible Skew period of the tape system. The minimum length of space between bits on the same track is determined from the following considerations of two sequential groups of the binary –1– bit each.

Fig. 38 diagrammatically illustrates the minimum permissible distance between bits. If the bit associated with group A is in track #1 (written with the head positioned as shown by the dotted lines) and the tape moving from left to right, and if the head while reading is as shown in solid lines, the worst possible Skew conditions exist. It is important, therefore, to determine the distance that a bit in track #1, group B, must be displaced from a bit in track #1, group A, to permit proper reading. When the head senses a bit in track #1, group A, the timing (gate length equal to two Skew periods) to allow all the other bits to enter the register occurs, and the equivalent distance of this timing to a different scale is shown as Skew delay in Fig. 39, this delay comprising two Skew periods.

The length, parallel to the tape edge projected by the head (Fig. 38) is called the Skew period as has been previously explained, and to this length must be added the gate length. Allowing for the possibility of having a bit in track C of group B with its Skew, as shown in Fig. 38, it is also necessary to add this Skew period of group B in order to locate the bit in track #1 of group B. The simple addition of the three distances, i. e., two Skew periods and one gate length parallel to the edge of the tape, provides a total of four Skew periods as the minimum distance between two consecutive bits on the same track. The Skew period, in reference to the time domain, is 31 microseconds. Therefore, 124 microseconds must be the minimum time between groups. Actually, there are 132 microseconds between groups of bits, the difference between 132 and 124 microseconds being a safety factor. The Skew, as it can be seen, limits the density of bits placed on the tape.

Because of the difficulties precipitated by Skew, all of the bits in a group may not be read at the same instant of time. Along with the problem of Skew the problem of charging the I/O lines from the tape unit to the Main Machine, and the access time to the MQ Register further complicate the timing sequence. Consequently, the Tape Registers (one of which is shown in Fig. 33) provide a buffer storage system for the tape units to store the bits of information coming from the tape over a period of time and, at some later time, the Tape Registers transmit all of this information simultaneously to the MQ Register. Generally speaking, the buffer storage system consists of two triggers per bit, i. e., for each Tape Entry line, and the associated circuits between the triggers, the seven pairs of triggers comprising the Tape Registers. These registers will be described in detail at a later point herein.

In a general way, the voltage pulses that represent bits of information, after being amplified, come into the first set of seven triggers 496 (Fig. 33) for example showing one such trigger in a parallel method. The trigger 496 is turned "on" and conditions an AND circuit 498 whenever a binary –1–– bit in that particular track is sensed. Under conditions of no Skew, or very little Skew, Shift Tape Registers line 788 is up, and therefore a pulse passes through the AND circuit 498 to flip trigger 502 so that its right hand plate becomes positive. After a time of two Skew periods, the Shift Tape Registers line 500 falls to a voltage level of —30 volts. Now three events may follow: (1) The second register 502 may now charge the I/O lines and therefore make the information accessible to the MQ Register; (2) the first register trigger 496 may now accept new information from the tape heads while the second register trigger 502 is loading the bits of the previous group into the MQ Register; and (3) the two triggers are isolated from each other.

The nature of the triggers 496 and 502 constituting the Tape Register orders will be described presently. For the time being Skew time will be further clarified by reference to Fig. 39 in which two different cases of Skew are represented, the tape being considered as moving to the left. When the bit in track C is sensed by the reading circuits, a gate signal called Skew Delay is initiated, as will be explained later. The gate is 62 microseconds long. All the information within the group to be read by the reading heads must be read within the 62 microsecond period. This action insures that the first set of register triggers 496 will contain the proper information contained in the particular group of bits being sensed, if the limits of permissible Skew are observed.

The line 500 transmitting the signal entitled Shift Tape Registers is normally up under the above conditions. Therefore, the information which is stored in trigger 496 is also stored in trigger 502. At this particular point, the purpose of the Shift Tape Registers signal is not yet apparent, but it will become apparent during explanation of the second case of Skew.

At the end of the 62 microsecond period, the Shift Tape Registers signal line falls to a —30 volts level. This action initiates three events: (1) It resets to zero the first set of register triggers 496, allowing the triggers to store the next group of bits when they arrive; (2) it prevents any further shifting into the second set of register triggers 502 while the second register is performing the function of charging the lines to the MQ Register; and (3) it starts a 32 microsecond timing sequence which allows the output of the second register triggers 502 to charge up the I/O lines.

When the 32 microsecond timing period is over, a 21 microsecond timing period is initiated, to allow for access into the MQ Registers. At the end of the 21 microsecond access period, the information is assumed to be in the MQ Registers and the second set of register triggers is now reset to zero by the fact that the Shift Tape Registers line 500 comes up. Also, at this time, the information which was in register triggers 496 is transferred to the second set of register triggers 502.

In the first case, Fig. 39, it is to be noted that the entire sequence, Skew delay, line charge and access time was over before the first bit of the second group of bits was sensed by the reading head. In this case there was no apparent need for a second register trigger for the information was immediately stored in the second trigger 502.

In the second case illustrated in Fig. 39, however, this group of bits consists of a single bit, which is contained in track #1. The timing of the Skew gate, the line charge and access time to the MQ Register are as previously stated with respect to case #1, but almost immediately after the fall of the Skew delay, which means that all information in group B must have been received by that time, the head once again senses a bit, which is in the new group C. This bit enters register trigger 496 and is temporarily stored.

It is pertinent to note that the Shift Tape Registers line fell with the fall of the Skew delay line. The Shift Tape Registers line being at —30 volts prevents the information in trigger 496 transferring into trigger 502, since the AND circuit 498 is not conditioned by the Shift Tape Registers signal to pass a pulse. While the information in group C is being temporarily stored in the first trigger 496, group B's information, which is being held in the second trigger 502, is charging up the I/O lines and awaiting the pulse that will send the information, so held therein, into the MQ Registers. It is important to note that the information in the second trigger 502 is not disturbed by what is being fed into the first trigger 496.

At the end of the overall 51 microsecond period, the second register is reset by the rise of the Shift Tape Registers line 500, it being assumed that the information which was in the second register trigger 502 has now been transferred to the MQ Register. Also, the Shift Tape Registers line 500 going to +10 volts permits the information to be shifted, from the first trigger 496 to the second trigger 502, so that it may be eventually transferred into the MQ Register.

If it be kept in mind that for the worst possible allowable case the time between two successive bits in the same track is 133 microseconds, the timing circuits will regulate the information coming to the registers in such manner as to insure the proper relationship of the groups within a word.

All seven paths on the tape are sensed and the outputs are all applied to the OR circuit 494 (Fig. 32) of the Tape Information Control-Read circuit. At the same time the individual bit pulses are applied to the corresponding registers as noted above. The pulses applied to the OR circuit 494 (Fig. 32) pass through a cathode follower 504 and through an AND circuit 506, through an OR circuit 508 and to two power cathode followers 510 where they emerge on line 512 as the signal Selected Group Pulses. Thus, the very first bit of a group sensed in any track of the tape produces an output on line 512 entitled Selected Group Pulses. This output is applied via line 512 (Figs. 32 and 17) to a slow speed trigger 514 called the Counting Gate trigger in the Tape Read Control circuits (Fig. 17) to flip it "on" so that the high voltage at its right side is applied through a cathode follower 516 to condition an AND circuit 518, to thus pass an Inverted Sync pulse on line 520 which, via a cathode follower 524 and a sync pulse inverter 526, is applied to the other input of AND circuit 518 to apply a pulse via a power cathode follower 518a and a line 518b to the first trigger of a Skew Counter comprising six triggers 528, 530, 532, 534, 536 and 538, the trigger 528 being a high speed trigger and the remaining triggers being slow speed triggers, the specific nature of which was described above. The Skew Counter is adapted to count 64, but is preset to 2, the trigger 530 being preset to indicate the count of 2. After a count of 62 Inverted Sync pulses, which comprise 62 microseconds, the negative output of the trigger 538 will do three things: (1) It will, via a cathode follower 538a and line 538b, close the Counting Gate trigger 514, originally flipped by the first pulse read; (2) it will, by way of an inverter 540, fire a line charging single-shot multivibrator 542 whose period is 32 microseconds, to allow the lines to charge before starting a new tape cycle; and (3) it will turn off a trigger 544, which via a cathode follower 790 and power cathode followers 792 causes the line 788 entitled Shift Tape Registers to move to —30 volts.

This negative voltage on line 788 (Figs. 17 and 33) via cathode follower 788a resets the first tape register triggers 496 (Fig. 33) to zero. At the same time, via the cathode followers 788b, the AND circuit 498 is blocked, due to the negative voltage on line 788, thus breaking the connection between the triggers of the first and second registers, the triggers 502 of the second register having been previously set to the status of the triggers 496 of the first register. At the conclusion of the abovementioned 32 microsecond line charging time, the trigger 546 (Fig. 17) is turned "on" by the single-shot 542 returning to normal status. This is permitted because the line Tape Select is positive, thus unclamping trigger 546. Also since line Tape Select is positive, and this potential is applied, the AND circuit 550, the output of the trigger 546 which was just flipped "on," is passed via a cathode follower 548 through this AND circuit 550 and a cathode follower 552 to line 554 as the signal Start Tape Cycle. Start Tape Cycle is a synchronizing signal.

Referring to Fig. 25, the circuit of the Tape Gate Generator is illustrated. Since no Minus On Tape Check signal has been received, the line 556 is positive, so that the signal Start Tape Cycle received from the Tape Read Control circuits via line 554 permits the Master pulse A0 on line 560 to pass through the AND circuit 562 to turn on a trigger 564, thereby generating the signal Tape Gate on line 566, this being the Master synchronizing control signal of this device.

*Transmitting from tape to the MQ register*

Heretofore we have pointed out how the data on the tape is sensed by the Read-Write Heads (Fig. 20) and the signals thus produced amplified and shaped by the Tape Read and Shaping circuits (Figs. 23 and 24) and transmitted to the Tape Registers (Fig. 33) and simultaneously to the Tape Information Control-Read circuits (Fig. 32). We shall now describe how this data, read from the tape, is transmitted to the MQ Register.

While reading data from tape, the signal Tape Control Read (Figs. 7 and 17) produced on line 710 in the Tape Read Control circuits (Fig. 17) is impressed via this line 710 (Fig. 29) leading into an AND circuit 714 of the Tape Redundancy Counter. The above described master synchronizing control signal Tape Gate is applied via line 392 to this AND circuit 714 which AND circuit thus permits the signal A1(D1) on line 712 to pass via a cathode follower 716 through this AND circuit 714 to generate the signal Tape Into MQ on line 718 which is fed to an OR circuit 720 (Fig. 59) in the I/O Bus (S–5) Into MQ circuits and through an amplifier 722 and power cathode followers 724 to generate a signal called I/O Bus (S–5) Into MQ (see also Fig. 5). The purpose of this signal is two-fold: (1) Via OR circuit 724 (Fig. 28), an inverter 726, and a power cathode follower 728, it causes the line 70 Hold MQ Register (S) (see also Figs. 5 and 10) to drop to a negative level, thus breaking the hold circuit of the S order of the MQ Register (Fig. 10) and thereby permitting data to be read into the Microsecond Delay Unit constituting the storage element of that order. Since data is being read simultaneously into the first six orders of the MQ Register, the signal I/O Bus (S–5) Into MQ (Fig. 59) is also effective via an OR circuit 730 (Fig. 28a), an inverter 732, and power cathode followers 734 to drop the output line 72 to a negative level whose signal Hold MQ Register (1–5), is thus rendered negative to permit the 1 through 5 orders of the MQ Register (Figs. 11 and 12) to accept data from the I/O Bus 64. (2) By reference to Figs. 5, 10, 11 and 12, it will be seen that the signal I/O Bus (S–5) Into MQ acts as a conditioning potential for certain AND circuits which are also fed to the outputs of the triggers of the second Tape Registers via the respective I/O buses from the S–5 Distributor (Fig. 30) which passes the outputs from the triggers of the second registers (Fig. 33) to these AND circuits. Specifically, the triggers of the second Tape Registers 502 (Figs. 8 and 33) via their cathode followers respectively pass the Tape Entry signals via the respective cathode followers of the S–5 Distributor (Figs. 8 and 30) to the I/O Bus 64, whose leads I/O Bus (S), I/O Bus (1) and I/O Bus (2–5) are connected respectively to AND circuits 736, **736*a* and 736*b*** in Figs. 10, 11 and 12. These AND circuits will pass pulses to the respective orders of the MQ representative of data from the respective I/O buses when the respective AND circuits are conditioned by the gating pulse I/O Bus (S–5) Into MQ and, as pointed out hereinbefore, the MQ Hold signals for these orders are now negative so that the hold circuits are broken, thus permitting the information on the respective I/O bus leads to be read into the respective orders S–5 of the MQ. It should be noted that the MQ was initially reset, in the manner as described below, by the Read instruction, in preparation for receiving the first word. Subsequent resets are accomplished after the data is read from the MQ into the Memory Register, as described above.

It should be noted that the trigger 348 in the Ring Shift Control circuit (Fig. 26) is continuously generating a 6 microsecond gate by virtue of the leading edge of Master signal A2(D1.0) and the trailing edge of A7(D1.0) applied to this trigger 348 whose output feeds an OR circuit 738 via a cathode follower, as shown. Since the system is in the process of reading forward, the signal Not Tape Read Backward Select on control line 738 is positive. The timing signal Tape Gate on line 566, then permits the above mentioned 6 microsecond gate, constantly generated by the trigger 348, to be passed through the AND circuit 346, whose output is fed, via an OR circuit 742 and a cathode follower 744 to line 748 as the signal Ring Shift MQ Left 6. The line 748 leads to the OR circuit 346 (Fig. 27) in the Shift MQ Left circuits whereby the signal Shift MQ Left is generated and impressed on the line 66 from which it is fed to the MQ Register column S (Fig. 10).

Simultaneously the signal Ring Shift MQ Left 6 is sent via line 66 to the OR circuit 724 (Fig. 28) of the MQ Register Column (S) Hold circuit and the signal Shift MQ Left on line 66 (Fig. 27) is delivered to the OR circuit 730 (Fig. 28*a*) of the MQ Register Columns (1–5) Hold circuits. This signal Shift MQ Left is also fed via a line 66 (Figs. 27 and 28*b*) to the OR circuit 376 of the MQ Register Columns (6–35) Hold circuits. Thus all hold signals become negative, thereby breaking the hold circuits of the Microsecond Delay Units in all orders of the MQ, in preparation for shifting bits stored therein, in a ring shift left direction.

The purpose of the signal Shift MQ Left is threefold: (1) In Figs. 10, 11, 12, 13 and 14 of the drawings, which represent the MQ Columns (S), (1), (2–5), (6–34) and (35) respectively, it conditions AND circuits 750, **750*a*, 750*b*, 750*c* and 750*d*** of the respective MQ Register orders in such manner that shifts to the left occur. Since the signal Shift MQ Left is of 6 microseconds duration, six shifts will occur. The detailed description of this shifting was covered above in the description of writing on tape.

(2) The signal Shift MQ Left (Figs. 6 and 5) is applied to the MQ Register Hold circuits for orders 1–35 (Figs. 28*a* and 28*b*) to break these hold circuits during shift, as described above. (3) The Shift MQ Left signal on line 752 (Figs. 6, 27 and 29) is also fed into the Tape Redundancy Counter (Fig. 29) where this signal allows the MQ (S) Output on line 754 to pass through the AND circuit 384, an OR circuit 756, and through a cathode follower 758 to the AND circuit 386. For each microsecond during which a binary –1– is stored in MQ Register (S), Fig. 10, the Tape Gate impressed on the line 392 (Fig. 29) will permit the Inverted Sync pulse on the line 388 to pass via a cathode follower 760, the inverter 390 and the cathode follower 392, through the AND circuit 386 whose output is applied, via the inverter 394, as the binary input of the redundancy trigger 396, which has previously been turned "on" or "off" by the Master A1(D1) pulse on line 712, depending on whether a Tape Entry (Check) signal was received or not.

To explain this further, if a binary –1– were present in the 7th track of the tape thus producing a positive Tape Entry (Check) signal, the Redundancy Trigger 396 will be turned "on" with the left hand side conducting by the A1(D1) pulse passing through the cathode follower 716 and the conditioned AND circuit 762. If, however, there were a binary –0– on the 7th track of the tape so that Tape Entry (Check) is negative, it is inverted by the inverter 400 which, via a cathode follower 402, conditions AND circuit 404, and the Redundancy Trigger 396 will be turned "off" by the A1(D1) pulse passing through this AND circuit 404. With the trigger preset, according to the Tape Entry (Check) indication, the count of bits passing through MQ (S) should leave the Redundancy Trigger 396 "on" (left hand plate conducting). If the trigger is left "off," this will cause an error indication Redundancy Count Even on line 764.

The signal Tape Gate on line 566 (Fig. 31) of the Tape Group Counter will allow the pulse A4(D1) to pass through the AND circuit 450. This pulse via cathode followers 454 and line **454*a* advances the Tape Group Counter which, after six groups of bits have been counted, produces a signal Tape Word Complete on its output line 766. The A4(D1) pulse also produces a pulse T4 on line 768 (Figs. 31 and 17) which is fed to the Tape Read Control circuits (Fig. 17) to terminate the Tape Gate. The pulse T4 on line 768 (Fig. 17) pulls over the trigger 544 to the "on" condition, as shown, to render the signal Shift Tape Registers positive (Figs. 17 and 33) and via line 768*a* pulls the slow trigger 546 "off" (right hand side conducting) so that the control signal Start Tape Cycle on line 554 (Figs. 17 and 25) assumes a negative level which permits a –AND circuit 772 (Fig. 25) in the Tape Gate Generator to pass an inverted Master A0 pulse on line 560 to the trigger 564**, turning it, to thus return the signal Tape Gate to a negative level, thus terminating this signal.

As stated above –AND circuits require the coincidence of two or more negative pulses to pass a negative pulse. Consequently, the Master A0 pulse, which is a positive pulse, passing through a cathode follower 774, is inverted in an inverter 776, and the negative output thereof passes through a cathode follower 778 to satisfy the requirements of the –AND circuit 772.

Had the redundancy trigger 396 of the Tape Redundancy Counter (Fig. 29) indicated an even count of binary –1's– in a group of six bits, so that this was "on" at the end of the redundancy count, and since the system is in the process of reading (Tape Control Read), the Tape Gate signal, before being transmitted as above, would have passed through an AND circuit 780 (Fig. 25) conditioned by Redundancy Count Even and Tape Control Read, to a cathode follower 784 whose output appears as the signal Redundancy Error on the output line 782 which is used to give an indication to the operator as, for example, through the energization of a neon lamp 786 (Fig. 8).

As stated above, the T4 pulse on line 768 (Fig. 17) is used to turn "on" the trigger 544 (left hand side conducting). The plus output from the right hand side of the trigger is fed via a cathode follower 790 and power cathode follower 792 to a line 788, thus rendering the signal Shift Tape Registers on line 788 (Fig. 17)

positive. Under these conditions, two things occur: (1) The positive signal Shift Tape Registers on line 788 (Figs. 17 and 33) causes the triggers of the second tape register 502 (Fig. 33) to be reset to zero; and (2) the triggers of the first register 496 are now again connected to those of the second register since the AND circuit 498 is now conditioned.

Heretofore reference has been made to the Tape Group Counter shown in Fig. 31. Means must be provided for determining when a complete word has been read from tape into the MQ Register. It should be recalled that a complete word is written on the tape in 6 groups of six bits each, plus a redundancy bit where necessary, each group of which is read successively. Consequently, the Tape Group Counter counts the number of *bit* groups that have been read from tape, and when six such groups have been read, it is an indication that a complete word has been read from tape. The operation of the Tape Group Counter to produce this result will now be described.

The Tape Group Counter (Fig. 31), as stated before, consists of a high speed trigger 456 and a pair of slow speed triggers 457 and 458. These triggers are preset to the condition 1–1–1 by a signal Read-Write End of Operation on line **456*a* acting through a cathode follower 456*b* to apply a plus signal to line 456*c* to reset all three triggers to "on" condition, i. e., to 1–1–1. Since the right hand outputs of triggers 456 and 458 will thus be both plus, the signal Tape Word Complete on line 766 is positive. It should be noted that it is the count of 1–0–1 that will again make the signal Tape Word Complete positive. Each Tape Gate pulse received on line 566, which is indicative of one group read from the tape, will advance the counter one step, in the sequence 0–0–0, 1–0–0, 0–1–0, 1–1–0, 0–0–1, 1–0–1. When 1–0–1 is reached six groups of bits will have been counted, and the signal Tape Word Complete on line 766 goes positive. When the signal Tape Word Complete on line 766 goes positive, the output of an inverter 794 (Fig. 31) goes negative, thereby resetting the trigger 457** to –1–, thus leaving the count of 1–1–1 in the Tape Group Counter, so that a complete cycle of operation of the Tape Group Counter has been performed.

When the sixth group of bits has been counted, so that the signal Tape Word Complete is plus on line 766, and since the system is in the process of reading, the line 796 Set TU Read Status Bus (Fig. 17) of the Tape Read Control circuits is plus, so that the Tape Gate signal on line 798 for the sixth group will permit an A7(D1) pulse on line 800 to pass through an AND circuit 802. The purpose of this is two-fold: (1) passage of the pulse A7(D1) generates a signal Tape Copy Proceed-Read on line 804, and (2) it checks to see if a Copy instruction is present as next described, to determine if reading shall continue or if a Tape Disconnect signal shall be produced to terminate the reading operation at the end of the word.

Checking for a Copy instruction is accomplished through an AND circuit 806. If no Copy instruction signal is present on line 808, the output of inverter **808*a* and cathode follower 808*b* is plus to thus condition the AND circuit 806 so that a Tape Disconnect-Read line 810 will be positive. This control signal is fed via line 810 (Figs. 17 and 16) to an OR circuit 812 (Fig. 16) in the Tape Write Control circuits which acts, via an amplifier 812*a* and a cathode follower 812*b*, to generate a signal Tape-Disconnect on line 814**, the function of which is to disconnect the tape unit from the Main Machine.

However, if a Copy signal is present on line 808 (Fig. 17) the inverter **808*a* acts via the cathode follower 808*b* to apply a negative signal to the AND circuit 806 so that no plus signal Tape Disconnect Read is produced on line 810. The signal Tape Copy Proceed-Read on line 804 (Figs. 17 and 16) proceeds to the Tape Write Control circuits (Fig. 16) passing through an OR circuit 816 and a cathode follower 818 to generate the signal Tape Copy Proceed on line 820. The signal Tape Copy Proceed is fed via line 820** (Figs. 16 and 60) to the Copy Proceed circuits (Fig. 60) where it produces the signal 9(D4) On Copy Proceed which via the Enter Execute circuits (Fig. 61) produces a Go To Execute signal. The Go To Execute signal in turn produces the signal Execute Time which, if a Copy signal is present in the Copy Execution Timer circuits (Fig. 62) produces a Copy Read signal, as described presently, and a Read Tape (Copy) MQ Reset signal.

The signal Tape Copy Proceed (Fig. 60) is synchronized by a pair of triggers 822 and 824 and the timing signals applied thereto, to produce the above mentioned 9(D4) On Copy Proceed signal. This 9(D4) On Copy Proceed signal is fed to the Enter Execute circuit (Fig. 61) where it will cause the Copy instruction to produce the signal Go To Execute which in turn produces the 12 microsecond signal Execute Time. Since no writing of any type is taking place at this time, the output of an inverter 826 (Fig. 62) in the Copy Execution Timer will be positive and is applied via a cathode follower to an AND circuit 828. Since a Copy instruction is present and also conditions this AND circuit 828, the above mentioned 12 microsecond signal Execute Time will be passed via a cathode follower, as shown, and through said AND circuit 828 to an amplifier and a cathode follower, causing the signal Copy Read to be generated on line 830.

Under control of the Copy Read signal the information is passed from the MQ Register via switches, as indicated generally in Fig. 1, by way of the Memory Bus 62 to the Electrostatic Memory. The signal Copy Read on line 830 (Fig. 62) also conditions an AND circuit 832 (Fig. 62) to permit a timed pulse A10(D2) to pass through this AND circuit if the signal Tape Read Select is present, which it is while reading, which acts through a cathode follower **832*a* to generate the signal Read Tape (Copy) MQ Reset on line 833 which (Figs. 62 and 63) passes through an OR circuit 836 and a cathode follower 838, to produce the signal Clear MQ on the line 840** which (Figs. 63, 28, 28*a* and 28*b*) applies the signal Clear MQ to the MQ Register Hold Circuits (see also Fig. 5) to render Hold MQ Reg (S) (Fig. 28), Hold MQ (1–5) (Fig. 28*a*) and Hold MQ (6–35) (Fig. 28*b*) negative. These signals are thus rendered negative for two microseconds (due to A10(D2)) in Fig. 63, and since no data is being entered into the MQ Registers during these two microseconds, these registers are cleared. The Microsecond Delay Units which comprise the storage elements of all orders of the MQ Register, all assume a —30 volts (0) level, in effect resetting the MQ Register, in preparation for a new read-in from the tape. It is important to note that resetting is necessary since a –0– may not be read in over a –1– stored in the MQ Register, thus necessitating this MQ Register reset.

The process involved in reading a word from tape, amplifying and processing the signals and placing them into the MQ Register in such manner that a complete word is stored in the MQ Register has now been described. The signal Copy Read on line 830 (Figs. 62 and 57) produces a signal MQ Register (S–35) Into Memory Bus (S–35) (Fig. 57), which is applied to the AND circuits, such as shown in Fig. 58, to produce signals on the individual channels of the Memory Bus, whereby the 36 outputs of the MQ Register are applied by way of the Memory Bus 62 (see also Figs. 1, 5 and 6) to the Electrostatic Memory, prior to the above described reset. The details of the generation and operation of the signals controlling the transfer of data between the MQ Register and the Electrostatic Memory form no part of this invention and are, therefore, not described in detail herein.

*Reading tape backward*

It has been noted hereinbefore that the system of this invention is adapted not only to read information from tape and store it in the MQ Register while the tape is being fed through the read-write heads in a forward direction, but also that reading may take place while the tape is being fed backward through the read-write heads. Under these conditions it is again assumed that the tape is up to speed and all conditions for reading from tape are complied with. The procedure for reading backward is exactly the same as when reading forward, up to and including the generation of the Tape Gate signal and reading into the MQ Register.

Assuming a Start Tape Cycle signal has been produced which is applied to the Tape Gate Generator (Fig. 25) to produce the signal Tape Gate during a read backward operation. Since the tape is being read while running backward under the heads, the groups of bits will come into the MQ Register from the tape in the following order: Bits 30–35, 24–29, 18–23, 12–17, 6–11 and S–5. It is quite apparent that two operations become necessary during this sequence of group transmission. First, it is necessary to pass each bit past a common point in order that the redundancy check of the bits, in the respective groups, may be performed and, secondly, the bits must be rearranged in the MQ Register so that the original order of the bits of the word as they were written on the tape is restored. It will be remembered that when reading tape in the forward direction, checking of the bits of the several groups occurred at the output of the MQ (S) order, and shifting comprised the shifting of six groups, of six bits each, six places to the left. When reading backward, however, checking cannot occur at the output of the MQ (S) order, but occurs at the output of the MQ (5) order because shifting of the six groups of six bits each must now be six places to the right for each group (for checking).

Since the groups are now being read backward, and during such process the bits are being checked at the MQ (5) order position, it is obvious that in order to check the last six bits an overshift, to the right, of six places, becomes necessary. Thus a backward shift, to the left, of six places is finally required, in order to reposition the information in the MQ Register in its proper order, i. e., the order in which it would present itself were the tape read while running in the forward direction.

Referring to Fig. 26, the Ring Shift Control circuits, it is seen that a six microsecond gate is being generated continuously by the trigger 348, as described above in detail, and this gate is applied to the OR circuit 738. This gate, as stated above, is produced by virtue of the inputs MA2(D1.0) and MA7(D1.0). Since the system is now in the process of reading backward, the control signal TU Read Backward on line 842 will be plus and conditions an AND circuit 844. The Tape Gate on line 566 also conditions this AND circuit so that one of these six microsecond gates applied thereto is permitted to pass and thus generate, via the cathode follower **844*a* the signal Ring Shift MQ Right 6, on line 846**.

The action of the signal Ring Shift MQ right 6 is identical with the action of Ring Shift MQ Left 6, as in reading forward, with the exception that the Microsecond Delay Units of the MQ Register are now so interconnected that shifting will occur to the right instead of to the left. This signal Ring Shift MQ Right 6 on line 846 (Figs. 26 and 27*a*) is fed to the Shift MQ Right circuits (Fig. 27*a*) from which it emerges, on line 68, as the signal Shift MQ Right. For MQ Order (S) (Fig. 10) the signal Ring Shift MQ Right 6 is applied directly to its MQ Register (S) Hold circuit (Fig. 28) to render the signal Hold MQ Reg (S) negative so that this negative signal is fed via line 70 (Figs. 28 and 10) to break the Hold circuit of the MQ Register Column S.

The signal Shift MQ Right performs three functions: (1) It causes the hold circuits of MQ Columns 1–5 (Fig. 28*a*) to assume a negative level so that in orders 1–5, the hold circuit is broken and shifting may occur; (2) it acts as a control signal to connect the outputs of the adjacent Microsecond Delay Units, or of the 35th and (S) orders, so that shifting right will occur. In this regard, see AND circuit 300 of Fig. 10 which is in MQ Register Column (S), AND circuit 848 of Fig. 11 which is in MQ Register column (1), AND circuit 850 of Fig. 12 which is in MQ Register Columns (2–5), AND circuit 852 of Fig. 13 which is in MQ Register Columns (6–34), and, finally, the AND circuit 854 of Fig. 14 which is in MQ Register Column (35); (3) in the Tape Redundancy Counter (Fig. 29), it permits the MQ (5) outputs to be passed through an AND circuit 856 and via the OR circuit 756, the cathode follower 758, the AND circuit 386, and the inverter 394 to the Tape Redundancy Trigger 396. The Tape Redundancy Trigger has been preset, according to the check bit received, as in reading forward, and the Tape Gate on line 392 then permits the Inverted Sync pulse on line 388 to pass via the cathode follower 760, the sync pulse inverter 390 and the cathode follower 392 to and through the AND circuit 386 for each microsecond that a –1– is stored in MQ Register (5) order.

Thus, while right shifting is occurring, the serial output of the MQ Register (5) order is sampled in such manner as to count the binary –1– bits and the Redundancy Counter maintains a count of these in similar fashion to that when the tape is being read in the forward direction. After the sixth group of bits has been received, the Tape Group Counter (Fig. 31) will indicate this fact by producing a positive signal Tape Word Complete on its output line 766.

Again the Tape Read Control circuits (Fig. 17) will make a test to determine if a Copy signal is present on line 808. If this signal is not present, the signal Tape Disconnect-Read will be produced on line 810 as an output of the AND circuit 806 causing the tape unit to disconnect and further reading to terminate, as before. If the Copy signal is present, however, the signal Tape Copy Proceed-Read on line 804 is effective, instead of the signal Tape Disconnect-Read, and this will send the machine to Execution time, as described in regard to the process of reading tape while the tape is feeding in the forward direction. The signal Tape Copy Proceed-Read via Fig. 16 supplies the signal Tape Copy Proceed to the Copy Proceed circuits (Fig. 60) to produce the signal 9(D4) On Copy Proceed which is fed to the Eenter Execute circuits (Fig. 61) to produce the signal Go To Execute on its line 858 which produces the signal Execute Time which is applied to the Copy Execution Timer (Fig. 62) to produce the signal Copy Read on line 830. This signal Copy Read, as stated above, produces a signal MQ Register (S–35) Into Memory Bus (S–35) which is applied to the switches of the Memory Bus (Fig. 1) to control the transfer of the data in the 36 orders of the MQ Register to the Memory Bus 62 (see Figs. 1, 5 and 6). This latter transfer, however, as indicated in connection with the function of reading tape in the forward direction is not part of the invention claimed in this application.

Prior to the transfer of data to the Memory Bus, however, it is seen from the Ring Shift Control circuits (Fig. 26) that since the system is in the process of reading backward, the signal TU Read Backward on line 842 is plus and is applied to AND circuit 862, and since Copy is present on line 860 and applied to this same AND circuit, and further since the signal Execute Cycle is also applied to this AND circuit, the repeatedly generated six microsecond gates produced by trigger 348 will be passed to the OR circuit 742, and the cathode followers 744, thus producing the signal Ring Shift MQ Left 6 on line 748 which shifts the bits, six positions to the left, in the same manner as described in detail previously, thereby rearranging the information in the MQ Register into the same order in which it was written on tape. It is important to note that checking of the bits will be suppressed during this 7th shift employed during the course of reading backward, since the signal Tape Gate on line 392 (Fig. 29) will not be present and the AND circuit 762 is thus blocked so that the redundancy count is not performed during this final left shift of the bits in the MQ Register.

What is claimed is:

1. In a record input-output device for a data processing machine adapted to process data read from a magnetic record medium which comprises a plurality of groups of pulse producing record bits recorded in separate tracks of the magnetic record medium and in which each group comprises a predetermined number of bits, means for reading bits of a group from a plurality of separate record tracks including a bit pulse entry line for each track, a first register for each entry line, a second register associated with each first register, a normally closed interconnecting circuit between each first and second register whereby a pulse on an entry line will be entered into both a first and a second register, means for generating a timing pulse effective to open said interconnecting circuits and for resetting said first registers whereby pulses on said entry lines will be entered into said first registers only, a storage register, means for simultaneously reading out pulses from said second registers into said storage register, means also responsive to said timing pulse for resetting said second registers and for closing said interconnecting circuits between said first and second registers; a bit group counter having a counting capacity equal to the number of groups of bits comprising a record, means for detecting the pulse generated by the reading of the first bit of a bit group, means for entering each first bit pulse into said counter whereby the same is advanced, means in said counter for emitting an output pulse therefrom when said counter reaches its counting capacity, and means responsive to said output pulse for controlling the following record reading operation.

2. In a record input-output device for a data processing machine adapted to process data read from a magnetic record medium which comprises a plurality of groups of pulse producing record bits recorded in separate tracks of the magnetic record medium and in which each group comprises a predetermined number of bits, means for reading bits of a group from a plurality of separate record tracks including a bit pulse entry line for each track, a first electronic trigger for each entry line, a second electronic trigger associated with each first trigger, a normally closed interconnecting circuit between each first and second triggers whereby a pulse on an entry line wall be entered into both a first and a second trigger, means for generating a timing pulse effective to open said interconnecting circuits and for resetting said first triggers whereby pulses on said entry lines will be entered into said first triggers only, an electronic storage register, means for simultaneously reading out pulses from said second triggers into said storage register, means also reponsive to said timing pulse for resetting said second triggers and for closing said interconnecting circuits between said first and second triggers; a bit group counter comprising a plurality of electronic triggers having a counting capacity equal to the number of groups of bits comprising a record, means for detecting the pulse generated by the reading of the first bit of a bit group, means for entering each first bit pulse into the triggers of said counter whereby the same are advanced, means in one of said triggers of said counter for emitting an output pulse therefrom when said counter reached its counting capacity, and means responsive to said output pulse for controlling the following record reading operation.

3. In a record input-output device for a data processing machine adapted to process data read from a magnetic record medium which comprises a plurality of groups of pulse producing record bits recorded in separate tracks of the magnetic record medium and in which each group comprises a predetermined number of bits, means for reading bits of a group from a plurality of separate record tracks including a bit pulse entry line for each track, a first register for each entry line, a second register associated with each first register, a normally closed interconnecting circuit between each first and second register whereby a pulse on an entry line will be entered into both a first and a second register, means for generating a timing pulse effective to open said interconnecting circuits and for resetting said first registers whereby pulses on said entry lines will be entered into said first registers only, a storage register, means for simultaneously reading out pulses from said second registers into said storage register, means also responsive to said timing pulse for resetting said second registers and for closing said interconnecting circuits between said first and second registers, means for simultaneously reading from said storage register groups of bit representing pulses; a bit group counter having a counting capacity equal to the number of groups of bits comprising a record, means for detecting the reading from said register of the first bit of a bit group, means for entering each first bit pulse into said counter whereby the same is advanced, means in said counter for emitting an output pulse therefrom when said counter reaches its counting capacity, and means responsive to said output pulse for controlling the following record reading operation.

4. In a record input-output device for a data processing machine adapted to process data read from a magnetic record medium which comprises a plurality of groups of pulse producing record bits recorded in separate tracks of the magnetic record medium and in which each group comprises a predetermined number of bits, means for reading bits of a group from a plurality of separate record tracks including a bit pulse entry line for each track, a first electronic trigger for each entry line, a second electronic trigger associated with each first trigger, a normally closed interconnecting circuit between each first and second triggers whereby a pulse on an entry line will be entered into both a first and a second trigger, means for generating a timing pulse effective to open said interconnecting circuits and for resetting said first triggers whereby pulses on said entry lines will be entered into said first triggers only, an electronic storage register, means for simultaneously reading out pulses from said second triggers into said storage register, means also responsive to said timing pulse for resetting said second triggers and for closing said interconnecting circuits between said first and second triggers, means for simultaneously reading from said storage register groups of bit representing pulses; a bit group counter comprising a plurality of electronic triggers having a counting capacity equal to the number of groups of bits comprising a record, means for detecting the pulse generated by the reading of the first bit of a bit group either from said magnetic record or from said storage register, means for entering each first bit pulse into the triggers of said counter whereby the same are advanced, means in one of the triggers of said counter for emitting an output pulse therefrom when said counter reaches its counting capacity, and means responsive to said output pulse for controlling the following reading operation.

5. In a record input-output device for a data processing machine adapted to process data read from a magnetic record medium which comprises a plurality of groups of pulse producing record bits recorded in separate tracks of the magnetic record medium and in which each group comprises a predetermined number of bits, means for reading bits of a group from a plurality of separate record tracks including a bit pulse entry line for each track, a first register for each entry line, a second register associated with each first register, a normally closed interconnecting circuit between each first and second register whereby a pulse on an entry line will be entered into both a first and a second register, means for generating a timing pulse effective to open said interconnecting circuits and for resetting said first registers whereby pulses on said entry lines will be entered into said first registers only, a storage register, means for simultaneously reading out pulses from said second registers into said storage register, means also responsive to said timing pulse for resetting said second registers and for closing said interconnecting circuits between said first and second registers, means for simultaneously reading from said storage register groups of bit representing pulses; a bit group counter having a counting capacity equal to the number of groups of bits comprising a record, means for detecting the pulse generated by the reading of the first bit of a bit group either from said magnetic record or from said storage register, means for entering each first bit pulse into said counter whereby the same is advanced, means in said counter for emitting an output pulse therefrom when said counter reaches its counting capacity, and means responsive to said output pulse for controlling the following reading operation.

6. In a data processing system, means for substantially simultaneously reading a plurality of separate tracks of a magnetically recorded record including a record entry pulse line for each track, a first register for each entry line, a second register associated with each first register, a normally closed interconnecting circuit between each first and second register whereby a pulse on an entry line will be entered into both a first and second register, a timing pulse generator, means responsive to a pulse from said generator for opening said interconnecting circuits and for resetting said first registers whereby pulses on said entry lines will be entered into said first registers only, means for reading out said second registers in parallel, and means operative after the reading out of said second registers also responsive to a pulse from said generator for resetting said second registers and for closing said interconnecting circuits between each first and second registers.

7. In a data processing system, means for reading a track of a magnetically recorded record including a record entry pulse line, a first register for said entry line, a second register associated with said first register, a normally closed interconnecting circuit between said first and second register whereby a pulse on said entry line will be entered into both said first and second register, a timing pulse generator, means responsive to a pulse from said generator for opening said interconnecting circuit and for resetting said first register whereby a pulse on said entry line will be entered into said first register only, means for reading out said second register in parallel, and means operative after the reading out of said second register also responsive to a pulse from said generator for resetting said second register and for closing said interconnecting circuit between said first and second register.

8. In a data processing system, means for substantially simultaneously reading a plurality of separate tracks of a magnetically recorded record including a record entry pulse line for each track, a first electronic trigger for each entry line, a second electronic trigger associated with each first trigger, a normally closed interconnecting circuit between each first and second trigger whereby a pulse on an entry line will be entered into both a first and a second trigger, a timing pulse generator, means responsive to a pulse from said generator for opening said interconnecting circuits and for resetting said first triggers whereby pulses on said entry lines will be entered into said first triggers only, means for reading out said second triggers in parallel, and means operative after the reading out of said second triggers also responsive to a pulse from said generator for resetting said second triggers and for closing said interconnecting circuits between each first and second triggers.

9. In a data processing system, means for reading a track of a magnetically recorded record including a record entry pulse line, a first electronic trigger for said entry line, a second electronic trigger associated with said first trigger, a normally closed interconnecting circuit between said first and second triggers whereby a pulse on said entry line will be entered into both said first and second triggers, a timing pulse generator, means responsive to a pulse from said generator for opening said interconnecting circuit and for resetting said first trigger whereby a pulse on said entry line will be entered into said first trigger only, means for reading out said second trigger, and means operative after the reading out of said second trigger also responsive to a pulse from said generator for resetting said second trigger and for closing said interconnecting circuit between said first and second trigger.

10. In a data processing system, means for substantially simultaneously reading a plurality of separate tracks of a magnetically recorded record including a record entry pulse line for each track, a first register for each entry line, a second register associated with each first register, a normally closed interconnecting circuit between each first and second register whereby a pulse on an entry line will be entered into both a first and second register, a pulse generator responsive to the first pulse on any one of said entry lines for initiating a timing pulse of predetermined duration, means responsive to a pulse from said generator for opening said interconnecting circuits and for resetting said first registers whereby pulses on said entry lines will entered into said first registers only, means for reading out said second registers in parallel, and means operative after the reading out of said second registers also responsive to a pulse from said generator for resetting said second registers and for closing said interconnecting circuits between each first and second registers.

11. In a data processing system, means for reading a plurality of separate tracks of a magnetically recorded record including a record entry pulse line for each track, a first electronic trigger for each entry line, a second elecetronic trigger associated with each first trigger, a normally closed interconnecting circuit between each first and second triggers whereby a pulse on an entry line will be entered into both a first and second trigger, a pulse generator responsive to the first pulse on any one of said entry lines for initiating a timing pulse of predetermined duration, means responsive to a pulse from said generator for opening said interconnecting circuits and for resetting said first triggers whereby pulses on said entry lines will be entered into said first triggers only, a register, means for simultaneously discharging said second triggers into said register, and means also responsive to a pulse from said generator for resetting said second triggers and for closing said interconnecting circuits between each first and second triggers.

12. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adacent pair of orders whereby the orders are connected serially, means for reading a source data medium, means under control of said reading means for simultaneously entering a group of impulses representative of a complete character into said entry orders, mean for selectively shifting a group of entered impulses representative of a complete character through said connections either to the right or to the left of said entry orders, an impulse group counter connected to said last named means and having a counting capacity equal to the group capacity of all of said orders for counting the number of impulse groups shifted during either of said shifting operations, and carry signal means connected with said group counter adapted to emit a carry signal indicative of the fact that said register has reached its capacity.

13. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for simultaneously entering a group of impulses representative of a complete character into said entry orders, means for shifting groups of entered impulses representative of complete characters through said connections from said entry orders and into said exit orders, an impulse group counter connected to said last named means operative during read-out of said register and having a counting capacity equal to the group capacity of all of said orders for counting the number of impulse groups shifted, means for reading out groups of impulses from said exit orders, carry signal means connected with said group counter adapted to emit a carry signal indicative of the fact that said register has been completely read-out, and means responsive to the influence of a counter carry signal for conditioning said device for reloading said register.

14. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for simultaneously entering a group of impulses representative of a complete character into said entry orders, means for shifting a group of entered impulses representative of a complete character through said connections to the left of said entry orders, an impulse group counter connected to said last means operative during data read-in and having a counting capacity equal to the group capacity of all of said orders for counting the number of impulse groups shifted to the left, carry signal means connected with said group counter adapted to emit a carry signal indicative of the fact that said register has received impulse groups to its capacity, and means responsive to a counter carry signal to condition said device for register read-out.

15. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for entering a group of impulses representative of a complete character into said entry orders, means for shifting a group of entered impulses representative of a complete character through said connections to the right of said entry orders, an impulse group counter connected to said last means operative during data read-in and having a counting capacity equal to the group capacity of all of said orders for counting the number of impulse groups shifted to the right, carry signal means connected with said group counter adapted to emit a carry signal indicative of the fact that said register has received impulse groups to its capacity, and means responsive to the influence of a counter carry signal to condition said device for a register read-out.

16. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for simultaneously entering a group of impulses representative of a complete character into said entry orders, means for shifting groups of entered impulses representative of complete characters from said entry orders through said connections and into said intermediate and exit orders, an impulse group counter connected to said last named means and having a counting capacity equal to the group capacity of all of said orders for counting the number of impulse groups shifted, carry signal means connected with said group counter adapted to emit a carry signal indicative of the fact that said register has received impulse groups to its capacity, and means responsive to the influence of a counter carry signal to condition said device for register read-out.

17. In a magnetic tape data input/output device for calculators, an electronic register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for simultaneously entering a group of impulses representative of a complete character into said entry orders, means for successively shifting groups of entered impulses representative of a complete character from said entry orders through said connections and into said intermediate and exit orders, an electronic impulse group counter connected to said last named means operative during data read-in and having a counting capacity equal to the group capacity of all of said orders for counting the number of impulse groups shifted, carry signal means connected with said group counter adapted to emit a carry signal indicative of the fact that said register has received impulse groups to its capacity, and means responsive to a counter carry signal to condition said device for register read-out.

18. In a magnetic tape data input/output system for calculators, an electronic register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for reading a source data medium, means under control of said reading means for simultaneously entering a group of impulses representative of a complete character into said entry orders, means for successively shifting groups of entered impulses representative of a complete character through said connections and into said exit order, an electronic impulse group counter connected to said last named means operative during register read-out and having a counting capacity equal to the group capacity of all of said orders for counting the number of impulse groups shifted, means for simultaneously reading out successive groups of impulses from said exit orders, carry signal means connected with said group counter adapted to emit a carry signal indicative of the fact that said register has been completely read-out, and means responsive to a counter carry signal to condition said device for reloading of said register.

19. In a data input/output device for calculators, a register adapted to receive and retain a plurality of impulse groups whereof each group is representative of the bits of a complete, coded character, said register comprising a plurality of impulse entry orders, a plurality of impulse exit orders, a plurality of intermediate orders located between said exit and entry orders, the orders of each of said pluralities being adapted to receive and retain an electric impulse representative of a bit of a coded character, a connection between each adjacent pair of orders whereby the orders are connected serially, means for entering a group of impulses representative of a complete character into said entry orders, means for selectively shifting a group of entered impulses representative of a complete character through said connections either to said intermediate orders or to said exit orders, a bit counter, a connection between said bit counter and each end of said entry orders, connections between said shifting means and said bit counter for rendering operative one of said connections between said bit counter and said entry orders to cause said bit counter to count the bits of a group representative of a complete character during a selected shifting operation, and means responsive to the operation of said counter for indicating a redundancy count of shifted bits.

20. In a data input/output device for calculators, a register adapted to receive and retain a plurality of impulse groups whereof each group is representative of the bits of a complete, coded character, said register including a plurality of impulse entry orders, a plurality of impulse exit orders, the orders of each of said pluralities being adapted to receive and retain an electric impulse representative of a bit of a coded character, a connection between each adjacent pair of orders whereby the orders are connected serially, means for entering a group of impulses representative of a complete character into said entry orders, means for shifting a group of entered impulses representative of a complete character through said connections to said exit orders, a bit counter, a connection between said bit counter and the junction between said entry orders and said exit orders, whereby said bit counter is connected to count the bits of a group representative of a complete character during shifting thereof from said entry orders to said exit orders, and means responsive to the operation of said counter for indicating a redundancy count of shifted bits.

21. In a data input/output device for calculators, a register adapted to receive and retain a plurality of impulse groups whereof each group is representative of the bits of a complete, coded character, said register including a plurality of impulse entry orders, a plurality of intermediate orders located adjacent said entry orders, the orders of each of said pluralities being adapted to receive and retain an electric impulse representative of a bit of a coded character, a connection between each adjacent pair of orders whereby the orders are connected serially, means for entering a group of impulses representative of a complete character into said entry orders, means for shifting a group of entered impulses representative of a complete character through said connections to said intermediate orders, a bit counter, a connection between said bit counter and the junction between said entry orders and said intermediate orders, whereby said bit counter is connected to count the bits of a group representative of a complete character during the shifting thereof from said entry orders to said intermediate orders, and means responsive to the operation of said counter for indicating a redundancy count of shifted bits.

22. In a data input/output device for calculators, a register adapted to receive and retain a plurality of impulse groups whereof each group is representative of the bits of a complete, coded character, said register including a plurality of impulse entry orders, a plurality of intermediate orders located adjacent said entry orders, the orders of each of said pluralities being adapted to receive and retain an electric impulse representative of a bit of a coded character, a connection between each adjacent pair of orders whereby the orders are connected serially, means for entering a group of impulses representative of a complete character into said entry orders, means for shifting a group of entered impulses representative of a complete character through said connections to said intermediate orders, a bit counter, a connection between said bit counter and the junction of said entry orders and said intermediate orders, whereby said bit counter is connected to count the bits of a group representative of a complete character during shifting thereof from said entry orders to said intermediate orders, means responsive to the operation of said counter for indicating a redundancy count of shifted bits, means for shifting a group of bits from said intermediate orders to said entry orders, and means for rendering inoperative said counter during said last named shifting operation.

References Cited in the file of this patent

UNITED STATES PATENTS

| | | |
|---|---|---|
| 2,585,630 | Crosman | Feb. 12, 1952 |
| 2,604,262 | Phelps | July 22, 1952 |
| 2,611,813 | Sharpless | Sept. 23, 1952 |
| 2,634,052 | Bloch | Apr. 7, 1953 |
| 2,679,638 | Bensky et al. | May 25, 1954 |
| 2,719,959 | Hobbs | Oct. 4, 1955 |

FOREIGN PATENTS

| | | |
|---|---|---|
| 676,672 | Great Britain | July 30, 1952 |

OTHER REFERENCES

"2d Interim Progress Report, July 1947, on the Physical Realization of an Electronic Computing Instrument," Inst. of Adv. Study at Princeton (IAS)-(1). (Pages 32A, 33, 34, 34A and 35.)

"3d Interim Progress Report," Jan. 1, 1948, Inst. of Adv. Study (pages 53 to 59) (IAS)-(2).

"24 Digit Parallel Computer With Magnetic Drum Memory," by Engineering Research Associates, Inc. (ERA) 1949. (Pages 31 to 33, 35 and 36; Figs. 3.2-2; 3.4-4; and 3.4-6.)

Electronic Engineering, July 1949, "A Magnetic Digital Storage System" by Booth (pages 234-238).

The Transistor, Rec'd Patent Office, Feb. 1, 1952, by Bell Tel. Lab., pages 524, 559 and 562.